United States Patent [19]

Hata et al.

[11] Patent Number: 4,805,127
[45] Date of Patent: Feb. 14, 1989

[54] IMAGE DESCRIBING APPARATUS

[75] Inventors: Toshihiko Hata; Kaoru Horiuchi, both of Amagasaki, Japan

[73] Assignee: Mitsubishi Denki Kabushiki Kaisha, Japan

[21] Appl. No.: 838,592

[22] Filed: Mar. 11, 1986

[30] Foreign Application Priority Data

Mar. 12, 1985 [JP] Japan .................................. 60-47431
Mar. 12, 1985 [JP] Japan .................................. 60-47432
Mar. 12, 1985 [JP] Japan .................................. 60-47433
Mar. 12, 1985 [JP] Japan .................................. 60-47435

[51] Int. Cl.[4] ........................................... G06F 15/626
[52] U.S. Cl. ..................................... 364/521; 340/723; 364/518; 364/522
[58] Field of Search .............................. 364/518–521, 364/523, 522; 340/703, 723, 729, 718, 720

[56] References Cited

U.S. PATENT DOCUMENTS 4,561,061 12/1985 Sakamoto et al. .............. 364/518 X
4,601,002 7/1986 Rosenthal ........................... 364/518
4,607,340 8/1986 Nagai .................................. 364/521
4,620,287 10/1986 Yam ................................. 364/521 X

OTHER PUBLICATIONS

"Curve Fitting as a Pattern Recognition Problem", Theo Pavlidis, 1982 IEEE.
"Some Experiments in Image Vectorization", Jimenez et al., *IBM J. Res. Develop.*, vol. 26, No. 6, Nov. 1982.
"An Improved Segmentation and Coding Algorithm for Binary and Nonbinary Images", Per-Erik Danielsson, *IBM J. Res. Devel.*, vol. 26, No. 6, Nov. 1982.

*Primary Examiner*—Gary V. Harkcom
*Assistant Examiner*—H. R. Herndon
*Attorney, Agent, or Firm*—Leydig, Voit & Mayer

[57] ABSTRACT

An image describing apparatus for describing a coupling area for forming an image via a graphic command of polygonal shape or a circular arc. The apparatus includes a device for extracting area data of boundary point row in the coupling area, a device for approximating the boundary point row in a linear primitive or curve primitive of a circular arc, a device for dividing the curve primitive so that other area does not exist in the area of the graphic command corresponding to the curve primitive if other area exists in the area of the graphic command corresponding to the approximated curve primitive, and a device for coverting the approximate boundary into a graphic command of polygonal shape or circular arc and setting a preferential sequence to the command to form encoded data.

19 Claims, 61 Drawing Sheets

FIG. 3(a)
PRIOR ART

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 2 | 2 | 2 | 1 | 1 |
| 1 | 1 | 1 | 2 | 2 | 2 | 2 | 1 |
| 2 | 1 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |

FIG. 3(b)

| 1 | 1 | 1 | 1 | 1 | 1 | 1 | 1 |
|---|---|---|---|---|---|---|---|
| 1 |   |   | 1 | 1 | 1 |   | 1 |
| 1 |   | 1 | 2 | 2 | 2 | 1 | 1 |
| 1 |   | 1 | 2 |   |   | 2 | 1 |
| 2 | 1 | 2 |   |   |   |   | 2 |
| 2 | 2 |   |   |   |   |   | 2 |
| 2 | 2 | 2 | 2 | 2 | 2 | 2 | 2 |

FIG. 6(a)
PRIOR ART

| 0 | 0 | 1 | 1 | 1 | 1 | 0 | 0 | 0 | 0 | 0 | 0 |
|---|---|---|---|---|---|---|---|---|---|---|---|
| 0 | 1 | 1 | 1 | 1 | 1 | 1 | 0 | 0 | 0 | 0 | 0 |
| 1 | 1 | 1 | 1 | 1 | 1 | 1 | 1 | 0 | 0 | 0 | 0 |
| 1 | 1 | 1 | 0 | 0 | 1 | 1 | 1 | 1 | 0 | 0 | 0 |
| 1 | 1 | 1 | 0 | 0 | 0 | 1 | 1 | 1 | 0 | 0 | 0 |
| 1 | 1 | 1 | 1 | 0 | 1 | 1 | 1 | 1 | 0 | 0 | 0 |
| 0 | 1 | 1 | 1 | 1 | 1 | 1 | 1 | 0 | 0 | 1 | 1 |
| 0 | 0 | 1 | 1 | 1 | 1 | 1 | 0 | 0 | 1 | 1 | 1 |
| 0 | 0 | 0 | 1 | 1 | 1 | 0 | 0 | 0 | 1 | 1 | 1 |
| 0 | 0 | 0 | 0 | 0 | 0 | 0 | 0 | 0 | 0 | 1 | 0 |

FIG. 6(b)

OUTSIDE PROFILE

INSIDE PROFILE

OUTSIDE PROFILE

FIG. 12
PRIOR ART

|   | 1 | 2 | 3 | 4 | 5 | 6 | 7 | 8 | 9 | 10 |
|---|---|---|---|---|---|---|---|---|---|----|
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |
| 3 | 0 | 1 | 1 | 1 | 1 | 1 | 0 | 0 | 0 | 0 |
| 4 | 0 | 1 | 1 | 1 | 1 | 1 | 0 | 3 | 3 | 0 |
| 5 | 0 | 1 | 1 | 1 | 2 | 2 | 0 | 3 | 3 | 0 |
| 6 | 0 | 1 | 1 | 1 | 2 | 2 | 0 | 0 | 0 | 0 |
| 7 | 0 | 1 | 1 | 1 | 2 | 2 | 0 | 0 | 0 | 0 |
| 8 | 0 | 0 | 0 | 0 | 0 | 0 | 0 | 0 | 0 | 0 |

FIG. 13
PRIOR ART

|   | 1 | 2 | 3 | 4 | 5 | 6 | 7 | 8 | 9 | 10 |
|---|---|---|---|---|---|---|---|---|---|----|
| 1 | 0 | 0 | 0 | 0 | 0 | 0 | 0 | 0 | 0 | 0 |
| 2 | 0 | A | A | A | A | A | 0 | 0 | 0 | 0 |
| 3 | A | ① | 1 | 1 | 1 | 1 | A | 0 | 0 | 0 |
| 4 | A | ① | 1 | 1 | 1 | 1 | A | 3 | 3 | 0 |
| 5 | A | ① | 1 | 1 | 2 | 2 | A | 3 | 3 | 0 |
| 6 | A | ① | 1 | 1 | 2 | 2 | A | 0 | 0 | 0 |
| 7 | A | ① | 1 | 1 | 2 | 2 | A | 0 | 0 | 0 |
| 8 | 0 | A | A | A | A | A | 0 | 0 | 0 | 0 |

◯ : UNEXTRACTED AREA FLAG

CHAIN 1 : STARTING POINT (2,3), DISPLACEMENT 0,0,0,0,0,3,3,3,3,3,2,2,2,2,2,1,1,1,1,1

FIG. 14
PRIOR ART

|   | 1 | 2 | 3 | 4 | 5 | 6 | 7 | 8 | 9 | 10 |
|---|---|---|---|---|---|---|---|---|---|----|
| 1 | 0 | 0 | 0 | 0 | 0 | 0 | 0 | 0 | 0 | 0 |
| 2 | 0 | A | A | A | A | A | 0 | 0 | 0 | 0 |
| 3 | A | B | B | B | B | B | A | A | A | 0 |
| 4 | A | B | 1 | 1 | B | B | A | C | C | A |
| 5 | A | B | 1 | B | D | D | A | C | C | A |
| 6 | A | B | 1 | B | D | D | A | A | A | 0 |
| 7 | A | B | B | B | D | D | A | 0 | 0 | 0 |
| 8 | 0 | A | A | A | A | A | 0 | 0 | 0 | 0 |

◯ : UNEXTRACTED AREA FLAG

CHAIN 2 : STARTING POINT (2,3), DISPLACEMENT 0,0,0,0,0,3,3,2,2,3,3,3,2,2,2,1,1,1,1,1
CHAIN 3 : STARTING POINT (8,4), DISPLACEMENT 0,0,3,3,2,2,1,1
CHAIN 4 : STARTING POINT (8,4), DISPLACEMENT 0,0,3,3,2,2,1,1
CHAIN 5 : STARTING POINT (5,5), DISPLACEMENT 0,0,3,3,3,2,2,1,1,1

——: PROFILE OF AREA A C1

----: PROFILE OF AREA B C2

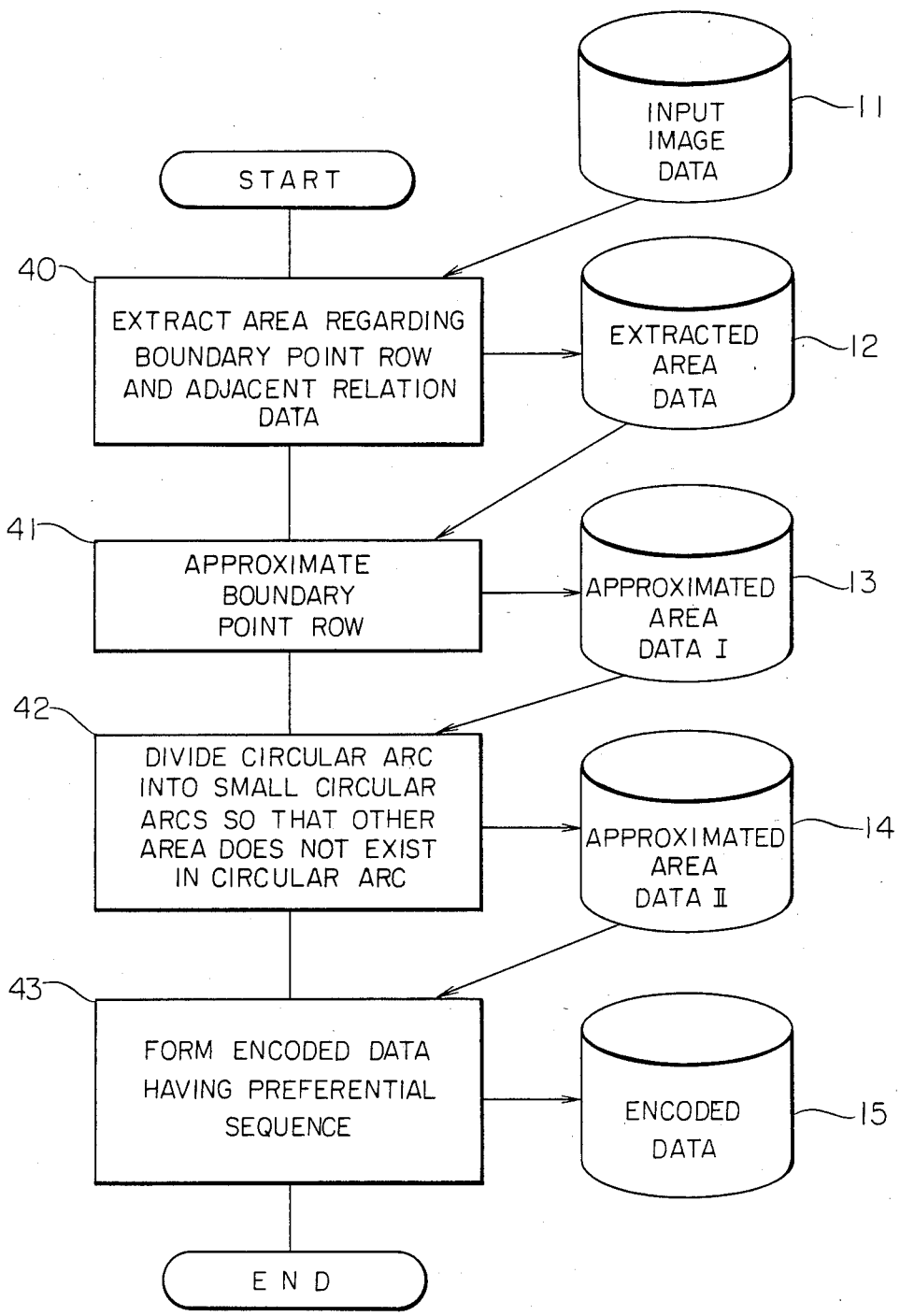

FIG. 20(a)

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 2 | 2 | 2 | 1 | 1 |
| 1 | 1 | 1 | 2 | 2 | 2 | 2 | 1 |
| 2 | 1 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |

FIG. 20(b)

|   |   |   |   |   |   |   |   |
|---|---|---|---|---|---|---|---|
|   |   |   |   |   |   |   |   |
|   |   |   | 1 | 1 | 1 |   |   |
|   |   | 1 | 2 | 2 | 2 | 1 |   |
| 1 |   | 1 | 2 |   |   | 2 | 1 |
| 2 | 1 | 2 |   |   |   |   | 2 |
|   | 2 |   |   |   |   |   |   |
|   |   |   |   |   |   |   |   |

FIG. 20(c)

|   |   |   |   |   |   |   |   |
|---|---|---|---|---|---|---|---|
|   |   |   |   |   |   |   |   |
|   |   |   | 1 | 1 | 1 |   |   |
|   |   | 1 | 2 | 2 | 2 | 1 |   |
| 1 |   | 1 | 2 |   |   | 2 | 1 |
| 2 | 1 | 2 |   |   |   |   | 2 |
|   | 2 |   |   |   |   |   |   |
|   |   |   |   |   |   |   |   |

FIG. 24(a)

| | |
|---|---|
| AREA 1 | ← 51 |
| COLOR VALUE | |
| SEGMENT 1 | ⎫ |
| SEGMENT 4 | ⎬ SEGMENT NAME OF AREA |
| SEGMENT 2 | ⎭ |
| AREA 2 | |
| COLOR VALUE | |
| SEGMENT 1 | |
| SEGMENT 3 | |
| SEGMENT 6 | |
| AREA 3 | |
| COLOR VALUE | |
| SEGMENT 3 | |
| SEGMENT 2 | |
| SEGMENT 5 | |

FIG. 24(b)

| | |
|---|---|
| SEGMENT 1 | ← 52 |
| AREA 1 | ⎫ ADJACENT AREA NAME |
| AREA 2 | ⎭ |
| $(X_{11}, Y_{11})$ | ⎫ |
| $(X_{12}, Y_{12})$ | ⎬ POINT ROW DATA |
| ⋮ | ⎭ |
| SEGMENT 2 | |
| AREA 1 | |
| AREA 3 | |
| $(X_{21}, Y_{21})$ | |
| $(X_{22}, Y_{22})$ | |
| ⋮ | |
| SEGMENT 3 | |
| ⋮ | |

FIG. 25

| |
|---|
| SEGMENT NAME — 53 |
| ADJACENT AREA NAME |
| ADJACENT AREA NAME |
| LINEAR OP-CODE |
| STARTING POINT (X, Y) |
| ENDING POINT (X, Y) |
| CIRCULAR ARC OP-CODE |
| STARTING POINT (X, Y) |
| INTERMEDIATE POINT (X, Y) |
| ENDING POINT (X, Y) |
| LINEAR OP-CODE |
| STARTING POINT (X, Y) |
| ENDING POINT (X, Y) |
| ⋮ |

POLYGONAL SHAPE A4     CIRCULAR ARC A41     CIRCULAR ARC A42

FIG. 45(a)

| LEVEL | 70A | |
|---|---|---|
| | 4 | } NUMBER OF LEVELS |
| 1 | D | |
| 2 | E, F, G | } AREA NAME |
| 3 | H, I, J | |
| 4 | K | |

FIG. 45(b)

| 71A | |
|---|---|
| AREA D | } AREA NAME |
| (XD1, YD1) | |
| (XD2, YD2) | } POINT ROW DATA |
| ⋮ | |
| AREA E | |
| (XE1, YE1) | |
| (XE2, YE2) | |
| ⋮ | |
| AREA G | |
| ⋮ | |
| AREA I | |
| ⋮ | |
| AREA F | |
| ⋮ | |
| AREA J | |
| ⋮ | |
| AREA H | |
| ⋮ | |
| AREA K | |
| ⋮ | |

FIG. 46

| 72A | |
|---|---|
| AREA NAME | |
| LINEAR LINE | } OP-CODE |
| STARTING POINT (X, Y) | } COORDINATES |
| ENDING POINT (X, Y) | DATA |
| CIRCULAR ARC | |
| STARTING POINT (X, Y) | |
| INTERMEDIATE POINT (X, Y) | |
| ENDING POINT (X, Y) | |
| LINEAR LINE | |
| STARTING POINT (X, Y) | |
| ENDING POINT (X, Y) | |
| ⋮ | |

FIG. 53(a)

| 1 | 1 | 1 | 1 | 1 | 1 | 1 | 1 |
|---|---|---|---|---|---|---|---|
| 1 | 1 | 1 | 1 | 1 | 1 | 1 | 1 |
| 1 | 1 | 1 | 2 | 2 | 2 | 1 | 1 |
| 1 | 1 | 1 | 2 | 2 | 2 | 2 | 1 |
| 2 | 1 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |

FIG. 53(b)

| 1 | 1 | 1 | 1 | 1 | 1 | 1 | 1 |
|---|---|---|---|---|---|---|---|
| 1 |   |   | 1 | 1 | 1 |   | 1 |
| 1 |   | 1 | 2 | 2 | 2 | 1 | 1 |
| 1 |   | 1 | 2 |   |   | 2 | 1 |
| 2 | 1 | 2 |   |   |   |   | 2 |
| 2 | 2 |   |   |   |   |   | 2 |
| 2 | 2 | 2 | 2 | 2 | 2 | 2 | 2 |

FIG. 53(c)

|   |   |   |   |   |   |   |   |
|---|---|---|---|---|---|---|---|
|   |   |   | 1 | 1 | 1 |   |   |
|   |   | 1 | 2 | 2 | 2 | 1 |   |
| 1 |   | 1 | 2 |   |   | 2 | 1 |
| 2 | 1 | 2 |   |   |   |   | 2 |
|   | 2 |   |   |   |   |   |   |
|   |   |   |   |   |   |   |   |

FIG. 53(d)

|   |   |   |   |   |   |   |   |   |
|---|---|---|---|---|---|---|---|---|
|   |   |   | 1 | 1 | 1 |   |   |   |
|   |   | 1 | 2 | 2 | 2 | 1 |   |   |
|   | 1 |   | 1 | 2 |   |   | 2 | 1 |
| 2 | 1 | 2 |   |   |   |   | 2 |   |
|   | 2 |   |   |   |   |   |   |   |
|   |   |   |   |   |   |   |   |   |

```
                    ─ 35B
┌─────────────────┐
│     AREA 1      │
├─────────────────┤
│   SEGMENT  1    │⎫
├─────────────────┤⎬ SEGMENT NUMBER OF AREA
│   SEGMENT  4    │⎪
├─────────────────┤⎭
│   SEGMENT  2    │
├─────────────────┤
│     AREA 2      │
├─────────────────┤
│   SEGMENT  1    │
├─────────────────┤
│   SEGMENT  3    │
├─────────────────┤
│   SEGMENT  6    │
├─────────────────┤
│     AREA 3      │
├─────────────────┤
│   SEGMENT  3    │
├─────────────────┤
│   SEGMENT  2    │
├─────────────────┤
│   SEGMENT  5    │
└─────────────────┘
```

FIG. 56

```
                    ─ 34B
┌─────────────────┐
│    SEGMENT 1    │
├─────────────────┤
│     AREA 1      │⎫ ADJACENT AREA NUMBER
├─────────────────┤⎬
│     AREA 2      │⎭
├─────────────────┤
│   (X₁₁, Y₁₁)    │⎫
├─────────────────┤⎪
│   (X₁₂, Y₁₂)    │⎬ POINT ROW DATA
├─────────────────┤⎪
│       ⋮         │⎭
├─────────────────┤
│    SEGMENT 2    │
├─────────────────┤
│     AREA 1      │
├─────────────────┤
│     AREA 3      │
├─────────────────┤
│   (X₂₁, Y₂₁)    │
├─────────────────┤
│   (X₂₂, Y₂₂)    │
├─────────────────┤
│       ⋮         │
├─────────────────┤
│    SEGMENT 3    │
├─────────────────┤
│       ⋮         │
└─────────────────┘
```

FIG. 56 (point row data shown with subscripts): $(X_{11}, Y_{11})$, $(X_{12}, Y_{12})$, $(X_{21}, Y_{21})$, $(X_{22}, Y_{22})$ FIG. 63
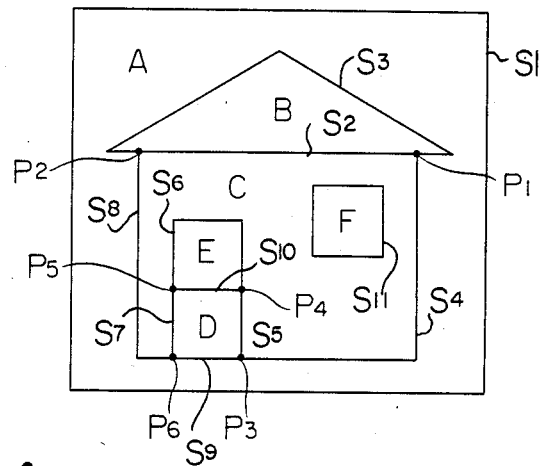
FIG. 64
[Grid figure]
FIG. 65
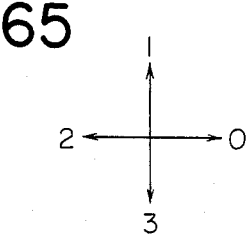

FIG. 66

| | BOUNDARY LINE TRACING START POINT | AREA INFORMATION | PROCESSING |
|---|---|---|---|
| I | NOT BRANCH POINT | NO SEGMENT NAME REGISTERED IN AREA INFORMATION | BOUNDARY LINE TRACING START POINT AS START POINT AND OBTAINED POINT ROW DATA ARE SET AS ONE SEGMENT |
| II | NOT BRANCH POINT | ONE OR MORE SEGMENT NAMES REGISTERED IN AREA INFORMATION | POINT DATA FROM BOUNDARY LINE TRACING START POINT TO INITIAL BRANCH POINT DISCOVERY IS ADDED TO FINALLY EXTRACTED POINT ROW DATA AS ONE SEGMENT |
| III | BRANCH POINT | | FINALLY EXTRACTED POINT ROW DATA IS SET AS ONE SEGMENT |

FIG. 67

| NAME | CONNECTING AREA 1 | CONNECTING AREA 2 | STARTING COORDINATES | POINT ROW (CHAIN CODE) |
|---|---|---|---|---|
| S1 | A | FRAME | 1,1 | 000000000000003333333333333 → 2222222222222211111111 |
| S2 | B | C | 13,8 | 222222222 |
| S3 | B | A | 4,8 | 2101010101030303030303032 |
| S4 | C | A | 13,8 | 333333222222 |
| S5 | C | D | 8,14 | 11 |
| S6 | C | E | 8,12 | 1122233 |
| S7 | C | D | 8,12 | 33 |
| S8 | C | A | 5,14 | 2111111 |
| S9 | D | A | 8,14 | 222 |
| S10 | D | E | 5,12 | 000 |
| S11 | F | C | 10,9 | 00332211 |

FIG. 68

| AREA LABEL | SEGMENT NAME FOR FORMING PROFILE |
|---|---|
| A | S1 |
| B | S2, S3 |
| C | S4, S5, S6, S7, S8, S2 |
| D | S10, S7, S9, S5 |
| E | S10, S6 |
| F | S11 |

| BRANCH POINT COORDINATES | DIRECTION OF SEGMENT FROM BRANCH PT | SEGMENT NAME | DIRECTION OF SEGMENT FROM BRANCH PT | SEGMENT NAME | DIRECTION OF SEGMENT FROM BRANCH PT | SEGMENT NAME |
|---|---|---|---|---|---|---|
| $P_1$ (13, 8) | 2 | S2 | 0 | S3 | 3 | S4 |
| $P_2$ (4, 8) | 0 | S2 | 2 | S3 | 3 | S8 |
| $P_3$ (8, 14) | 0 | S4 | 1 | S5 | 2 | S9 |

IMAGE DESCRIBING APPARATUS

BACKGROUND OF THE INVENTION

The present invention relates to an image describing apparatus capable of describing a coupling area (hereinbelow referred to as an area) of an image in a graphic command of polygonal or arcuate shape, describing a boundary of the areas in a primitive of a straight or linear line or circular arc, and extracting the profile of two-dimensional pattern of a character or a graphic figure.

A conventional apparatus of this type has been heretofore proposed in an article entitled. "Some Experiments in Image Vectorization", Jimenez et al, published in *IBM Journal Research and Development,* Volume 26, Number 6, pages 724–734, November 1983.

FIG. 1 is a diagram of the system construction of a conventional apparatus, FIG. 2 is a flow chart showing the sequence of operations, and FIGS. 3(*a*) and 3(*b*) are tables explaining the rows of profile points. In FIG. 1, reference numeral 20 designates an image input device, numeral 21 designates an image memory, numeral 22 designates a Central Processing Unit (CPU), numeral 23 designates a processing program, numeral 24 designates a working memory, numeral 25 designates an extraction area memory, numeral 28 designates an encoded data memory, and numeral 9 designates a Cathode Ray Tube (CRT) display. In FIG. 2, reference numeral 11 designates input image data, numeral 303 designates binary image data, numeral 304 designates profile point row data, and numeral 15B designates encoded data.

In the conventional example shown in FIG. 2, the CPU 22 reads the multivalue or multicolor input image data 11 stored in the image memory 21 via the image input device 20, separates it into predetermined tones or color units in accordance with the processing program 23, and converts it into binary image data 303 for the respective units in step 300. For example, the CPU inputs the image data 11 with each picture element represented by 8 bits denoting its gray level and encodes each picture element, using two predetermined threshold values to separate the picture elements into three sets representing two different color units, by a single bit value (e.g., representing one color unit with "0" and the other with "1").

Then, in step 301, the CPU extracts the profile points of the area (for example, the area having the value "1") to be extracted from the binary image data 303 obtained in step 300 to represent the boundary of that area. Here, the profile point row means a set of the picture elements disposed at the outermost side of the area of the picture elements belonging to this area as listed in FIG. 3. A method of extracting the profile point row of the binary image data is well known and carried out through the use of a matrix of 2×2 or 3×3.

The CPU inputs the profile point row data 304 obtained in step 301, approximates the profile point row data in a linear primitive, and forms encoded data 15 described in a polygonal graphic command in the respective areas in step 302. This approximation is carried out in the coordinates of the vertices of the polygonal shape within a predetermined allowable tolerance. A number of methods have been heretofore devices, for example, in "Image Processing by Computer", issued by Sanpo Shuppan, written by Takeshi Yasuiin et al, *Electronic Scientific Series* 84, pages 95–96.

It is necessary in this conventional example to describe a curve in the shape of a polygon having a number of vertices. To reduce the allowable error of the approximation when it is desired to approximate a curve, the number of vertices must be large.

FIG. 4 is a view of the system construction of another convention example, FIG. 5 is a flow chart showing the sequence of operations to be performed, and FIGS. 6(*a*) and 6(*b*) are tables outlining the profile of the area. In FIG. 4, reference number 21A designates an image input device, numeral 22A designates an image memory, numeral 23A designates a processing program, numeral 24A designates a CPU, numeral 25A designates a working memory, numeral 26A designates an extraction area memory, numeral 28A designates an image description memory, and numeral 7A designates a CRT display. In FIG. 5, reference numeral 9A designates input image data, numeral 215A designates binary image designates input image data, numeral 215A designates binary image data, numeral 216A designates profile point row data, and numeral 12A designates image description data.

In the conventional example shown in FIG. 5, the CPU 24A reads the multivalue or multicolor image data 9A stored in the image memory 22A via the image input device 21A, separates it into predetermined tones or color units in accordance with the processing program 23A, and converts it into binary image data 215A for the respective units in step 211A. For example, the CPU 24A inputs the image data 9A with each picture element represented by 8 bits denoting its gray level and encodes each picture element, using two predetermined threshold values to separate the picture elements into three sets representing two different color units, by a single bit value (e.g., representing one color unit with "0" and the other with "1").

Then, in step 212A, the CPU 24A extracts the profile point row of the area (for example, the area having the value "1") to be extracted from the binary image data 215A obtained in step 211A to represent the boundary of that area. Here, the profile point row means a set of the picture elements (the profile point row of the outside) disposed at the outermost side of the area of the picture elements belonging to the area and a set of the picture elements (the profile point row of the inside) surrounding an island when the area has an island. A method of extracting the profile point row of the binary image data is well known and carried out through the use of a matrix of 2×2 or 3×3.

The CPU 24A inputs the profile point row data 216A obtained in step 212A and describes the image by approximating the profile point row in a linear primitive in step 213A. This approximation is carried out by approximating the profile point row in the coordinates of the vertices of a polygonal line within a predetermined allowable error. A number of methods have been heretofore devices, for example in the article entitled "Curve Fitting as a Pattern Recognition Problem", Theo Pavlidis, *IEEE Proc.* 6th Int. Conf. Pattern Recogn., pages 853–859, 1982. In the construction of the image description data 12A thus formed, the areas are formed in the tones or color units and described by one approximate profile corresponding to the outside profile and a number of approximate profiles as inside profiles corresponding to the number of islands.

In the conventional example described above, since the area containing islands is described by both the approximate profile corresponding to the outside profile and also by the approximate profile corresponding to the inside profile, and the area representing the island is described by the approximate profile corresponding to the outside profile of the island adjacent to the inside profile of the area containing island, the boundary of the area representing the island is defined by two redundant profiles.

FIG. 7 is a view of the system construction of still another convention example, FIG. 8 is a flow chart showing the sequence of operations in the example, and FIGS. 9(a) through 9(c) explain the problems of the conventional example. In FIG. 7, reference number 21B designates an image input device, numeral 22B designates an image memory, numeral 23B designates a processing program, numeral 24B designates a CPU, numeral 25B designates an extraction boundary memory, numeral 27B designates an image description memory, and number 7B designates a CRT display.

In the conventional example shown in FIG. 8, the CPU 24B reads the multivalue or multicolor image data 9B stored in the image memory 22B via the image input device 21B, separates it into predetermined tones or color units in accordance with the processing program 23B, and converts it into binary image data 215B for the respective units in step 211B. For example, the CPU inputs the image data 9B with each picture element represented by 8 bits denoting its gray level and encodes each picture element, using two predetermined threshold values to separate the picture elements into two sets representing two different colors units, by a single bit value (e.g., representing one color unit with "0" and the other with "1").

Then, in step 212B, the CPU 24B extracts the profile point row of coupling areas (hereinbelow referred to as areas) of the binary image data 215B obtained in step 211B to represent the boundaries of those areas. Here, the profile point row means a set of the picture elements disposed at the outermost side of the area of the picture elements belonging to the area. For example, in the case of the binary image shown in FIG. 5(a), the profile point row of the areas 1 and 2 in FIGS. 9 becomes a set of picture elements as shown in FIG. 53(b). A method of extracting the profile point row of the binary image data is well known and carried out through the use of a matrix of 2×2 or 3×3.

The CPU 24b inputs the data 216B of the profile point row obtained in step 212B and approximates the profile point row in a linear primitive. This approximation is carried out by approximating the profile point row in the coordinates of the vertices of a polygonal line within the predetermined allowable error.

In the conventional example described above, a linear approximation is carried out for the profile point row units of the respective areas, and the relation to the other profile point row contacted as a boundary (FIG. 53(c)) has not been entirely considered. Generally, according to a method of linearly approximating a point row if the points of starting the approximations are different for the same point row, different approximation results are obtained. Therefore, if the linear approximation for the point rows start from point $Q_3$ for the area 1 and from point $Q_4$ for the area 2, the approximation results shown in FIGS. 9(b) and 9(c) are obtained. Thus, the approximation is not carried out by the same polygonal line between the points $Q_1$ and $Q_2$ corresponding to the adjacent boundaries of areas 1 and 2. For example, in the case of indicating the approximation result, a gap is formed in the vicinity of the boundary between the areas 1 and 2.

The conventional technique for extracting the profile of a character or two-dimensional graphic pattern is, for example, disclosed in detail in the article entitled "An Improved Segmentation and Coding Algorithm for Binary and Nonbinary Images", Per-Erik Danielsson, *IBM Journal Research and Development*, Volume 26, Number 6, pages 698–707, November 1982. In order to extract the profile of such a two-dimensional pattern, a conventional apparatus as shown in FIG. 10 is employed. In FIG. 10, reference number 141C designates image data memory means, numeral 142CA designates raster scan type unextracted area detecting means, numeral 143C designates island profile tracing means, numeral 144C designates peripheral area label describing means, numeral 145C designates area profile tracing means, numeral 146C designates extracted area label describing means, numeral 147C designates adjacent unextracted area flag describing means, and numeral 148C designates profile information memory means. Here, the term "area" means a set of coupled picture elements having the same value. An island is an area surrounded by another area as shown in FIG. 71(a). For example, in FIG. 71(a), the area B is the island of the area A, and the areas C, D, and E form the islands of the area A. Further, a boundary line is a line for isolating between a picture element contained in a certain area and another picture element adjacent to the first picture element and contained in another area and is, as shown in FIG. 71(b), 122C which is the boundary line between areas E and F. The profile of an area (or island) means to a description of the shape of that area (or island). For example, in FIG. 71(b), the point row 121C of the picture elements adjacent to the outside of the boundary line 122c, the point row 123c of the picture elements adjacent to the inside of the boundary line 122C or the boundary line 122c between the areas E and F are considered as the profile of the area E and may be used to reproduce the shape of that area.

In the conventional apparatus, a two-dimensional pattern for extracting the profile is first stored in the image data memory means 141C, and the picture element contained in the unextracted area is discovered by raster scanning the abovementioned pattern in the unextracted area detecting means 142C. Then, the unextracted area containing the discovered picture element is judged as to whether it forms an unextracted island of the area scanned immediately before the discover of that picture element or that it is adjacent to another area scanned immediately before the discovery of that picture element, and the two adjacent areas are obtained within the same island. In the former case, the profile of the island containing the area containing the picture element is extracted by the island profile tracing means 143C. At this time, the label name of the area scanned immediately before the discovery of the island is described on the picture element adjacent to the boundary line for forming the profile of the island by the peripheral area label describing means 144C. The profile point row of the obtained island is stored in the profile information memory means 148C. In the latter case, the profile of the area having the discovered image is extracted in the area profile tracing means 145C. At this time, the label name of the area is described on the picture element at the outermost side of that area by the extracted area label describing means 146C. If the picture element adjacent to the boundary line for forming the profile in the scanning direction side is disposed at the outside of the area during the tracing and the label name is not described, the unextracted area flag is attached to the picture element. The raster scanning is assumed to be conducted in the direction shown in FIG. 72, and the operation of the conventional apparatus will be described in detail with reference to the flow chart in FIG. 11 and the pattern examples of FIGS. 12 to 14.

In the pattern in FIG. 12, the label name of the area having a value "0" containing the picture element (1, 1) is A. When a raster is scanned from (1, 1) in the direction specified by FIG. 72, the point (hereinbelow referred to as a varying point) varying the value of the adjacent picture element in the direction of the raster is discovered in the coordinates (2, 3), the point advances in step 1511C in FIG. 11 and traces the island profile. At this time, since the area scanned immediately before the varying point has been discovered, i.e., the area containing the point (1, 3) is A, the label name A is described on the picture element of the outside of the boundary line for forming the profile of the island, as shown in FIG. 11 in step 1512C. Assuming that the profile information is extracted as the point row data of the boundary line represented by a chain code as shown in FIG. 65 in the displacing direction of the boundary line between the areas, the chain 1 in FIG. 13, i.e., the starting point (2, 3), and the displacement, 0, 0, 0, 0, 0, 3, 3, 3, 3, 3, 2, 2, 2, 2, 2, 1, 1, 1, 1, 1, are obtained as the profile information of the island by this tracing. In addition, an unextracted area flag is attached as a mark "o" to the picture element in the island adjacent to the boundary line for forming the profile of the island in the scanning direction side in step 1514C at the island profile tracing time.

When the tracing of the profile of the island is finished and the raster scanning is then started, the picture element (2, 3) attached with the unextracted area flag is immediately discovered, and the profile tracing of a new area containing the varying point (2, 3) is carried out in steps 1504C to 1509C. Assuming that the label name of this new area is B, the label name B is described on the picture element of the profile of the inside of the area of the value "1" containing the picture element (2, 3) in step 1505C (FIG. 14). The unextracted area flag is so described as to attach the mark "o" to the picture elements not described with the label name of the picture elements in the area outside of the boundary line for forming the profile of the area B, i.e., (5, 5), (5, 6), 5, 7). By this area profile tracing, a chain 2 of FIG. 14, i.e., the starting point (2, 3), and the displacement 0, 0, 0, 0, 0, 3, 3, 2, 2, 3, 3, 3, 2, 2, 2, 1, 1, 1, 1, 1 are obtained as the profile of the area B. At this time, the fact that the area B forms the island of the area A and that the profile of the island is the chain 1 is recorded in the profile information memory means 148C. When the profile tracing of the area B is finished, the raster scanning is again started from the picture element (2, 3). Then the varying point is discovered in the picture element (8, 4). The island profile tracing is then conducted, and the profile chain 3 of the island, i.e., the starting point (8, 4), and the displacement 0, 0, 3, 3, 2, 2, 1, 1 are obtained. At this time, the label name or the unextracted area flag is described as shown in FIG. 14 in the pattern. Then, when the area profile is traced from the picture element (8, 4), the profile chain 4 of the area C of a value "3", i.e., the starting point (8, 4), and the displacement 0, 0, 3, 3, 2, 2, 1, 1 are obtained. Then, the fact that the profile of the island in the area for forming the island in the area A of the area C is chain 3 is stored in the profile information memory means (148C). When the raster is again scanned, the picture element with the unextracted area flag is discovered in the picture element (5, 5). The unextracted area flag indicates that the area containing the picture element is scanned immediately before the area, i.e., disposed adjacent to the same island as the area B. Then, the profile of the area containing the picture element is traced. Thus, the chain 5, i.e., the starting point (5, 5) and the displacement 0, 0, 3, 3, 3, 2, 2, 1, 1, 1, are obtained as the profile of the area D of a value "2". Further, the fact that the areas B and D are connected in the same island is stored in the profile information memory means 148C.

As described above, there are obtained point row data of the boundary line for forming the profiles of the areas A, B, C, and D from the two-dimensional pattern in FIG. 12 and a topological connecting relation between the areas as the profile information by the above process.

As also described above, there is a problem in the conventional apparatus in that, since the profile point rows of the areas are extracted and the profile point row is approximated in a linear primitive to describe the area in a polygonal shape, if components of a curve, such as a circular arc, are contained in the profile line of the extracted area, the curve must be described in the polygonal shape having a large number of vertices, and the quantity of data for describing the image increases.

SUMMARY OF THE INVENTION

The present invention is made to solve the above problems and provides an image describing apparatus for describing an area by a graphic command of a polygonal or arcuate shape on the basis of the result of extracting area information of a boundary point row, approximating the extracted boundary point row in a linear primitive or a curve primitive, such as a circular arc, and dividing the curve primitive if another area overlaps the area of a graphic command corresponding to the approximate curve primitive. Thus, encoded data for obtaining a visually smooth image can be formed with less data quantity.

Further, the conventional apparatus has the problem that, since a multivalue or multicolor image is separated into tones or color units and the profile point rows of the area extracted for the respective units are linearly approximated, when an area contains an island, the island will be described by the outside approximate profile of the area containing the island and the inside approximate profile of the island. The island area is thus described twice, and it is necessary to attach information for distinguishing the outide profile from the inside profile, and the quantity of the image description data 12A increases.

This invention is made to solve such a problem and provides an image describing apparatus capable of forming image description data having less data quantity by hierarchically forming the extracted area by considering the adjacent relation between the area and the containing relation when extracting the areas, aligning the areas in the sequence of a hierarchy, and describing the areas only by the outside approximate boundary.

Further, in the conventional apparatus, since the profile point row of an area is extracted as the boundary of that area and is linearly approximated for the profile point row unit without considering the relation between the profile point row and the other profile point rows adjacent to it, there arises a problem that the same approximate result cannot necessarily be obtained in the vicinity of the boundary of the adjacent areas, and misalignment between the areas may occur.

This invention is made to solve such a problem and provides an image describing apparatus for obtaining the same approximate results without misalignment between the adjacent areas by approximating the boundary point row by considering the relationship between the adjacent areas.

Moreover, in the conventional apparatus, when the unextracted area is discovered, the profile of the area is extracted as a series of closed point rows without considering the relationship between the adjacent areas. For example, in FIG. 15, the profiles C1 and C2 of areas A and B are stored as separate point rows in the profile information. Therefore, even though the boundary portion P1P2 designates the same graphic portion for areas A and B, the same graphic portion P1P2 is stored twice as profile information for both areas. Accordingly, the boundary line portion information between any two adjacent areas is stored twice. Thus, the memory capacity of the profile information markedly increases.

An object of the present invention is to solve the above problem and to provide an image describing apparatus capable of forming profile information of the area without storing the point row data twice by segmenting the boundary line of the areas and establishing a correspondence between the segments and other areas having those segments as part of their profile.

The image describing apparatus according to an aspect of the present invention comprises means for extracting boundary point row data of an image, means for approximating the extracted boundary point row in a linear primitive or curve primitive of a circular arc, means for dividing a curve primitive so that no other area overlaps the area of a graphic command corresponding to the divided primitive if another area overlaps the area of the graphic command corresponding to the approximate curve primitive, and means for converting the approximate boundary obtained, by using the above means, into a graphic command of a polygon or circular arc, and setting a priority to the command to form encoded data.

According to the present invention, encoded image data is described in graphic commands of polygonal or circular arc shape by approximating extracted boundary point rows as linear primitives or curve primitives of a circular arc and dividing the curve primitive so that no other area overlaps the area of a graphic command corresponding to the dividid primitive if another areas overlaps the area of the graphic command corresponding to the undivided approximated curve primitive.

An image describing apparatus according to another aspect of the present invention comprises means for extracting a boundary point row of an area for forming an image, means for forming hierarchical data for areas, detecting adjacent areas and containing relations between the areas, and means for approximating the extracted boundary point row in a linear or curve primitive.

According to the present invention, the area extracted by detecting the adjacent areas and containing relations between the areas is formed in a hierarchy, the boundary of the areas is approximated in a linear or curve primitive, and the area including an island is described only by the approximate boundary of the outside.

An image describing apparatus according to still another aspect of the present invention comprises means for extracting the portion of the divided boundary by segmenting the boundary point row of an area (where the term segmentation denotes a process for dividing the boundary into adjacent area units when a plurality of other areas are disposed adjacent to one area, and the term denotes a portion of the divided boundary), means for forming information for establishing a correspondence between a segment and the areas divided by the segment, and means for approximating the segment extracted as the point row as a linear or curve primitive.

According to the present invention, the boundary of an area is extracted and segmented, information for establishing a correspondence between the extracted segment and the area divided by the segment is formed, and the same approximated result is obtained between the adjacent areas by the information and the boundary approximated in the segment unit.

An image describing apparatus according to still another aspect of the present invention comprises an image memory for storing an image to be extracted for the profile, means for detecting a boundary line for dividing an area forming an image stored in the image memory, means for detecting a branch line of the boundary line by tracing the boundary line, and means for establishing a correspondence between the boundary line between the branch lines, i.e., between the segments, and areas having those segments as part of their profile, thereby storing a boundary line portion information only once.

According to the present invention, the branch line of the boundary line connected with three or more areas is detected, and a "segmentation" for dividing the boundary line at every branch is conducted.

Further, the segment is part of the boundary line between areas, i.e., there are two areas having one segment as part of the profile. Means for establishing a correspondence between the segment and the area having the segment as part of the profile operates to refer the point row data extracted and stored only as a set to each of the two areas having a set of the extracted and stored point row data as part of the profile of the point row.

BRIEF DESCRIPTION OF THE DRAWINGS

FIGS. 3(a) and 3(b) are views for explaining a profile point row;

FIGS. 6(a) and 6(b) are views for explaining a profile of an area;

FIGS. 12-15 are explanatory views showing a two-dimensional pattern for explaining the operation of conventional examples;

FIG. 19 is a flow chart showing the process for encoding input image data into a graphic command;

FIGS. 20(a)-20(c) are views for explaining the extracted boundary point row;

FIGS. 24(a) and 24(b) are views for showing the data configuration of the extracted area data;

FIG. 25 is a view showing the data configuration of approximated area data I and approximated area data II;

FIGS. 45(a) and 45(b) are views showing the data configuration of the extracted area data;

FIG. 46 is a view showing the data configuration of approximated data and image description data;

FIGS. 53(a)-53(d) are views for describing the extracted boundary point row;

FIG. 55 is a view showing the data configuration of the area data;

FIG. 56 is a view showing the data configuration of the segment data I;

FIGS. 63-72 are explanatory views for explaining still another embodiment of the invention wherein FIGS. 63, 64, 69(a)-69(d), 71(a), and 71(b) are views showing a two-dimensional pattern, FIG. 65 is a view showing a directional convention for chain codes, FIG. 66 shows processes of three types, FIG. 67 shows segment information, FIG. 68 shows area information; FIG. 70 shows a branch list, and FIG. 72 shows the direction of raster scanning.

DESCRIPTION OF THE PREFERRED EMBODIMENTS

Figure 16:
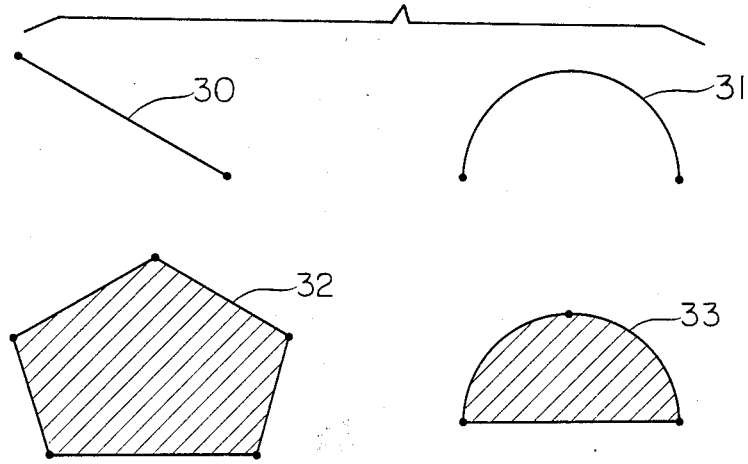
FIG. 16 is a view showing primitives and graphic commands.

FIG. 16 is a view showing a primitive and a graphic command. Reference numeral 30 designates a linear primitive, numeral 31 designates a circular arc curve primitive, numeral 32 designates a polygonal graphic command, and numeral 33 designates an arcuate graphic command.

In FIG. 16, a linear primitive 30 and a circular arc curve primitive 31 are, respectively, a line segment and a portion of a circle. The primitives 30 and 31 are used, separately or in combination, to approximate boundary point rows in the manner described below. a polygonal graphic command 32, formed of a polygonal group of linear primitives and the areas the linear primitives bound, and an arcuate graphic command 33, formed of the circular arc primitive 31, a chord connecting end points of the primitive 31 and the area the arc and the chord bound, are used for describing an area of an image in the formation of encoded data to be described later. The present invention describes areas of video images with graphic commands that reproduce the areas of the images. The polygonal graphic command comprises the surface area bounded by the polygonal shape and the chord in the description to be described below. The arcuate graphic command corresponding to the curve primitive comprises the surface area bounded by the curve primitive and a line segment corresponding to the chord of the curve.

Figure 17:
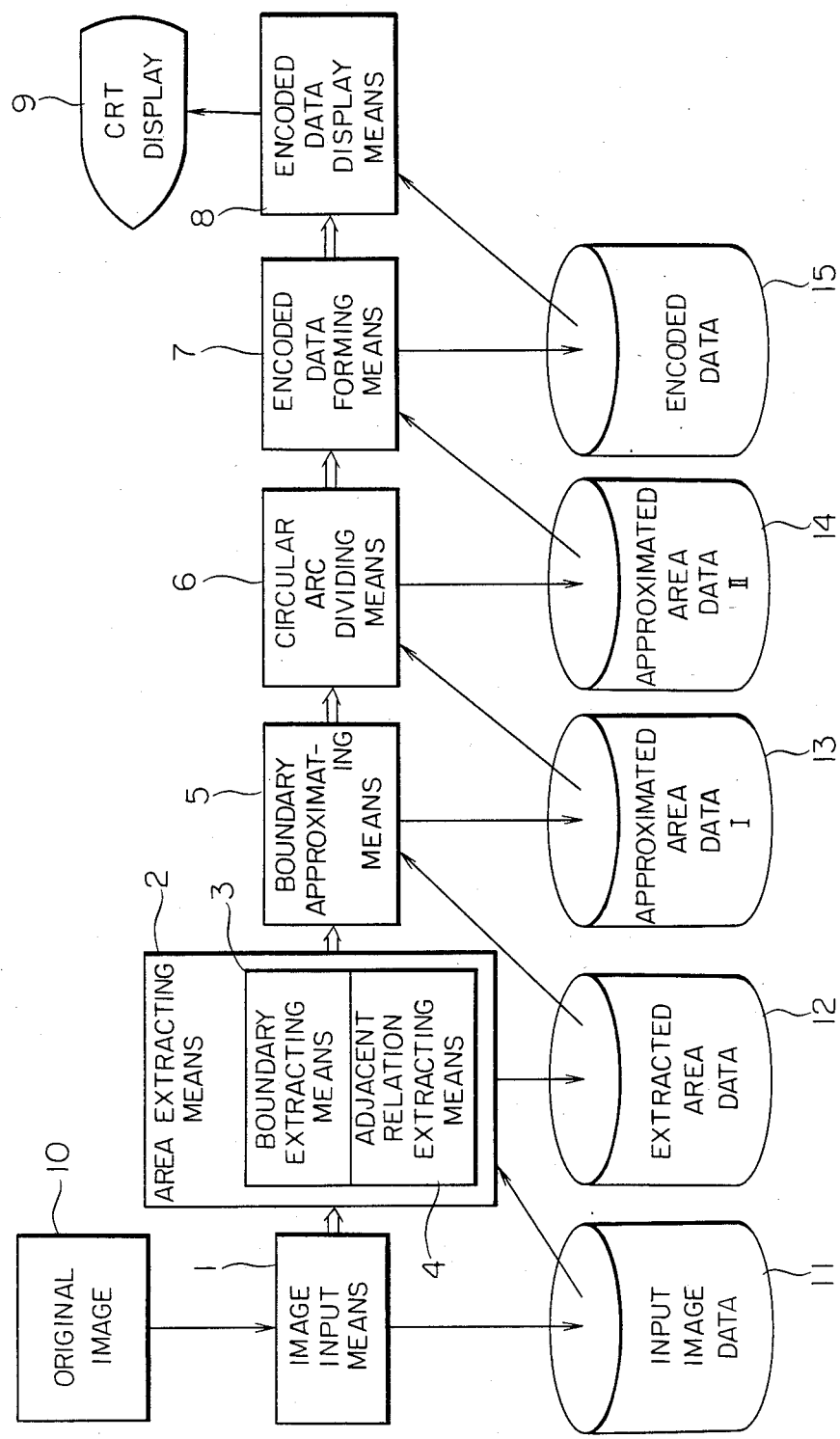
FIG. 17 is a view of the entire construction of an embodiment of an image describing apparatus according to the present invention.

FIG. 17 is a view showing the entire construction of a first embodiment of an image describing apparatus according to the present invention. Reference numeral 1 designates image input means, numeral 2 designates area extracting means, numeral 3 designates boundary extracting means, numeral 4 designates adjacent relation extracting means, numeral 5 designates boundary approximating means, numeral 6 designates circular arc dividing means, numeral 7 designates coded data forming means, numeral 8 designates coded data display means, numeral 9 designates a CRT display, numeral 10 designates an original image, numeral 11 designates input image data, numeral 12 designates extracted area data, numeral 13 designates approximate area data I, numeral 14 designates approximate area data II, and numeral 15 designates endoded data.

The first embodiment shown in FIG. 17 converts the original image 10 into a multivalue or multicolor digital image by the input means 1 to form input image data 11, extracts the boundary point row of an area from the input image data 11 by the boundary extracting means 3 of the area extracting means 2, extracts an adjacent relation between the areas by the adjacent relation extracting means 4 of the area extracting means 2 to form extracted area data 12, approximates the boundary point row of the extracted area data 12 by linear primitive 30 and circular arc primitive 31 via the boundary approximating means 5 to form approximated area data I 13, divides the circular arc curve primitive so that no other area overlaps the areas of the circular arc graphic commands 33 corresponding to the divided circular arc curve primitives 31 when another area overlaps the area of the circular arc graphic command 33 corresponding to the undivided curve primitive 31 approximated by the circular arc dividing means 6 to form the approximated area data II 14, converts the approximated boundary into polygonal command 32 and circular arc command 33 by considering the preferential sequence by encoded data forming means to form encoded data 15, and displays the content of the encoded data 15 by the encoded data display means 8 on the CRT display 9.

Figure 18:
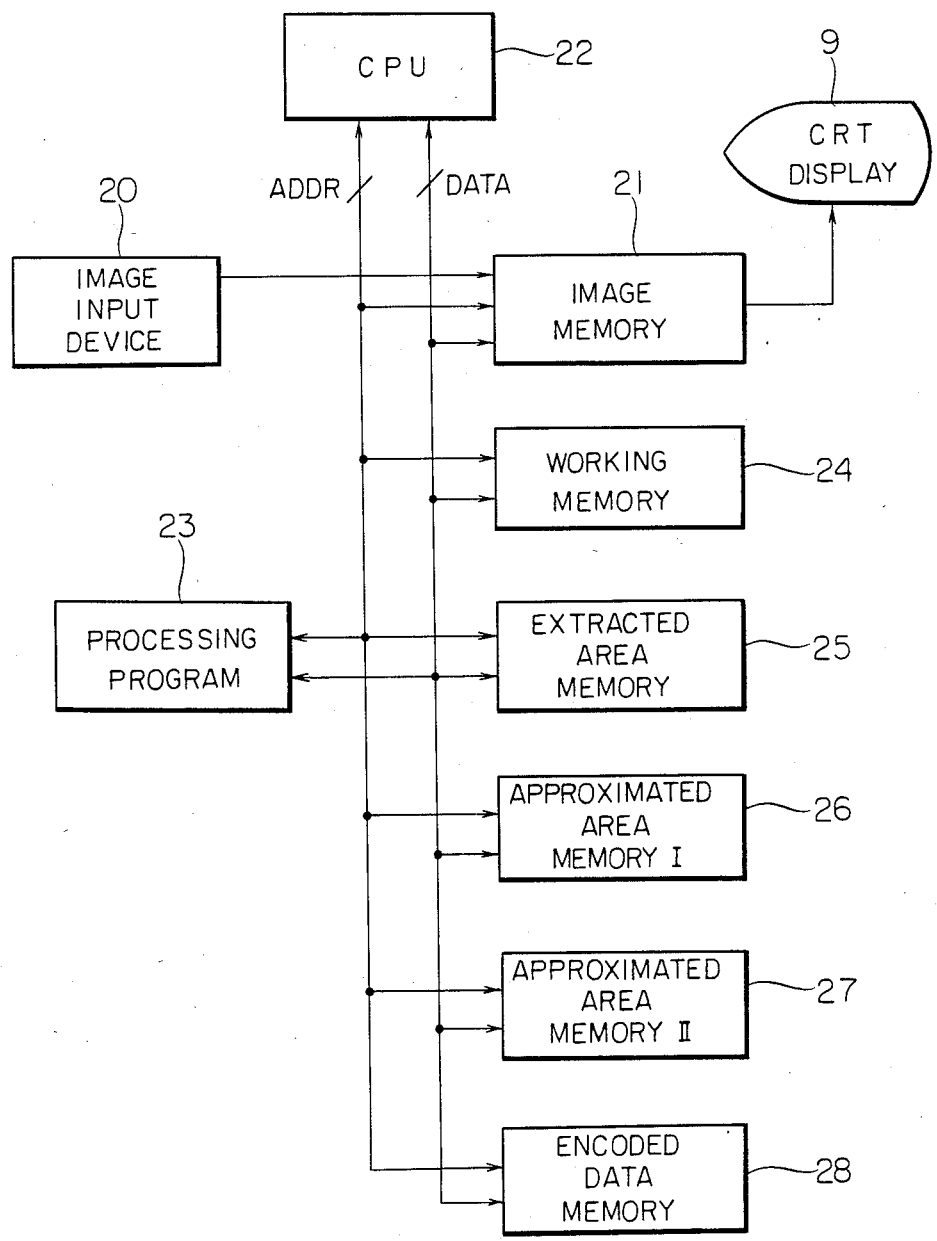
FIG. 18 is a view of the system construction of the embodiment according to the present invention.

FIG. 18 is a view of the system construction of the first embodiment. Reference numeral 9 designates a CRT display, numeral 20 designates an image input device, numeral 21 designates an image memory, numeral 22 designates a CPU, numeral 23 designates a processing program, numeral 24 designates a working memory, numeral 25 designates an extracted area memory, numeral 26 designates an approximated area memory I, numeral 27 designates an approximated area memory II, and numeral 28 designates an encoded data memory.

In FIG. 18, the image input device 20 includes an image input unit, such as a television camera or an image scanner, and a signal converter for converting the input image signal into a signal to be stored in the image memory 21. The input image data 11 are stored as a multicolor digital image in the image memory 21. The image memory 21 is formed of a random access memory (RAM) to store the input image data 11 and can be used as a working area for setting a flag in an area extracting process, to be described later, or can display the content of the image memory 21 on the CRT display 9. The CPU 22 executes a process to be described later with respect to FIG. 19 according to the content of the processing program 23. The working memory 24 stores intermediate data when processing in the CPU 22. The extracted area memory 25, the approximated area memory I 26, the approximated area memory II 27, and the encoded data memory 28 store the extracted area data 12, the approximated area data I 13, the approximated area data II 14, and the encoded data 15, respectively, and are formed of rewritable memory, such as a RAM or a Winchester disk. The obtained encoded data 15 are converted into raster data by the CPU 22 or a graphic processor, not shown, stored in the image memory 21, and displayed on the CRT display 9.

FIG. 19 is a flow chart showing a process for encoding the input image data 11 into a graphic command in the first embodiment and second and third embodiments to be described later. Reference numeral 11 designates input image data, numeral 12 designates extracted area data, numeral 13 designates approximated area data I, numeral 14 designates approximated area data II, and numeral 15 designates encoded data.

Figure 29A:
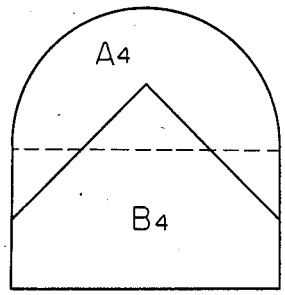
FIGS. 29(a)-29(c), 30(a), and 30(b) are views for explaining the dividing process of a circular arc primitive and an or arcuate graphic command.
Figure 29B:
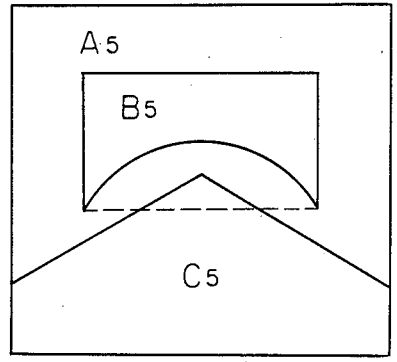
Figure 29C:
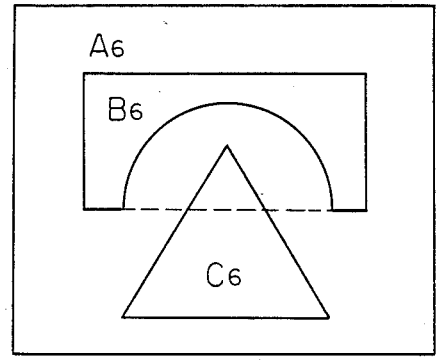
Figure 30A:
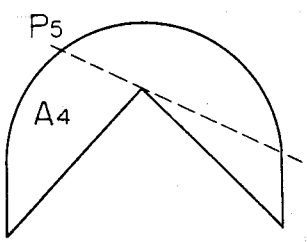
Figure 30B:
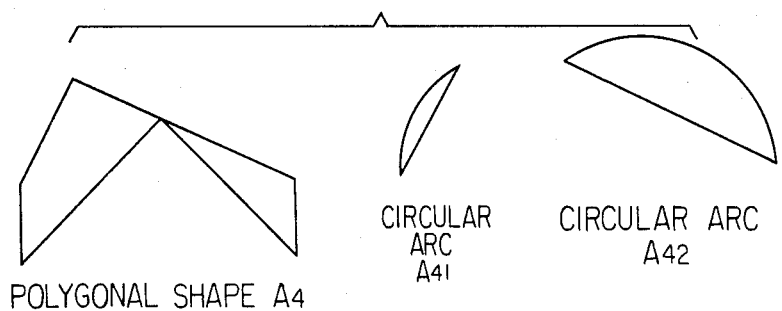
Figure 31:
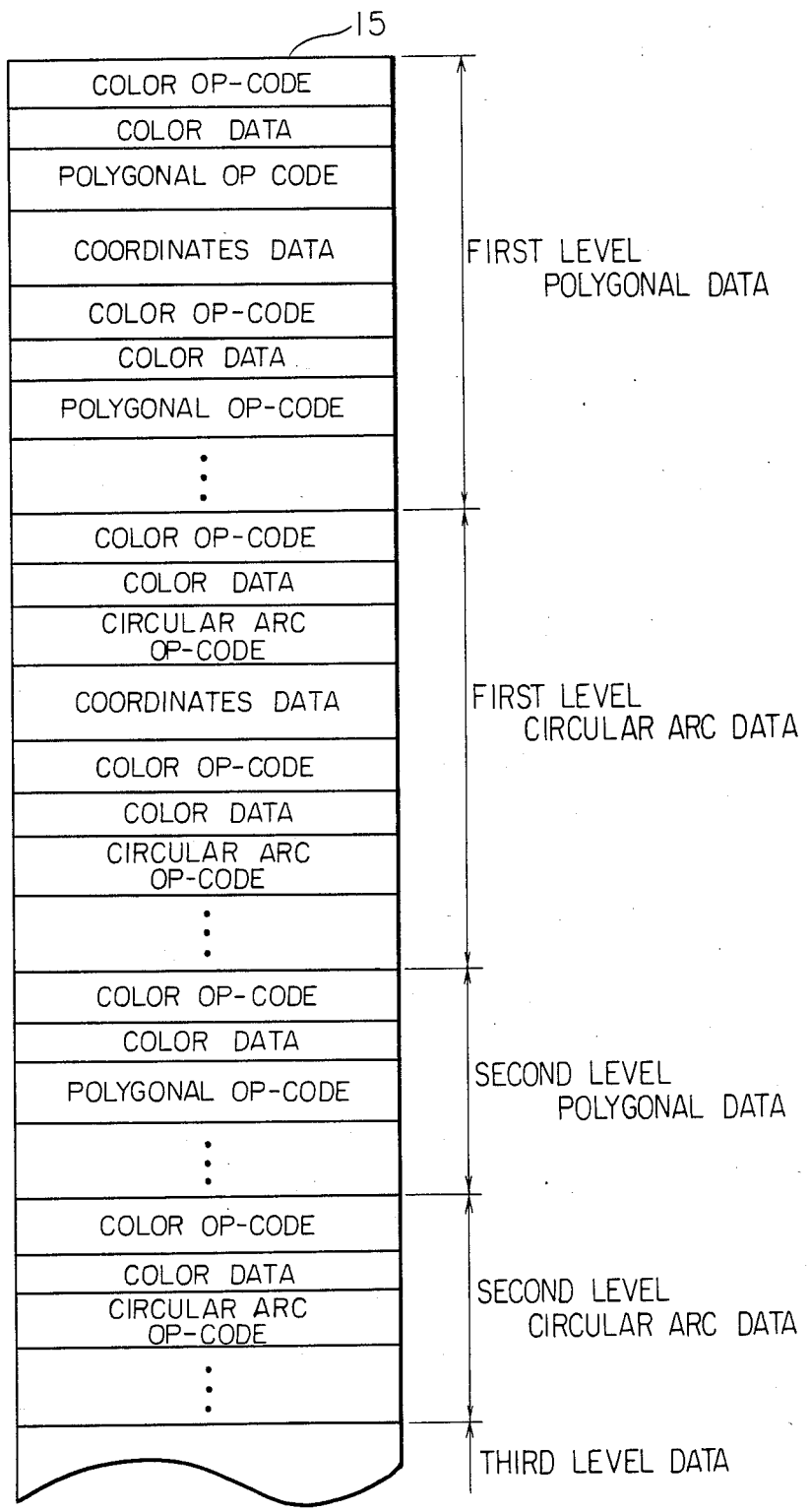
FIG. 31 is a view showing the data configuration of the encoded data.

FIGS. 20–31 are views for supplementing the description of FIG. 19. FIGS. 20(a)–20(c) are views for explaining the extracted boundary point rows, FIGS. 21(a) and 21(b) are views explaining boundary extraction and segmentation, FIGS. 22(a)–22(d) are views explaining area extraction and boundary approximation of an image having an island, FIGS. 23(a) and 23(b) are views explaining the data configuration of extracted area data 12, FIGS. 24(a) and 24(b) are views explaining the data configuration of extracted area data 12, FIG. 25 is a view showing the data configuration of approximated area data I 13 and approximated area data II 14, FIGS. 26(a)–26(c), 27(a), 27(b), 28(a), and 28(b) are views explaining the process for forming the encoded data, FIGS. 29(a)–29(c), 30(a), and 30(b) are views explaining the process of dividing the circular arc, and FIG. 31 is a view showing the data configuration of the encoded data 15.

Figure 21A:
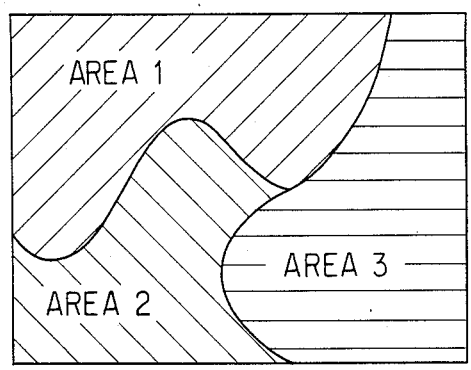
FIGS. 21(a) and 21(b) are views for explaining the extracting of the boundary and the segmentation.
Figure 21B:
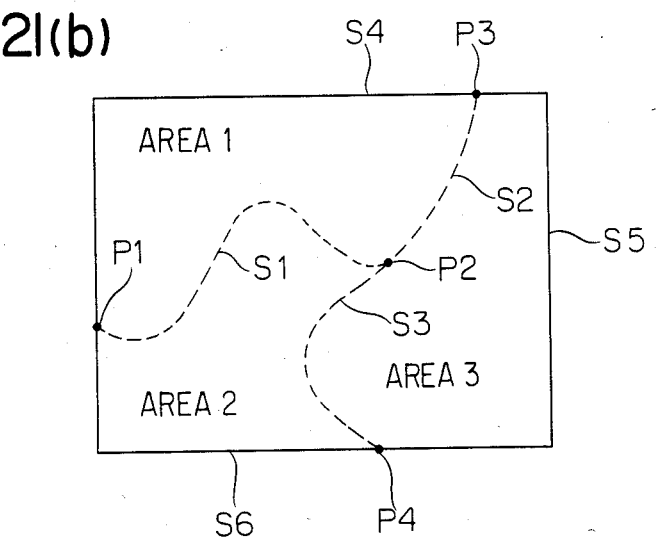

In step 40 of FIG. 19, the boundary point row of the input image 11 is segmented and extracted, and adjacent relation data between the areas forming the image are extracted. According to the first embodiment and in contrast to the profile point row extracted in the conventional example, the boundary point row is extracted as the lattice line of a digital lattice disposed between the profile point rows of adjacent areas. For example, in the case of two areas 1 and 2 shown in FIG. 20(a) with part of the profile point row of areas 1 and 2 shown in FIG. 20(b), the point row on the lattice line of the digital line disposed between the profile point rows shown by the marks "o" and the thick solid lines in FIG. 20(c) are extracted as the boundary point row. Therefore, the same point row is given as the boundary of both of the adjacent areas. The term segmentation denotes a process for dividing the boundary into adjacent units when a plurality of areas are adjacent, and the portions of the divided boundary are called "segments". In the image shown in FIG. 21(a), six segments $S_1$ to $S_6$ shown in FIG. 21(b) are extracted, and the segment $S_1$, for example, becomes a boundary for partitioning areas 1 and 2. Note that the boundary line separating area 3 from areas 1 and 2 is segmented to segments $S_2$ ad $S_3$, respectively.

Figure 1:
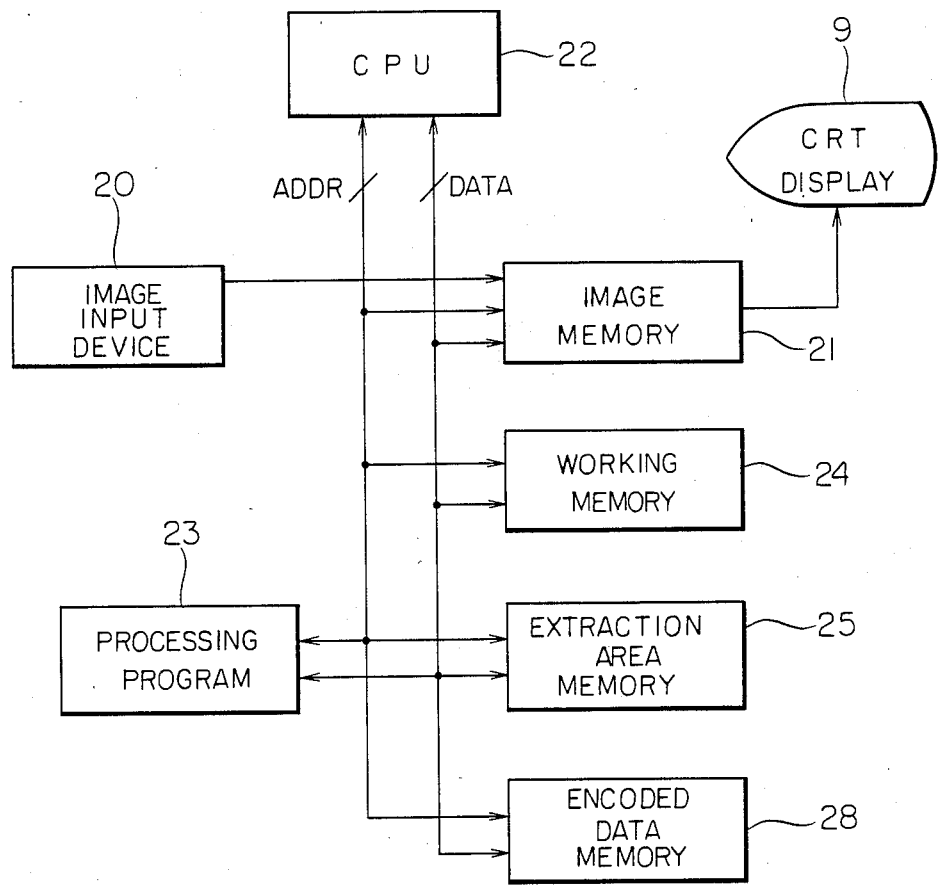
FIG. 1 is a view of the system construction of a conventional example.
Figure 2:
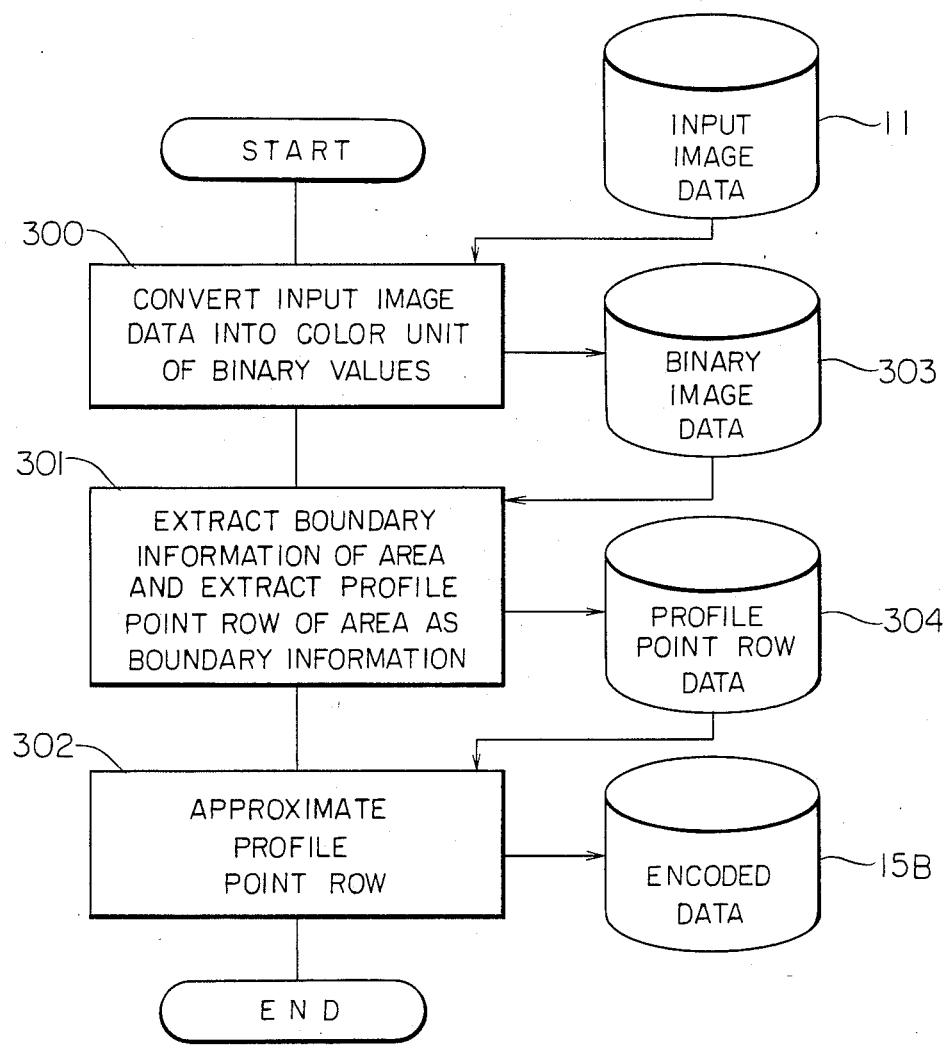
FIG. 2 is a flow chart showing the sequence of operations in the conventional example of FIG. 1.
Figure 4:
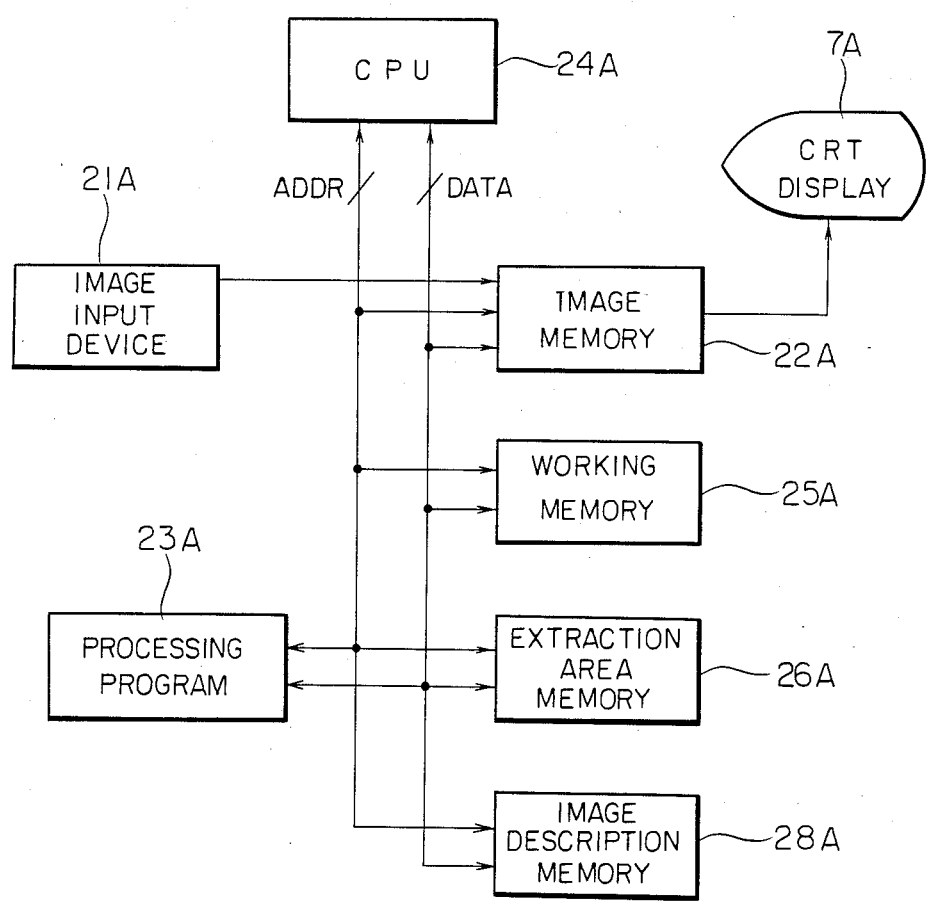
FIG. 4 is a view of the system construction of another conventional example.
Figure 5:
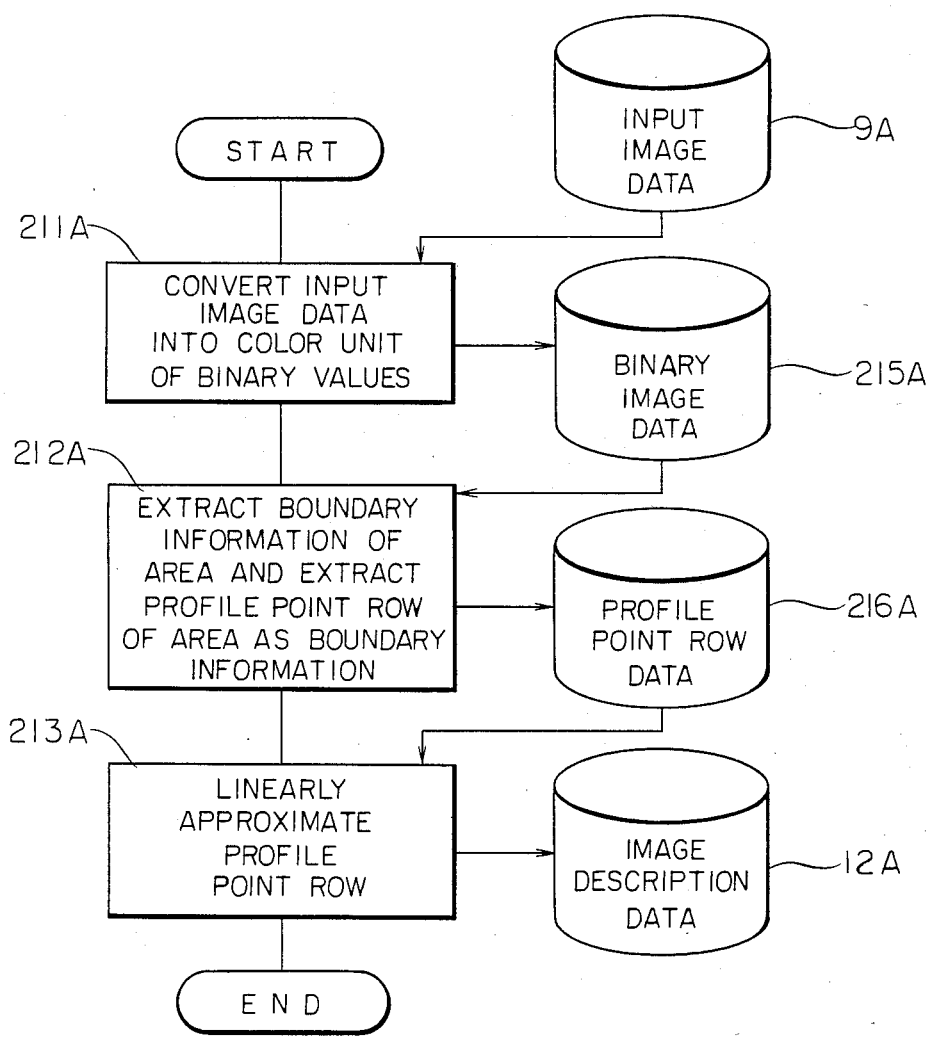
FIG. 5 is a flow chart showing the sequence of operations in the conventional example of FIG. 4.
Figure 7:
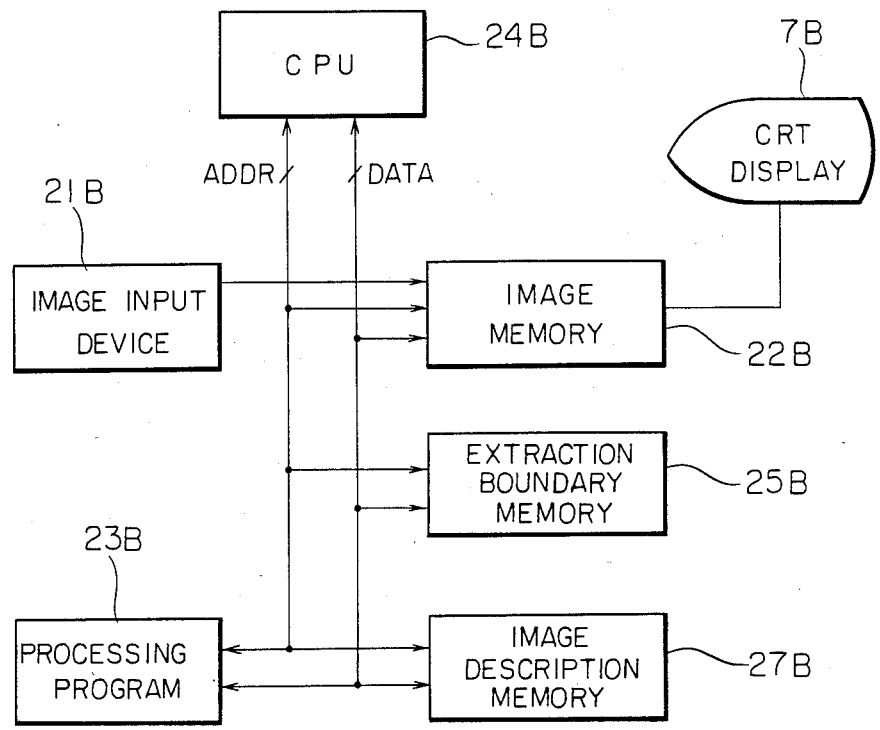
FIG. 7 is a view of the system construction of still another conventional example.
Figure 8:
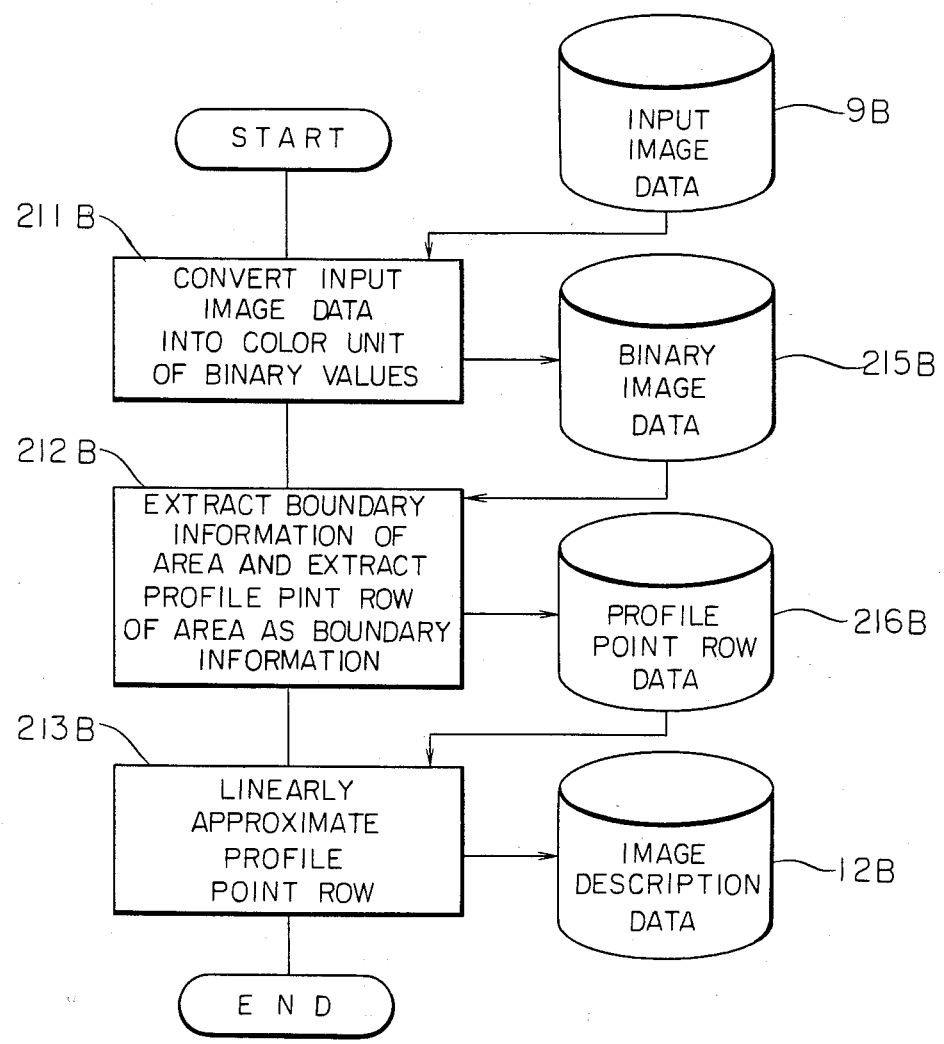
FIG. 8 is a flow chart showing the sequence of operations in the conventional example of FIG. 7.
Figure 22A:
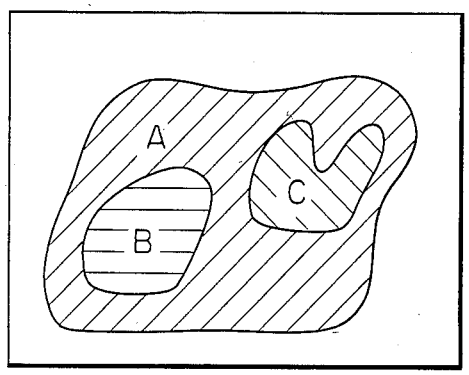
FIGS. 22(a)-22(d) are views for explaining the extraction of the area of an image containing an island and the approximation of the boundary.
Figure 22B:
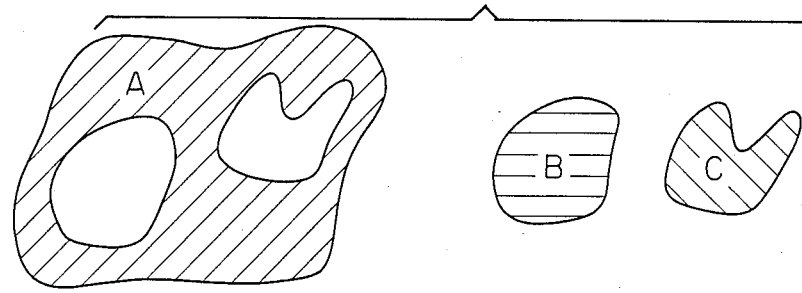
Figure 22C:
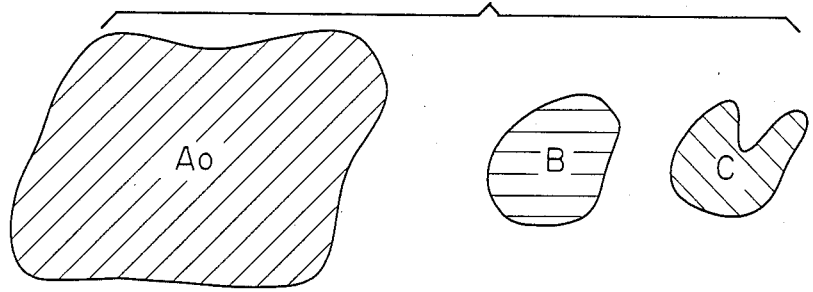
Figure 23A:
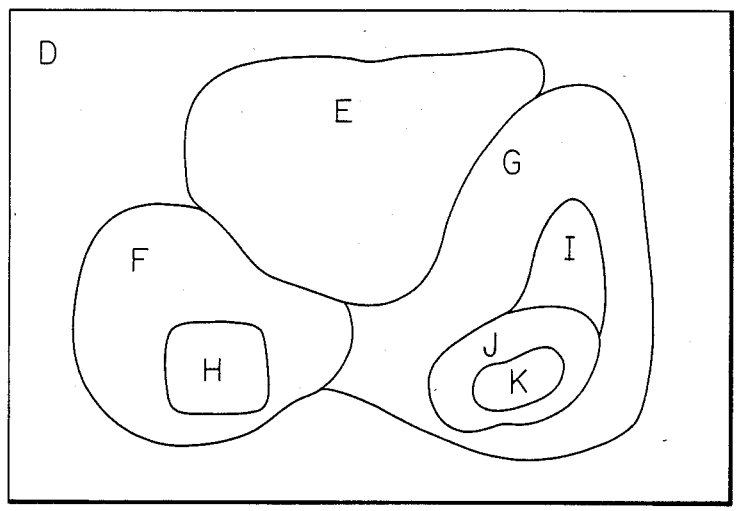
FIGS. 23(a) and 23(b) are views for explaining adjacent relation data between the areas.
Figure 23B:
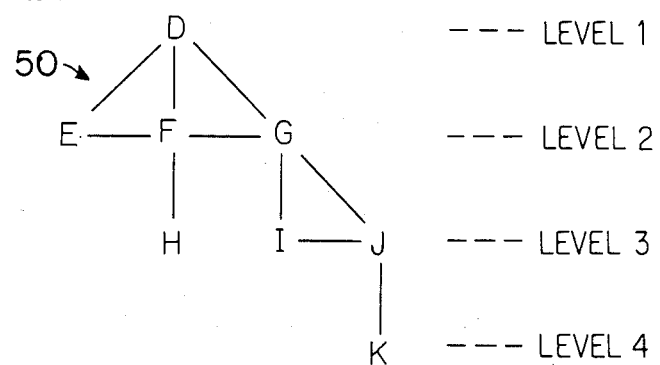

When an area has islands, such as the area A (two islands) in FIG. 2(b), the area A is considered as an area Ao shown in FIG. 22(c), and only the outside boundary is extracted as the boundary of the area A. Then, the adjacent and containing relations between the areas are extracted as adjacent relation data. In the image shown in FIG. 23(a), an area D contains areas E to K as island. Because area D is disposed at the lowest level, it is designated level 1 in FIG. 23(b). Since areas E, F, and G are at the lowest level of the areas contained in the island, they are designated level 2. In addition, information defining how areas are adjacent to one another is obtained, and the adjacent relation data 50 as shown in FIG. 23(b) are formed. In FIG. 23(b) a link between two areas at different levels indicates that the area at the lower level contains the area at the higher level as an island, whereas a link between areas at the same level indicates that those areas are adjacent to one another.

Figure 32:
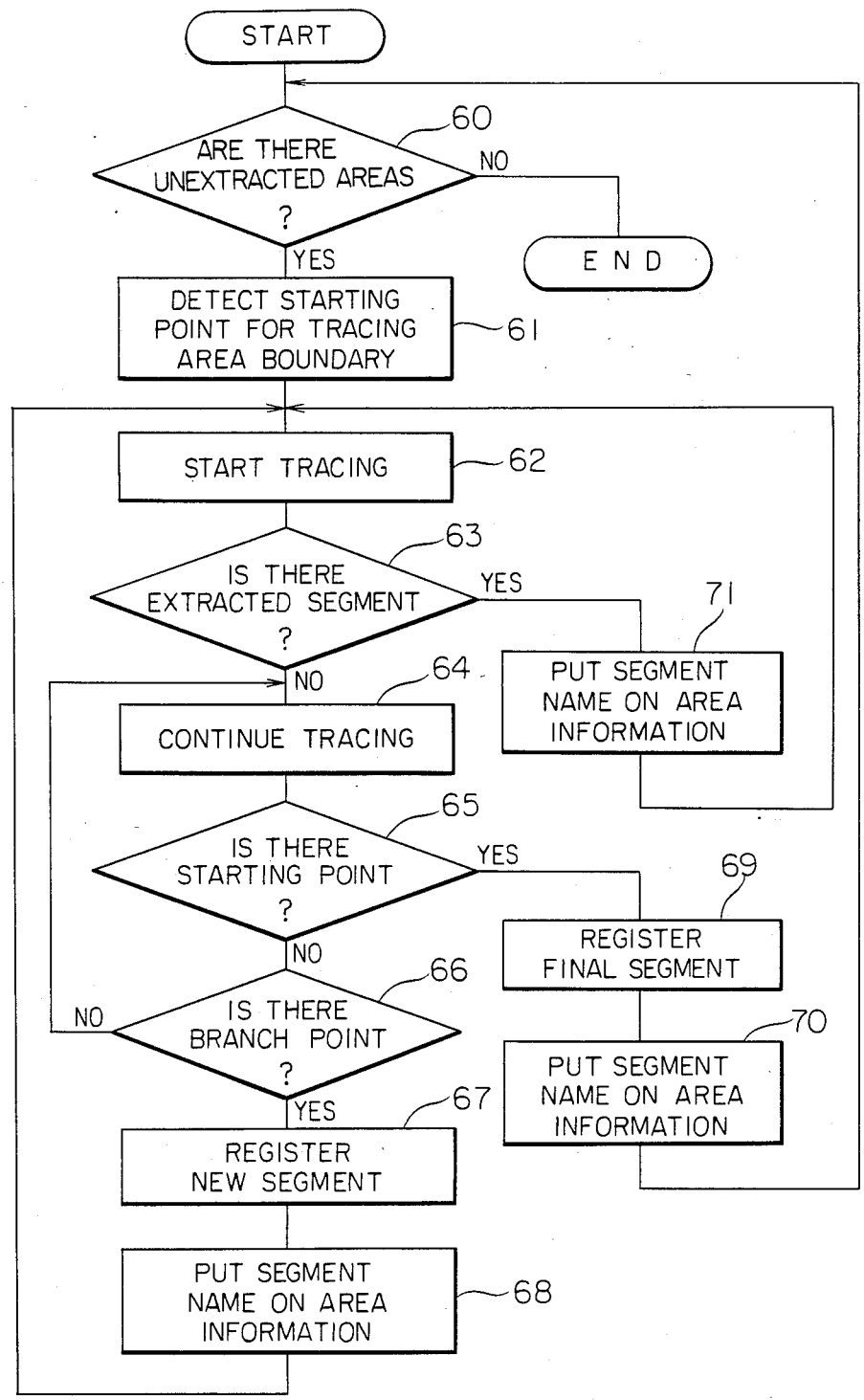
FIG. 32 is a flow chart showing a method of processing step 40 of FIG. 19.

The processing sequence of step 40 will be described with reference to FIG. 32. The adjacent relation data 50 described with respect to FIG. 23, the area data 51 of the data configuration shown in FIG. 24 (a), and the point row segment data 52 shown in FIG. 24(b) are formed as extracted area data 12 by this processing. In FIG. 24(a), the area data 51 have an area name, color value or tone value for the area, and a segment name for forming the area. In FIG. 24(b) the area data 52 have a segment name, area names of adjacent areas partitioned by the segment, and point row data of the segment. The point row data are stored in the format of chain code due to coordinates information or data compression of the points.

In step 41, the embodiment inputs the point row segment data 52 of the extracted area data 12 obtained by the process of step 40, approximates the point row segment via the linear primitive 30 or the circular arc primitive 31, and stores the resulting data in the approximated area data I 13. The areas shown in FIG. 22(c) are, for example, approximated by the processing shown in FIG. 22(d). The approximated area data I 13 have the above adjacent relation data 50, the area data 51, and the approximated segment data 53 in the data configuration shown in FIG. 25. The approximated segment data 53 have a segment name, adjacent area name(s), an Op-code representing the linear primitive 30 or the circular arc primitive 31, the coordinates of the starting and ending points in a linear primitive 30, and the coordinates of the starting, intermediate, and ending points in a circular arc primitive 31.

A number of methods have been proposed for approximating the point row via the linear primitive 30 and the circular arc primitive 31 in the same manner as the approximation via the linear primitive 30 of the point row described in the conventional example set forth in the aforementioned IEEE article. In step 41 of the first embodiment, any of these methods may be performed. Therefore, the description of these will be omitted.

In step 42, when other areas overlap the area of the circular arc command 33 corresponding to the circular arc primitive 31 of the approximated segment, the circular arc primitive 31 is divided so that no other areas overlap the area of the circular arc command 33 corresponding to the divided circular arc primitive. The result is stored in the approximated area data II 14. The approximated area data II 14 have the above adjacent relation data 50, the area data 51, and the approximated segment data 53. However, the difference between the approximated segment data 53 stored in approximated area data II and the approximated segment data 53 stored in approximated area data I 13 is that the approximate segment data stored in approximated area data II 14 contain data of the divided circular arc primitives 31.

A method of dividing will be described with respect to Figures 33 and 34.

In step 43, the embodiment inputs the approximated area data II 14 obtained in step 42, converts the approximated boundary into a polygonal command 32 or a circular arc command 33, and describes the image in a graphic command by considering the preferential sequence in the display of the respective commands to form the encoded data 15. The preferential sequence in the display has two types of priority orders.

The first preferential sequence is a priority order of an image containing an island shown in FIG. 22. The area A in FIG. 22 has two islands, and the graphic commands used to describe the image in this invention (polygonal command 32 and circular arc command 33) cannot define the island therein as shown in FIG. 16. Accordingly, in the first embodiment the area is described in a graphic command on the basis of the approximated result of the outside boundary of the area, i.e., the area A is described by considering the area Ao which does not have the island shown in FIG. 22(c), and the encoded data 15 displayed in the graphic command corresponding to the area having a lower level are formed with reference to the adjacent area data 50 obtained in step 40.

Figure 26A:
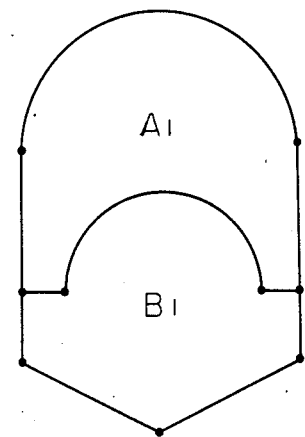
FIGS. 26(a)-26(c), 27(a), 27(b), 28(a), and 28(b) are views for explaining the encoding process of the data.
Figure 26B:
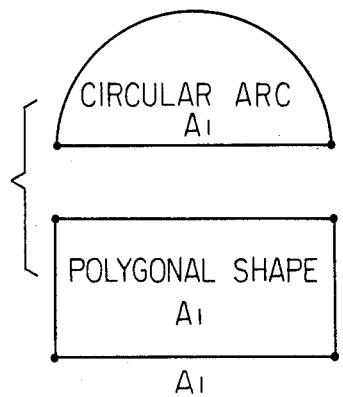
Figure 26C:
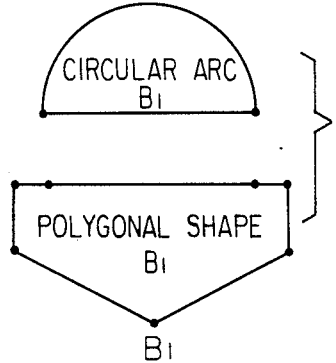

The second preferential sequence is a priority order of graphic commands in the same level, generated to describe the image with polygonal commands 32 and circular arc commands 33. For example, in FIG. 26(a) the area $B_1$ includes one circular arc primitive 31 in the boundary and can be described by the circular arc command $B_1$ corresponding to the circular arc primitive 31 and the polygonal command $B_1$ having six chords of the linear primitives. On the other hand, the area $A_1$ has two circular arc primitives 31 and four linear primitives 30 as a boundary, one circular arc primitive 31 is a convex circular arc with respect to the area A, and the other primitive is a concave circular arc with respect thereto. The circular arc command $A_1$ shown in FIG. 26(b) corresponds to the convex circular arc primitive 31, and the circular arc command $B_1$ of the area $B_1$ corresponds to the concave circular arc primitive. Therefore, when the image is described with the circular arc command 33, the problem is how to describe the concave circular arc primitive 31. In the first embodiment, area A is described by one polygonal command 32 having the chords of the linear primitive 30 and a circular arc command 33 corresponding to the convex circular arc primitive 31. The concave circular arc primitive 31 is not considered in the area A and is considered in the description of the area B where the concave circular arc primitive becomes convex. After the polygonal command 32 of the area A is displayed, the circular arc graphic command 33 of the area of area B is displayed. For example, in FIG. 26 the areas $A_1$ and $B_1$ are described as shown in FIGS. 26(b) and 26(c), and the circular arc command $B_1$ is displayed after the polygonal command $A_1$ is displayed, i.e., the circular arc $B_1$ is superposed on the polygonal shape $A_1$. When the above preferential sequence is considered as the area unit, for example, when the convex circular arc primitives 31 of some areas become concave circular arc primitives 31 of other areas, such as areas $A_2$ and $B_2$ in Figures 27(a), a decision as to which areas are preferentially displayed must be made. According to the first embodiment, polygonal commands 32 are displayed first and the circular arc commands 33 are displayed later. For instance, in FIG. 27(a) the polygonal commands $A_2$ and $B_2$ are displayed first and the circular commands $A_2$ and $B_2$ are displayed later as shown in FIG. 27(b). When a concave circular arc primitive 31 is part of the boundary of an island, the area surrounding the island for which the concave circular arc primitive is a convex circular arc primitive 31 becomes the area lower by one level to the island. Thus, when describing an island, the circular arc command 33 corresponding to the concave circular arc primitive 31 is used. For example, in FIG. 28(a) the area $B_3$ is described by a polygonal graphic command $B_3$ and a circular arc graphic command $A_3$ having the same color or tone value as that of the area $A_3$ and corresponding to the concave circular arc primitive 31, and the polygonal graphic command $A_3$, the polygonal command $B_3$, and the circular arc command $A_3$ are displayed in the sequence shown in FIG. 28(b). In this case, the color value or the tone value of the circular arc command $A_3$ is decided with reference to the adjacent relation data 50 and by searching for the area surrounding the island When encoding the second preferential sequence when no other areas exist in the circular arc command 33 corresponding to a circular arc primitive 31, the image can be correctly described by the polygonal commands 32 and the circular arc commands 33 as described above. If other areas overlap a circular arc graphic command 33 (shown by chords of solid line and broken line in the drawings) as shown in FIGS. 29(a) to 29(c), a portion of the area of the circular arc command 33 is erased by the display of the overlapping graphic commands according to the above preferential sequence. For instance, in FIG. 29(a) part of an area $B_4$ having the same level as the area $A_4$ is erased, an area $C_5$ having a level lower by one from the area $B_5$ is partly erased in FIG. 29(b), and an area $C_6$ contained in the other island having the same level as the area $B_4$ is partly erased. In step 42 in the first embodiment, a circular arc primitive 31 is therefore divided into small circular arc primitives not overlapped by any other areas. An example for dividing circular arc primitives is shown in FIG. 30. The circular arc primitive 31 is divided into two small circular arc primitives where the dividing point is specified by the intersecting point of a line drawn from one end point of the circular arc primitive 31 with the arc of the circular arc primitive 31 (point $P_5$ in FIG. 30(a)). Therefore, the area $A_4$ in FIG. 30(a) is described by the polygonal command $A_4$ and two circular arc commands $A_{41}$, $A_{42}$ corresponding to the divided circular arc primitives.

Step 43 will be described with respect to FIG. 36, and the encoded data 15 of the data configuration shown in FIG. 31 are formed by this process. The encoded data 15 are stored as graphic commands of low level. The individual commands are polygonal commands 32, circular arc commands 33, and OP-codes for distinguishing the color command (for setting the color value or tone value of the graphic command after this command), and their coordinate data or color data.

A method for performing step 40 in FIG. 19 is disclosed in Japanese Patent Application No. 60-47435, filed by the same assignee as the present invention, entitled "Profile Extracting Device", and the essence of the method will be described with reference to FIG. 32. According to this method, the boundary for forming an area is extracted in an area unit, but an area whose boundary is not extracted is detected in step 60 in FIG. 32. The boundary of the area is extracted by tracing the boundary point row by a matrix of 2 x 2 and, if an unextracted area exists in step 60, a point on the boundary is detected in step 61 to trace the boundary of the area, and tracing is started in step 62.

Since the boundary of the areas is extracted in an area unit as described above, a segment at the boundary between two areas will be extracted twice. In step 63, the embodiment determines whether a traced segment has been extracted earlier. If the segment has not been extracted, the embodiment continues tracing in step 64. The embodiment determines whether a boundary point extracted during the tracing is either the starting or branching point of the traced boundary in steps 65 and 66. If it is not, the embodiment continues tracing. A branch point is the point at the end of the segment. For example, points $P_1$, $P_2$, $P_3$, and $P_4$ are branch points in FIG. 21(b).

If the embodiment determines in step 66 that the point is a branch point, the extraction of the traced segment is ended, a new segment is registered in step 67, and the point row data and the name of the extacted area are stored in the point row segment data 52. In step 68, the segment name is put on the area data 51 to indicate that the segment is a segment at the boundary of the extracted area.

The decision made in step 65 is necessary for the following reason. The starting point of a segment to be traced and detected in step 61 is not always the branch point, and tracing is started midway in the segment. Tracing of the boundary is conducted in a predetermined direction. Thus, the segment is only partly traced, and tracing of the entire segment is completed after circulating one cycle and returning to the starting point. Thus, if the starting point is traced in step 65, the data of the segment are registered in steps 69 and 70. When step 70 is completed, extraction of an area is finished, and, if no unextracted areas exist in step 60, the process is ended.

If a segment to be traced has been extracted earlier in step 63, the segment name is put on the area data 51 in step 71, and the name of the extracted area is stored as an adjacent area in the point row segment data 52.

Figure 33:
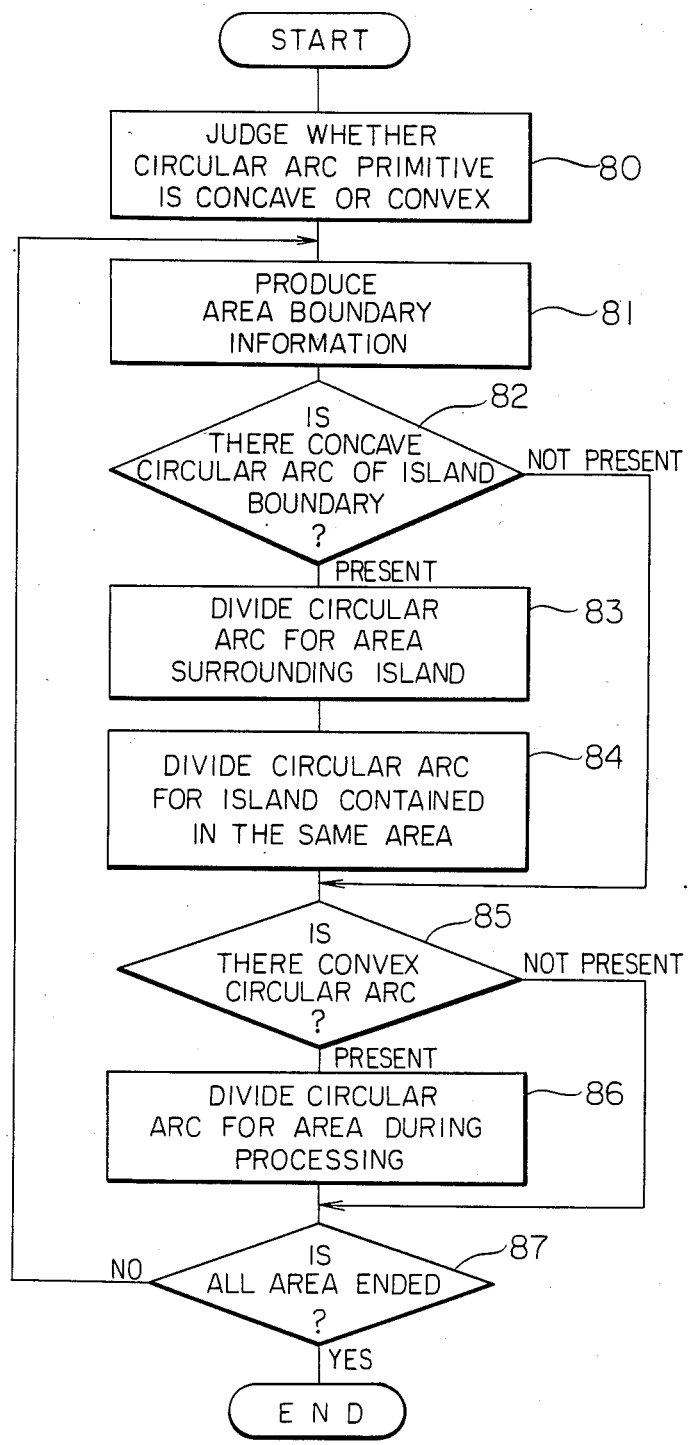
FIG. 33 is a flow chart showing the sequence of the process in step 42 of FIG. 19.

FIG. 33 is a flow chart showing the sequence of operations for step 42 in FIG. 19. In step 80, the process determines the area for which a circular arc primitive 31 becomes convex and the area for which a circular arc primitive 31 becomes concave for all circular arc primitives 31. In step 81, the embodiment produces the data of the respective segments forming the boundary of an area and examines the primitives forming the segments in steps 82 and 85. If the embodiment determines that the area currently being processed has a concave circular arc primitive 31 which is part of the boundary of an island, for example, FIGS. 29(b) and 29(c), it divides the circular arc primitive 31 into segments in the area surrounding the islands for which the concave circular arc primitive is convex in step 83, for example, in FIG. 29(b), and divides the circular arc primitive into segments in other islands contained in the same area, for example in FIG. 29(c).

In step 85, if the embodiment determines that the area currently being processed has a convex circular arc primitive 31, it divides the convex circular arc primitive into segments during processing of the area, for example, in FIGS. 29(a). In step 87, the embodiment determines whether all areas have been processed, and, if not, repeats steps 81 to 86.

Figure 34:
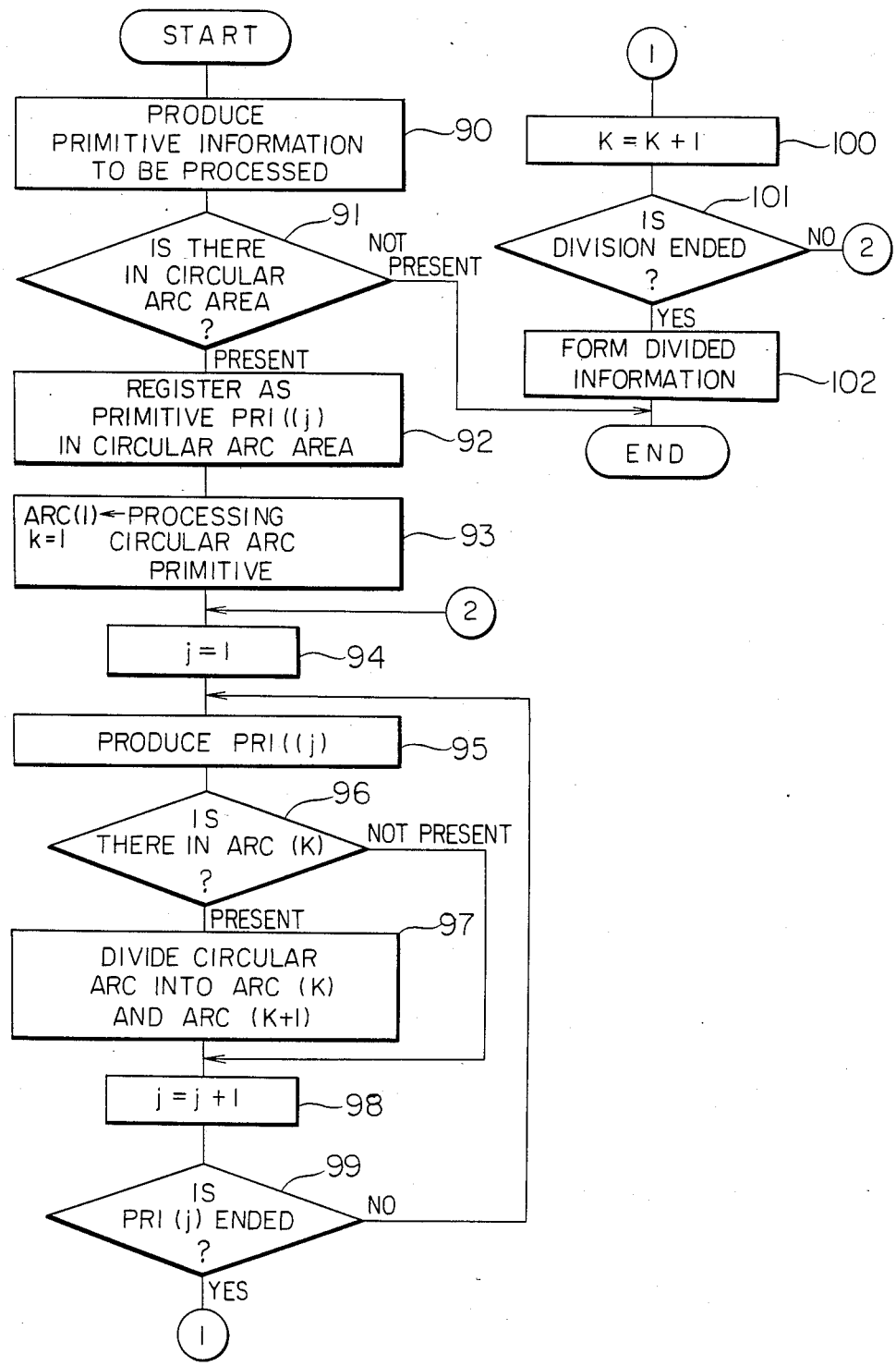
FIG. 34 is a flow chart showing the sequence of the dividing process of a circular arc primitive in steps 83, 84, and 86 of FIG. 33.

FIG. 34 is a flow chart showing the sequence needed to carry out steps 83, 84, and 86 of FIG. 33. FIGS. 35(a)–35(d) are views for explaining the flow chart of FIG. 34. In step 90 of FIG. 34, information about the primitive to be processed is produced. The primitive to be processed may be a primitive forming the boundary of an area processed in step 83 as an island, a primitive forming the boundary of an island contained in the same area with another island processed in step 84, or a primitive forming the boundary of an area processed in step 86. In step 91 it is determined whether the arcuate graphic command converted from the circular arc primitive 31 produced during dividing is overlapped by another area. It is determined that if the following equations (1) and (2) are obtained there is an overlap:

$$(Xp-Xc)^2 + (Yp-Yc)^2 = R^2 \quad (1)$$

$$aXm+b=0, \ aXp+b=0 \quad (2).$$

In the case of $aXm+b=0$, $aXp+b=0$, where one point on the primitive to be processed is Pp(Xp,Yp), an equation of a circle for describing the circular arc primitive during dividing is:

$$(X-Xc)^2 + (Y-Yc)^2 = R^2,$$

an equation of a chord is:

$$Y=aX+B,$$

and a neutral point is Pm(Xm,Ym).

If the embodiment determines in step 91 that the area corresponding to the circular arc primitive 31 is not overlapped by another area, the circular arc primitive 31 is not divided, and the process is ended. If the area is overlapped, the circular arc primitive is registered as the primitive PRI (j) (J=1, 2 . . . ) in the circular arc area in step 92. Then, an initialization is set, the circular arc primitive 31 divided in step 93 is registered as the ARC(1) of the divided circular arc ARC(k) (K=1, 2 . . . ), and k=1 is set.

Primitives PRI (j) in the circular arc area are sequentially produced for values of j beginning with j=1 in steps 94 and 95. The embodiment determines in step 96 whether the area corresponding to the divided circular arc ARC (k) is overlapped by another area. If so, the ARC (k) is split as shown in FIG. 30. One of the resultant arcs is denoted as ARC (k) and the other as ARC(k+1). If step 97 is completed or if no overlap is determined in step 96, j is incremented in step 98. The embodiment determines in step 99 whether the process of the primitive PRI (j) in the circular arc area is completed. If not, steps 95 to 98 are repeated.

If the end is determined in step 99, k is incremented in step 100, and the embodiment determines whether the division is ended in step 101. If not ended, next divided circular arc ARC (k) is repeated in steps 94 to 100. If ended, the divided result is written in the approximated segment data 53 in step 102 and the dividing process is finished.

The above processes are further described with respect to the example in FIG. 35. The circular arc primitive 31 to be divided is first divided into circular arc ARC (1) in step 93. Then, ARC (1) is divided by the primitive PRI (j) presented in the ARC (1) into ARC (1) and ARC (2) as shown in FIG. 35(a). The divided ARC (1) is further checked for the remaining primitive PRI (j), and the new ARC (1) and ARC (2) are generated as shown in FIG. 35 (b), and the processes in the steps 95 to 98 are ended.

Figure 35A:
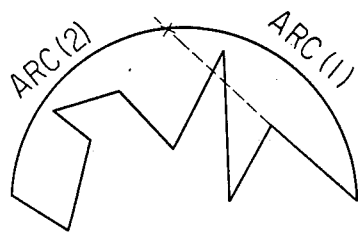
FIGS. 35(a)-35(d) are views showing examples of dividing the circular arc.
Figure 35B:
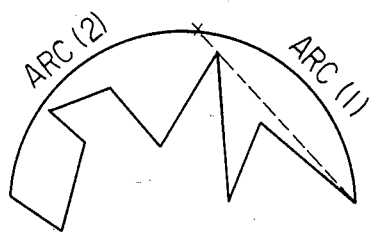
Figure 35C:
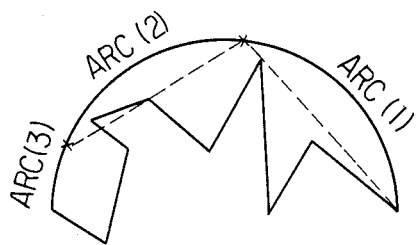
Figure 35D:
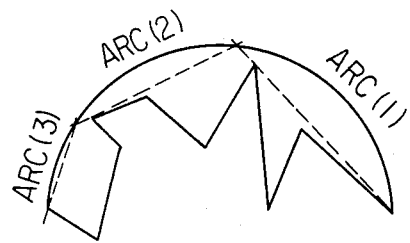

Then, the processes in steps 95 to 98 are performed for ARC (2) in the same manner as for ARC (1), ARC (2) is temporarily divided into ARC (2) and ARC (3) as shown in FIG. 35 (c), and ARC (2) and ARC (3) are obtained as the divided circular arcs as shown in FIG. 35(d). In the example of FIG. 35, three small circular arcs of ARC (1) to ARC (3) are obtained by dividing, and the divided result is stored in the approximated segment data 53 in step 102.

Figure 36:
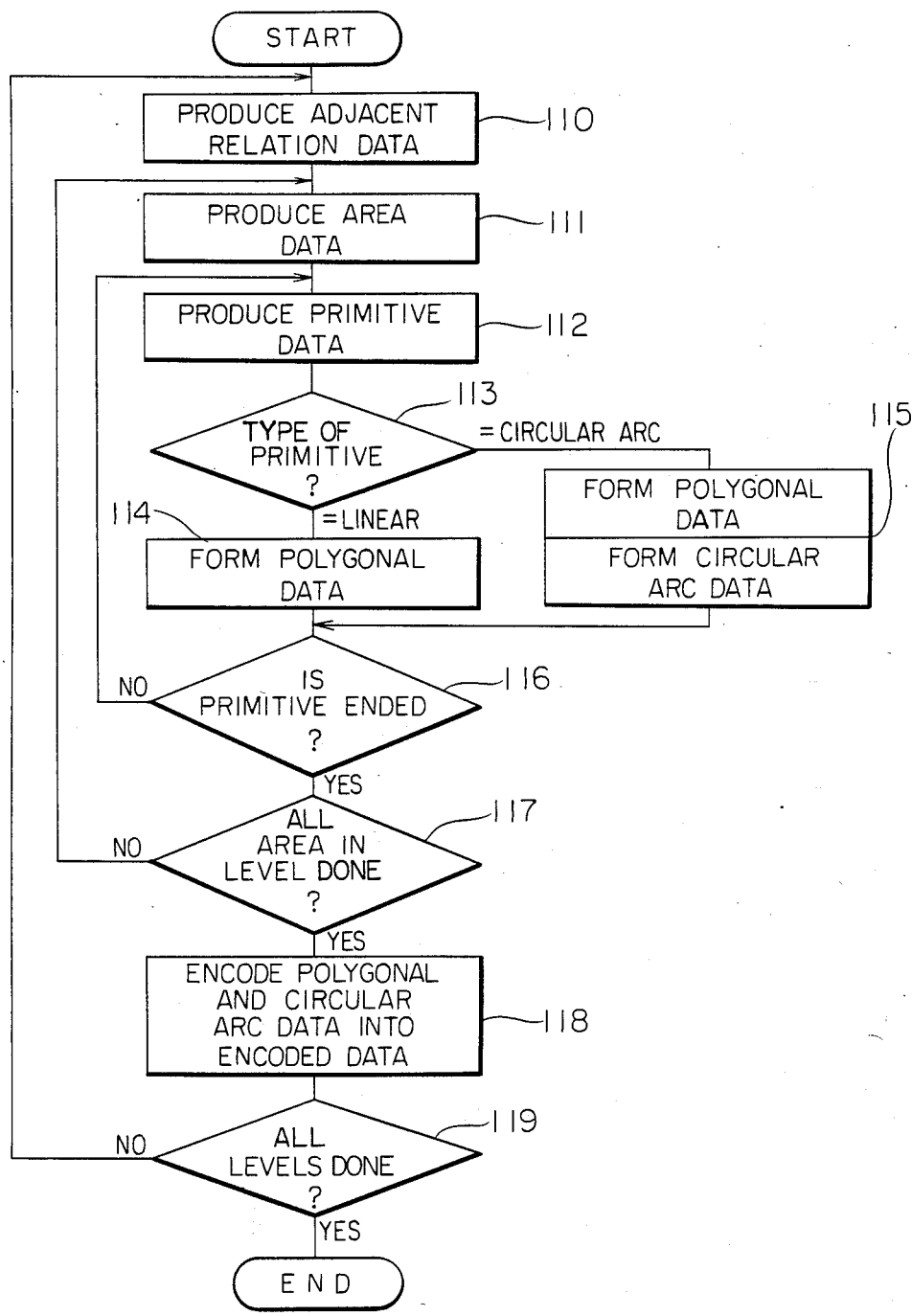
FIG. 36 is a flow chart showing the concrete sequence of processing step 43 in FIG. 19.

FIG. 36 is a flow chart showing the sequence of the process in step 43 in FIG. 19. In FIG. 36, adjacent relation data 50 are produced in step 110, and area data 51 are produced from areas of a lower level in step 111. In step 112, data of the primitives contained in the segments forming the boundary of an area are sequentially produced. In step 113, the embodiment determines whether a primitive is a linear primitive 30 or a circular arc primitive 31. If it is a linear primitive 30, a vertex of polygonal shape is added to the polygonal data in step 114, and if its is a circular arc primitive 31, a vertex of the polygonal shape is added to the polygonal data and the circular arc is formed in step 115.

Step 116 determines whether all primitives have been processed. If they have, the sequence advances to step 117; if not, steps 112 to 115 are repeated. In step 117, the first embodiment determines whether all areas in the same level have been processed. If they have, step 118 is performed; if not, the sequence goes back to step 111. In step 118, the polygonal data and the circular arc data obtained in steps 114 and 115 are stored in the encoded data 16 of the data configuration shown in FIG. 31.

In step 119, the first embodiment determines whether the processes at all levels have been processed. If they have, step 43 is finished; if not, steps 110 to 118 are repeated.

The first embodiment, as described above, extracts the extracted area data 12 of a boundary point row for areas forming the input image data 11 in step 40, approximates the boundary point row obtained in step 40 by linear primitives 30 or circular arc primitives 31 in step 41, divides each circular arc primitive 31, if necessary, into small circular arcs so that no other areas overlap the areas of the circular arc command 33 corresponding to the divided circular arc primitives in step 42, converts the approximate boundary obtained from the above process into polygonal graphic commands 32 or circular arc graphic commands 33, and sets the preferential sequence in the respective graphic commands to describe the image. Therefore, the encoded data 15 for reproducing the image visually with less data can be obtained.

A second embodiment of the present invention will now be described. The construction of the second embodiment is the same as that of the first embodiment except for the data configuration of the encoded data 15 formed in step 43 in FIG. 19. The difference will be described with reference to FIGS. 37 and 38.

Figure 37:
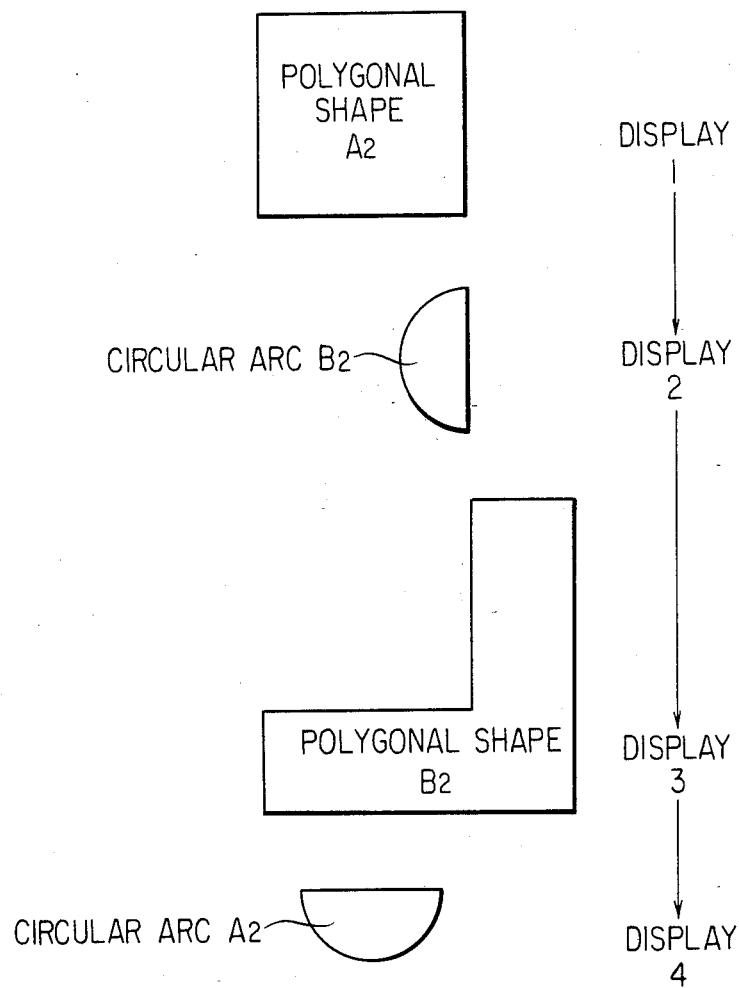
FIG. 37 is a view showing the preferential sequence of the image of FIG. 27(a) in another embodiment of the invention.
Figure 38:
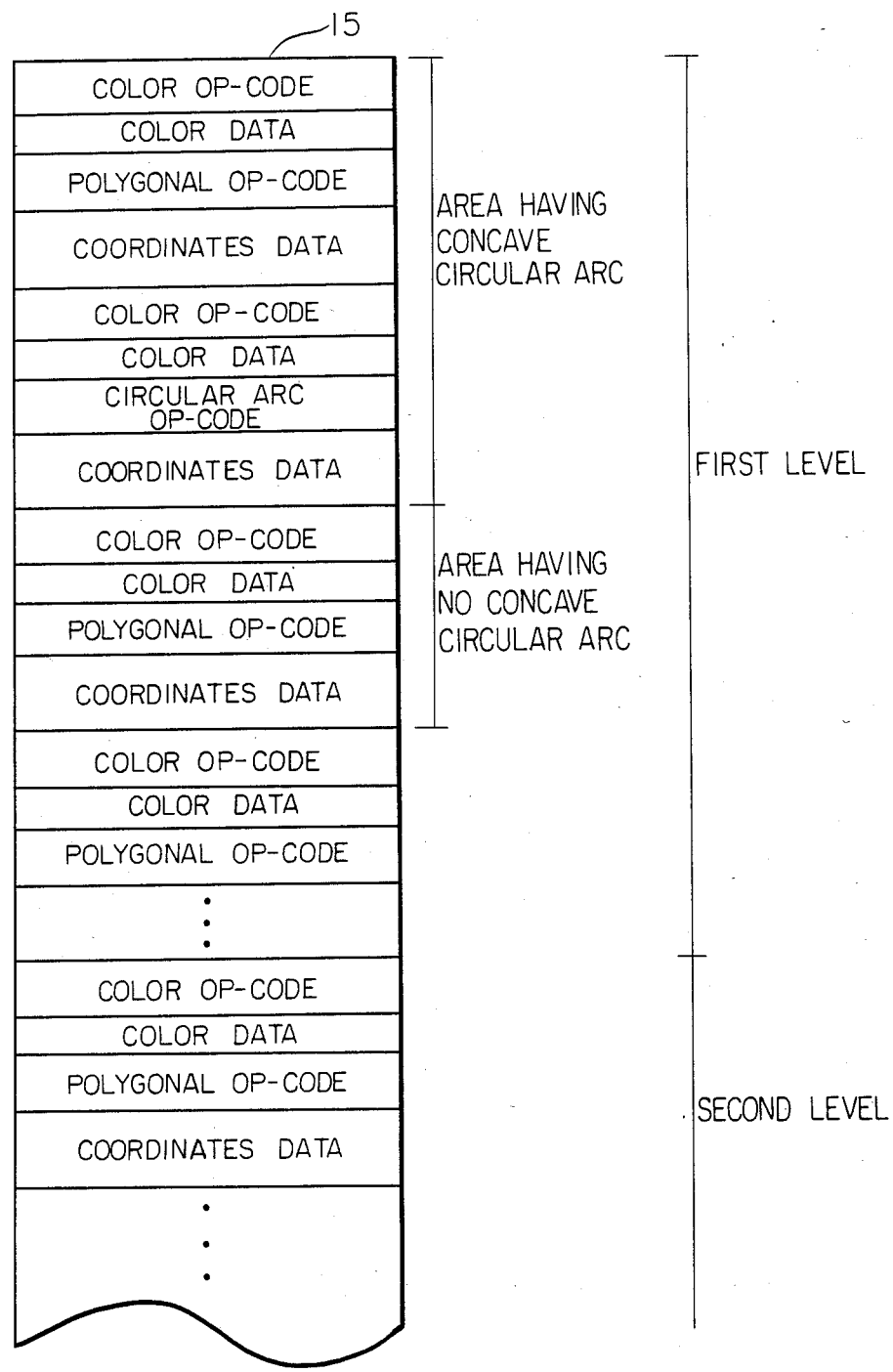
FIG. 38 is a view showing the data configuration of the encoded data according to the embodiment of FIG. 37.

FIG. 37 is a view showing the preferential sequence in the display of a graphic command in the same level, and FIG. 38 is a view showing the data configuration of the encoded data 15.

Figure 27A:
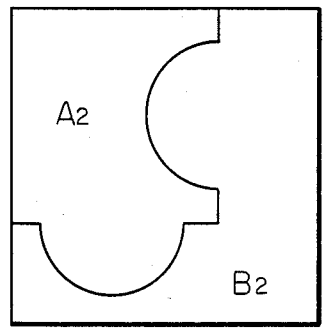
Figure 27B:
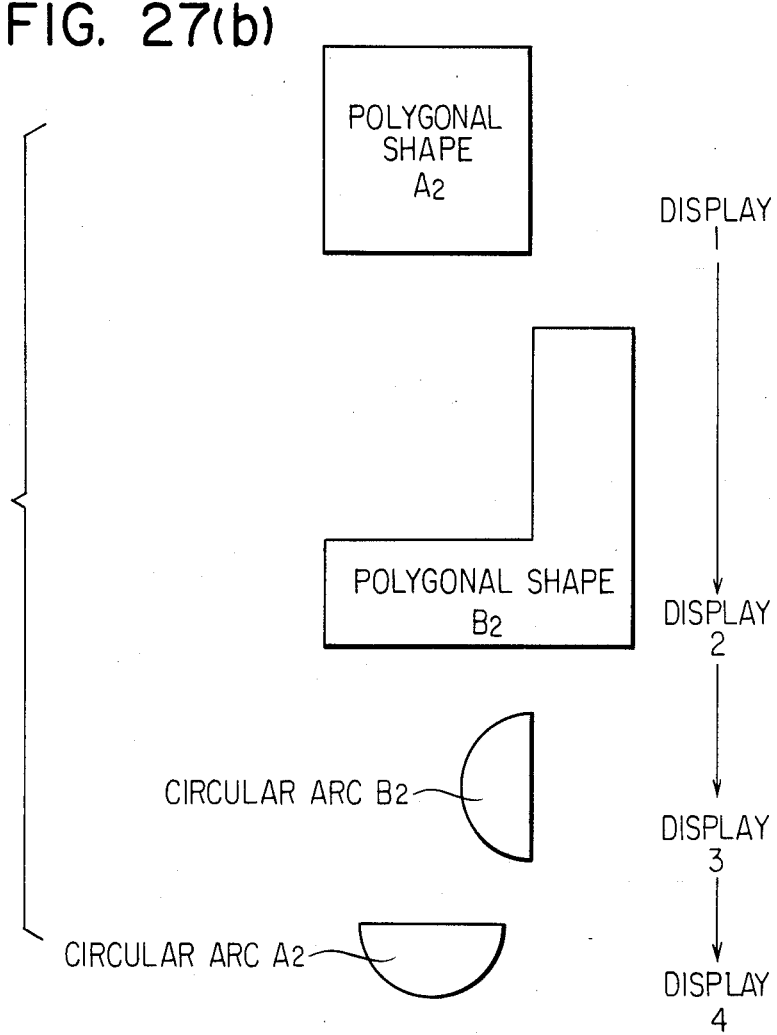
Figure 28A:
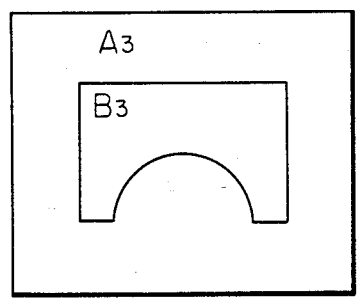
Figure 28B:
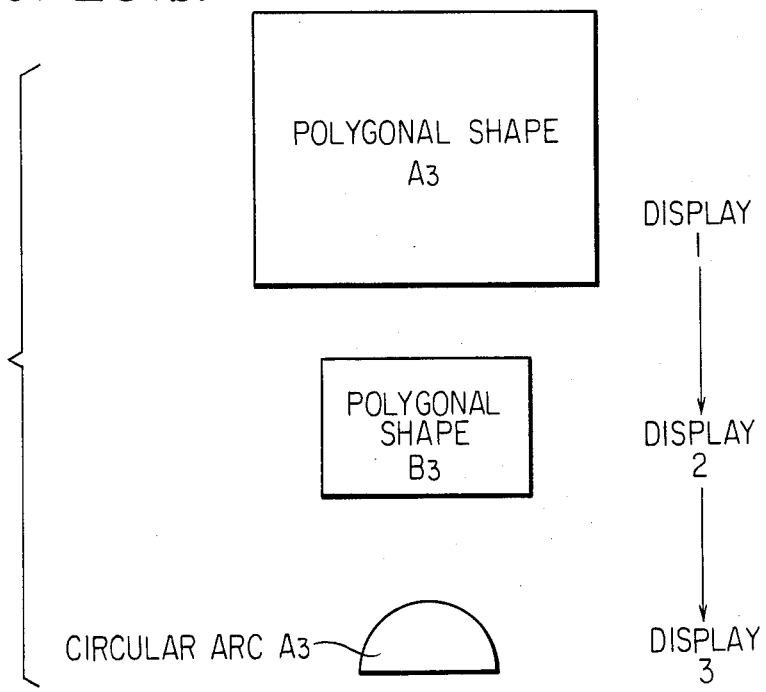

In the first embodiment, the polygonal graphic command 32 is displayed first and the circular arc graphic command 33 is then displayed in the preferential sequence as shown in FIG. 27(b) for the image shown in FIG. 27(a). However, in the second embodiment, the area having a concave circular arc graphic command 33 is displayed by the concave circular arc graphic command 33 after displaying the polygonal command 32 of that area. For example, in FIG. 37, to display the image of FIG. 27(a), the polygonal graphic command A$_2$, the circular arc graphic command B$_2$, the polygonal graphic command B$_2$, and the circular arc graphic command A$_2$ are displayed in that order.

The data configuration of the encoded data 15 formed according to the second embodiment is, as shown in FIG. 38, stored as a color command for indicating color value or tone value of the area, a polygonal command 32 of the area, and a color command and a circular arc command 33 when having a concave circular arc command 33 in the area. The second embodiment of the present invention provides the same advantages as those provided by the first embodiment.

A third embodiment of the present invention will now be described. The construction of the third embodiment is the same as those of the first and second embodiments except for the data configuration of the encoded data 15 formed in step 43 in FIG. 19. The difference will be described with reference to FIGS. 39 and 40.

Figure 39:
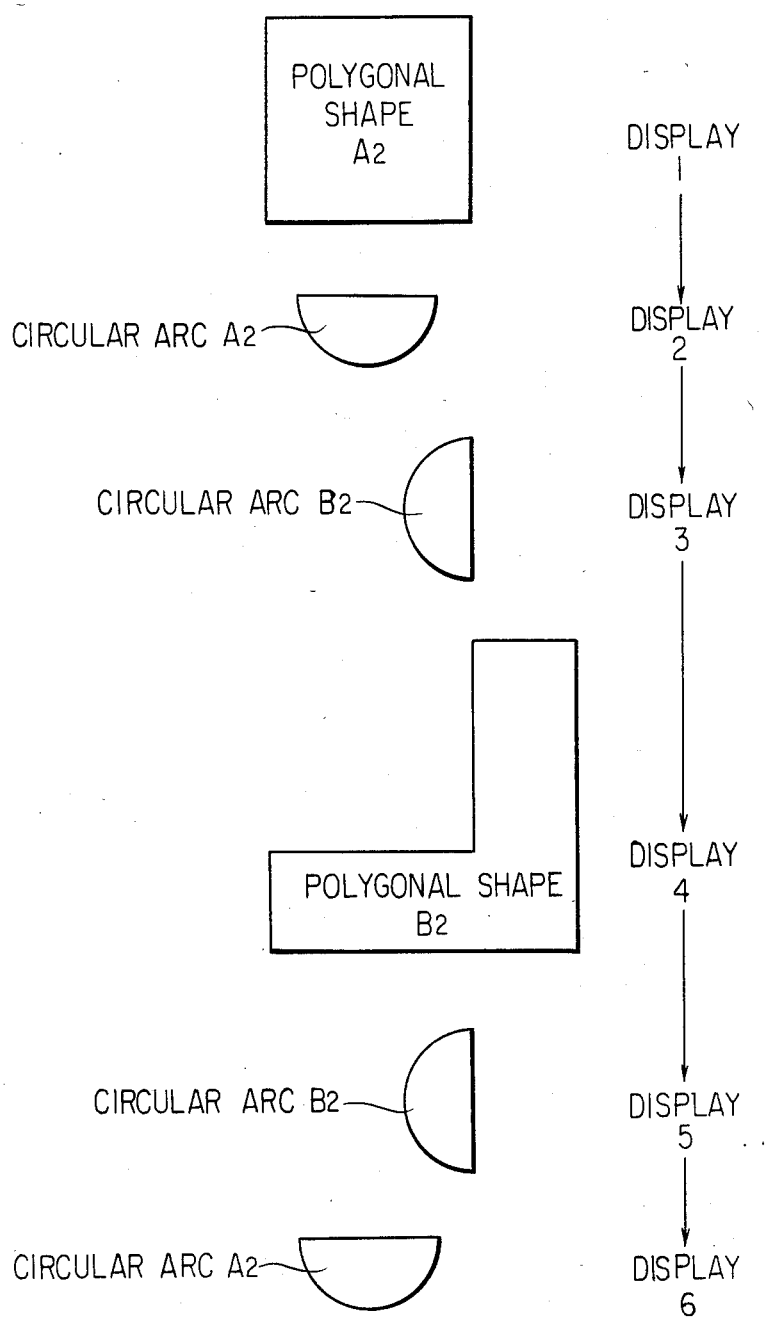
FIG. 39 is a view showing the preferential sequence of the image of FIG. 27(a) in the display of a graphic command in the same level in still another embodiment of the invention.
Figure 40:
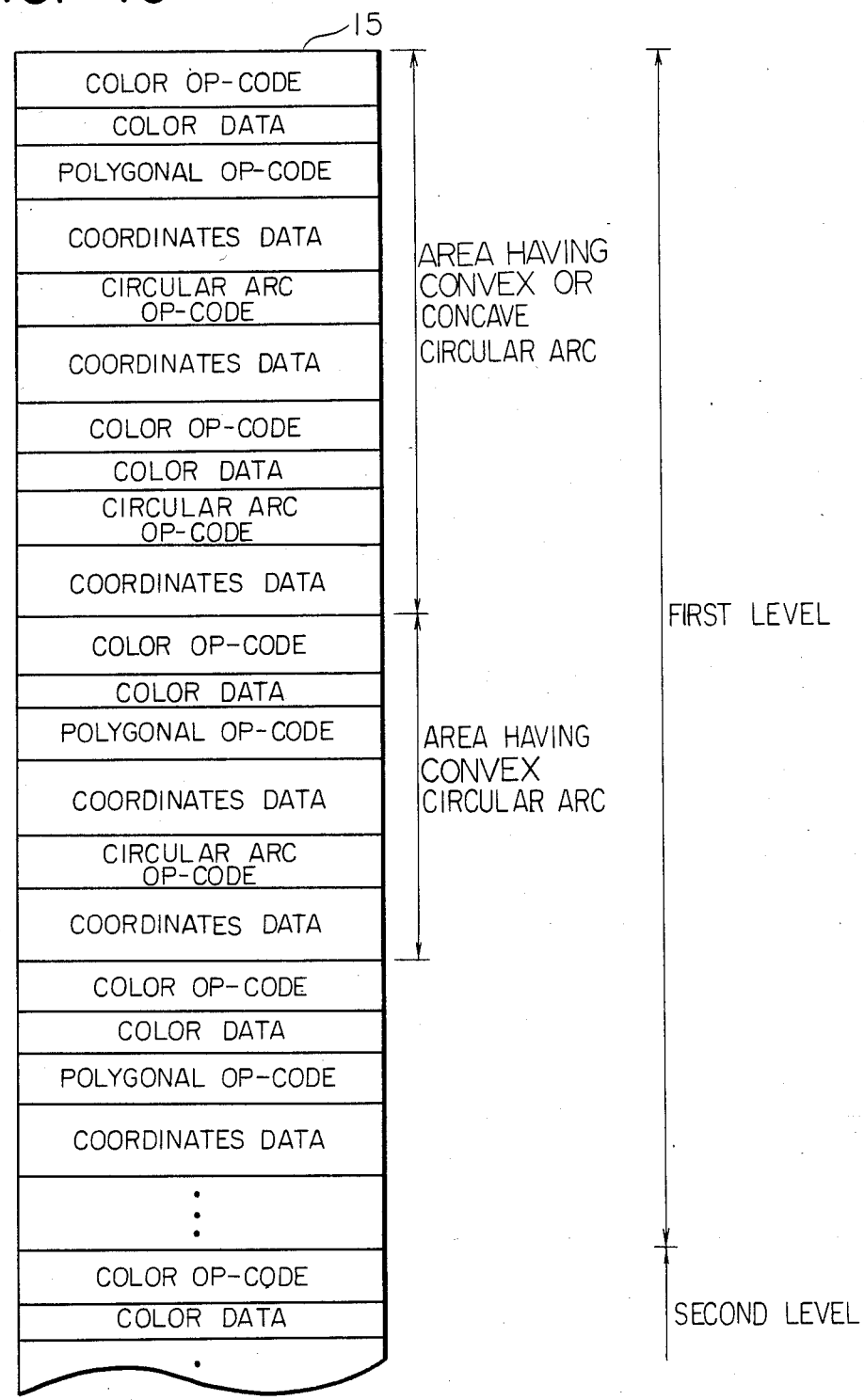
FIG. 40 is a view showing the data configuration of the encoded data of the embodiment of the FIG. 39.

FIG. 39 is a view showing the preferential sequence in the display of a graphic command in the same level, and FIG. 40 is a view showing the data configuration of the encoded data 15.

The third embodiment differs from the first and second embodiments in the preferential sequence for displaying the graphic commands within the same level. The polygonal command 32 of the area having the concave circular arc command 33 is displayed, then the concave circular arc command 33 is displayed, then the polygonal command 32 of the area having the convex circular arc command 33 is displayed, then the convex circular arc command 33 is displayed. For example, the image as shown in FIG. 27(a) is displayed in the sequence of the polygonal command A$_2$, the circular arc command A$_2$, the circular arc command B$_2$, the polygonal command B$_2$, the circular arc command B$_2$, and the circular arc command A$_2$.

The data configuration of the encoded data 15 formed according to the third embodiment is, as shown in FIG. 40, stored as a color command of an area, the polygonal command 32 of the area, and the color command and the circular arc command 33 if the area contains a convex circular arc command 33, and the color command and the circular arc command 33 if the area contains a concave circular arc command 33.

The third embodiment of the present invention provides the same advantages as those provided by the first and second embodiments.

In the embodiments described above, the CRT display 9 is employed as the display unit. However, a liquid crystal display or a plotter may be used.

Further, in the system configuration of FIG. 18, the working memory 24, the extracted area memory 25, the approximated area memory I 26, the approximated area memory II 27, and the encoded data memory 28 are separately shown for convenience of description but may be physically constructed in the same memory, or unnecessary information may be erased in the respective processes and new information may be stored thereon.

Moreover, the circular arc primitive 31 is used as the approximated curved primitive, and the circular arc command 33 is employed for the corresponding graphic command. However, it may be approximated by another curved primitive, such as an elliptical primitive, divided in the same manner as in step 42, converted to the graphic command corresponding to the other curved primitive, such as the polygonal command 32 and the eliptical command, and the encoded data 15 may be formed.

Figure 41A:
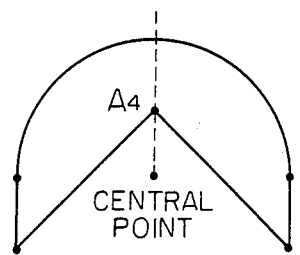
FIGS. 41(a) and 41(b) are views showing another method of dividing the circular arc in the embodiment.
Figure 41B:
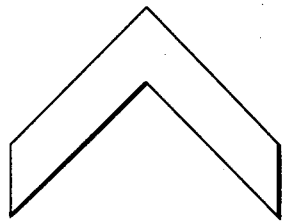
Figure 41C:
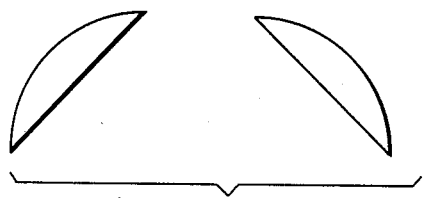

In addition, in the process of step 42, a method of dividing the circular arc as shown in FIG. 30 is disclosed. Another method for dividing a circular arc is shown in FIG. 41. The point for dividing a circular arc is the point at which a line connecting the central point of the circular arc primitive 31 to a point on the primitive crosses the circular arc primitive.

Figure 42:
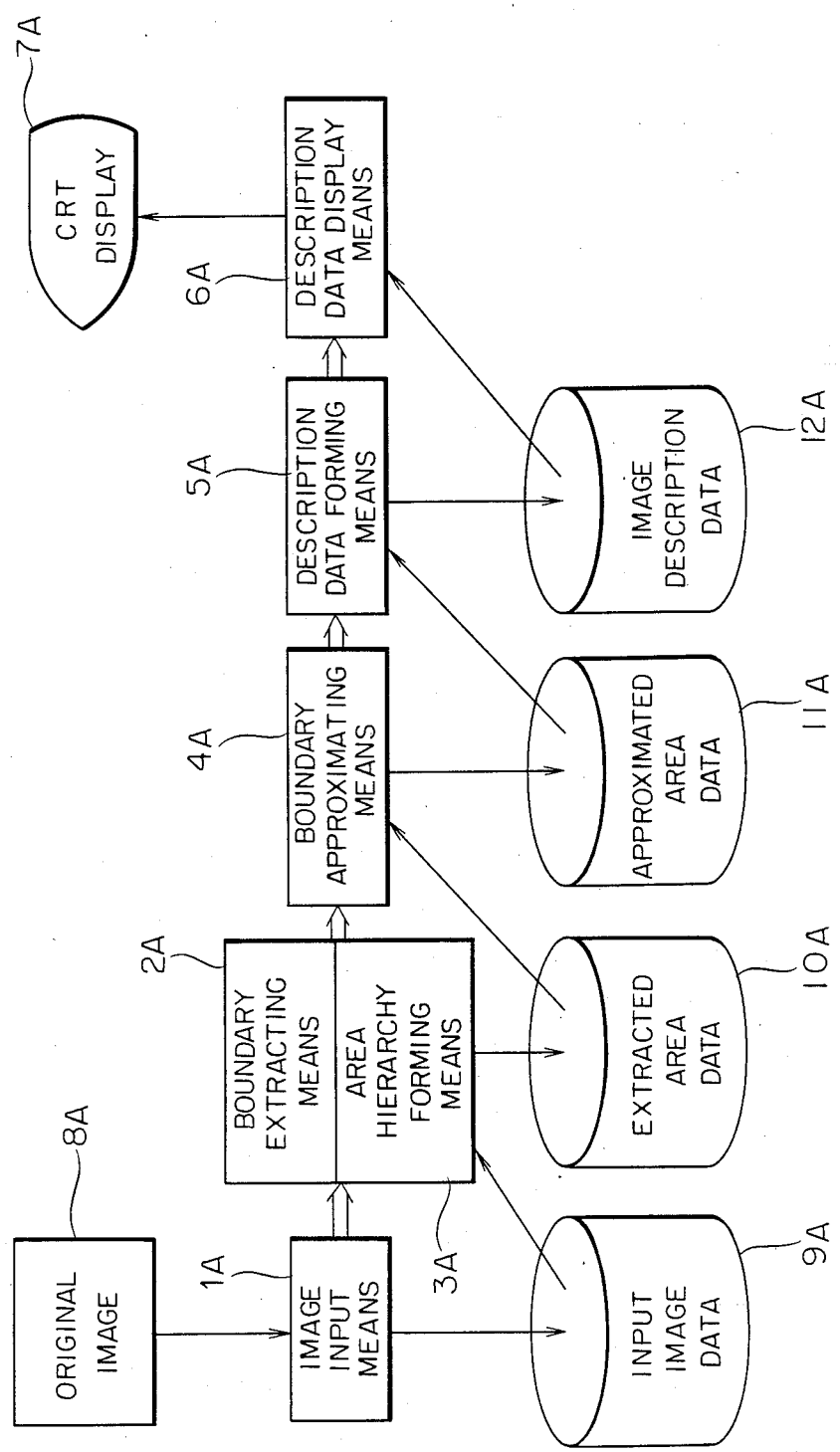
FIG. 42 is a view showing the entire construction of still another embodiment of the invention.

FIG. 42 shows the construction of a fourth embodiment of an image describing apparatus according to the present invention. Reference number 1A designates image input means, numeral 2A designates boundary extracting means, numeral 3A designates area hierarchy forming means, numeral 4A designates boundary approximating means, numeral 5A designates description data forming means, numeral 6A designates description data display means, numeral 7A designates a CRT display, numeral 8A designates original image, numeral 9A designates input image data, numeral 10A designates extracted area data, numeral 11A designates approximated area data, and numeral 12A designates image description data.

The fourth embodiment shown in FIG. 42 converts the original image 8A into a multivalue or multicolor digital image by the input means 1A to form input image data 9A, extracts the boundary point row of an area of the input image data 9A by the boundary extracting means 2A, detects the adjacent and containing relations between the areas with the area hierarchy forming means 3A to form extracted area data 10A made of the hierarchy data and the boundary point row of the area, approximates the boundary point row of the extracted area data 10A via linear primitives or circular arc primitives using the boundary approximating means 4A to form the approximated area data 11A, sequentially describes the area in the order of the hierarchy according to the hierarchy data using the description data forming means 5A to form the image description data 12A, and displays the content of the image description data 12A on the CRT display 7A using the description data display means 6A.

Figure 43:
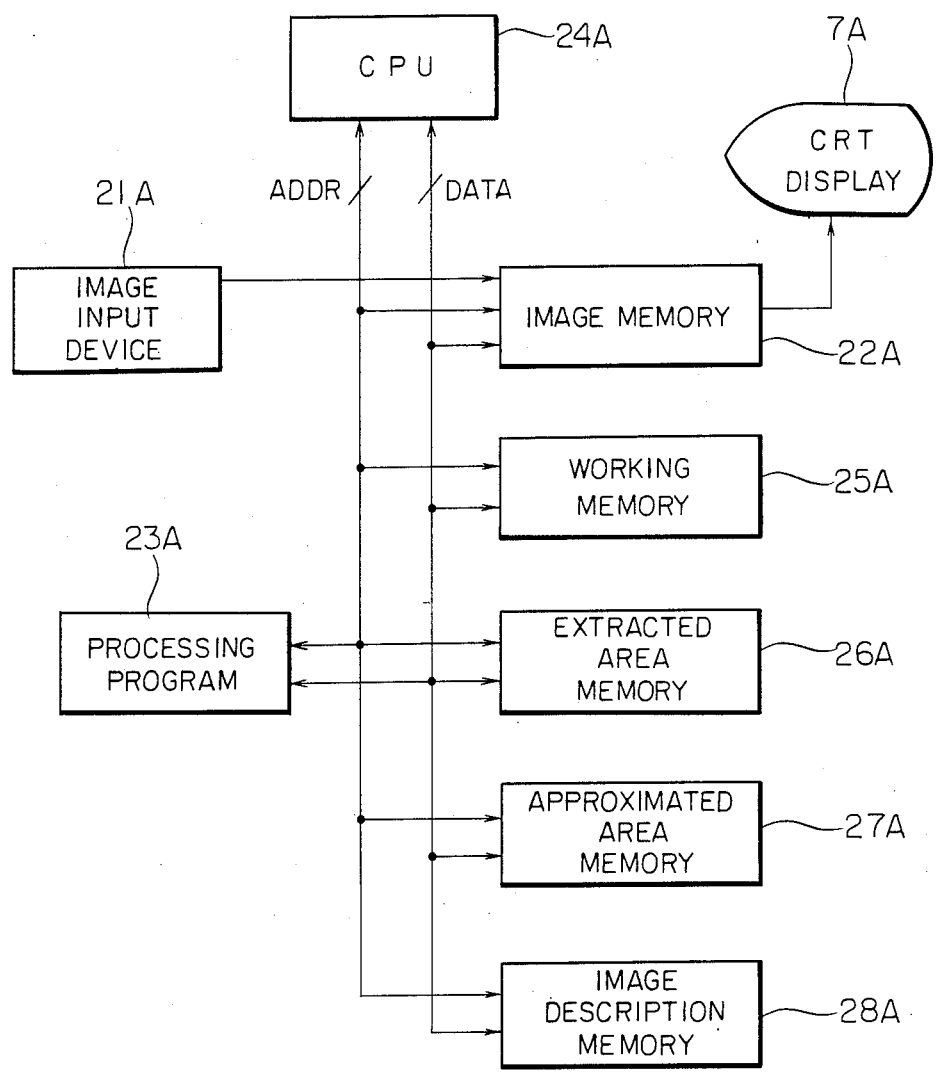
FIG. 43 is a view showing the system construction of the embodiment of the invention shown in FIG. 42.

FIG. 43 is a view of the system construction of the fourth embodiment. Reference numeral 7A designates a CRT display, numeral 21A designates an image input device, numeral 22A designates an image memory, numeral 23A designates a processing program, numeral 24A designates a CPU, numeral 25A designates a working memory, numeral 26A designates an extracted area memory, numeral 27A designates an approximated area memory, and numeral 28A designates an image description memory.

In FIG. 43, the image input device 21A includes an image input unit, such as a television camera or an image scanner, and a signal converter for converting the input image signal into a signal to be stored in the image memory 22A, and the input image data 9A is stored as a multicolor digital image in the image memory 22A. The image memory 22A is formed of a RAM to store the input image data 9A and can be used as a working area for writing a flag in an area extracting process to be described later or can display the content of the image memory 22A on the CRT display 7A. The CPU 24A executed a process to be described later with respect to FIG. 44 according to a processing program 23A. The working memory 25A stores intermediate data when processing in the CPU 24A. The extracted area memory 26A, the approximated area memory 27A, and the image description memory 28A store the extracted area data 10A, the approximated area data 11A, and the image description data 12A, respectively, and are formed of rewritable memory, such as a RAM or a Winchester disk. The obtained image description data 12A is converted into raster data by the CPU 24A or a graphic processor (not shown), stored in the image memory 22A, and displayed on the CRT display 7A.

Figure 44:
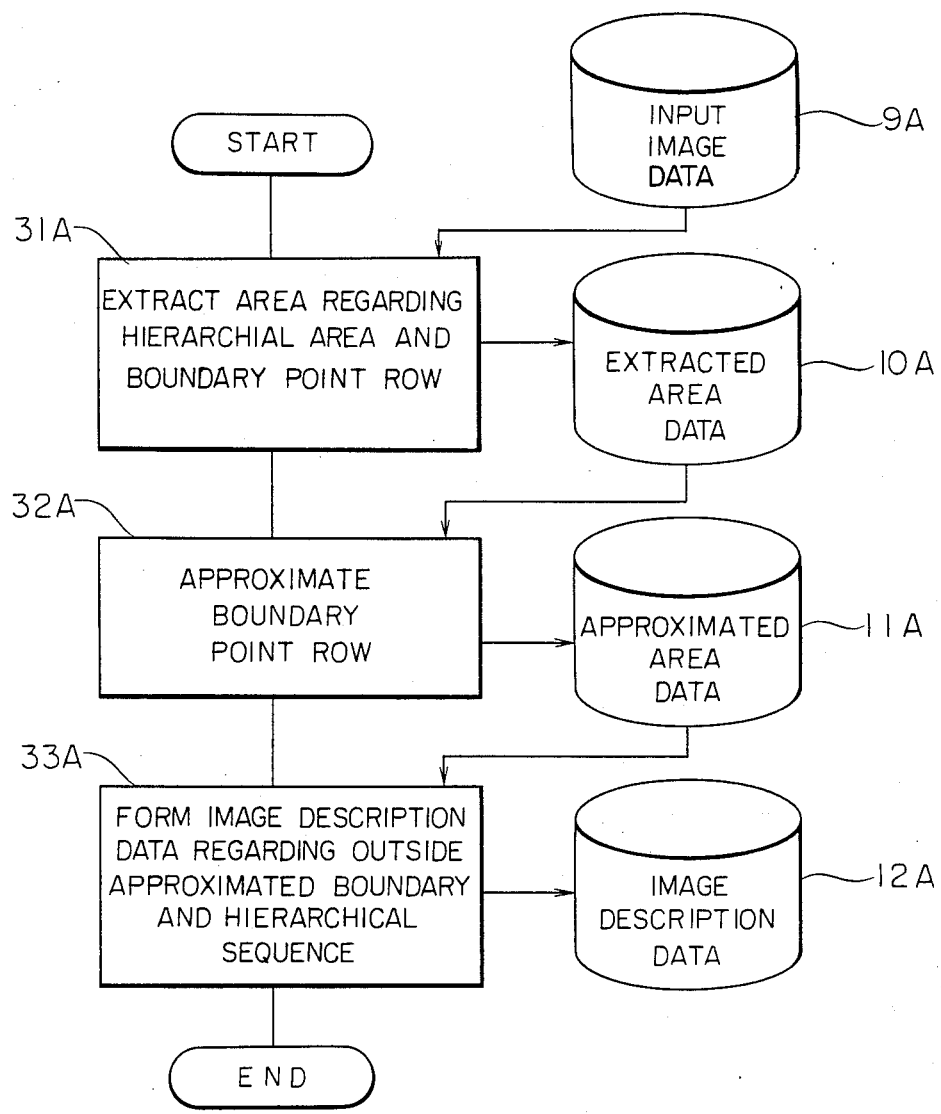
FIG. 44 is a flow chart showing the process for converting the input image data into image description data.

FIG. 44 is a flow chart showing a process for converting the input image data 9A into an image description data 12A according to the fourth embodiment. Reference numeral 9A designates input image data, numeral 10A designates extracted area data, numeral 11A designates approximate area data, and numeral 12A designates image description data.

FIGS. 22, 23, 45, and 46 are views for supplementing the description of FIG. 44. FIGS. 22(a)–22(d) are views for explaining the area extracting process and the boundary point row approximating process. FIGS. 23(a) and 23(b) designate views for explaining the adjacent relation graph of the areas. FIGS. 45(a) and 45(b) explain the data configuration of the extracted area data 10A, and FIG. 46 shows the approximated area data 11A and the image description data 12A.

In step 31A of FIG. 44, the boundary point row of the area for forming the input image 9A is extracted, and the adjacent and containing relation data between the areas are detected to form hierarchical data and to form extracted data 10A of the hierarchical data and the boundary point row. Here, the boundary point row of an area extracted in the embodiment is the point row corresponding to the outside profile in the conventional example and does not depend upon whether the area includes an island. For example, the area A in FIG. 22(a) is defined only by the area Ao which describes the outside profile of area A as shown in FIG. 22(c).

The hierarchical data formed in the fourth embodiment is described below. In FIGS. 22(a)–22(d), in order to form the image of FIG. 22(a) by using A', B', and C' shown in FIG. 22(d), the area A' is first displayed in a bonding picture manner. Then areas B' and C' are superposed thereon and displayed. This is the fundamental principle of the present embodiment. The idea is to form a hierarchy in the area making up the image, and in the example of FIG. 22 the area A' is one level lower than the areas B' and C'. The hierarchical data displays the levels of the areas.

This will be described in more detail with the example in FIGS. 23(a) and 23(b). Since the area D contains areas E to K as islands, it is disposed at the lowest level 1. Then, since the areas E, F, and G are disposed at the lowest level of the islands of the area D, they are disposed at level 2. Then, when the levels of areas H to K are defined, the adjacent relation graph of the areas is formed as in FIG. 23(b).

The data configuration of the extracted area data 10A is formed of the hierarchical data 70A shown in FIG. 45(a) and the boundary point row data 71A shown in FIG. 45(b). The hierarchical data 70A is composed of the entire number of levels and the area names belonging to each level. The boundary point row data 71A is formed of the area name and the coordinates of the point row or the chain code row. The sequence of step 31A will be described with reference to FIGS. 47 and 48.

Figure 22D:
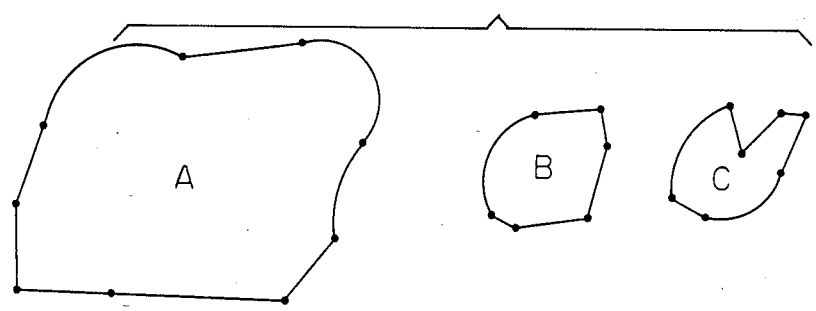

In step 32A, the embodiment inputs the extracted area data 10A obtained from step 31A, approximates the boundary point row via linear primitives and circular arc primitives, and stores the result as the approximated area data 11A. Approximations for the areas shown in FIG. 22(c), for example, are shown in FIG. 22(d). The approximated area data 11A has the above hierarchical data 70A shown in FIG. 45(a) and the approximated boundary data 72A of the data configuration shown in FIG. 46 (the sequence of the stored area is in the order shown in FIG. 45(b)). The approximated boundary data 72A has an area name and an OP-code indicating the linear primitive or circular arc primitive and coordinates data (coordinates data of the starting and ending points in the case of a linear primitive, and coordinates data of the starting, intermediate, and ending points in the case of a circular arc).

A number of methods for approximating a linear primitive or a circular arc primitive of the point row in step 32A have been proposed. Any of these methods may be performed in this embodiment. Therefore, the description of any particular method will be omitted.

In step 33A, the approximated area data 11A obtained by the process of step 32A is inputted and the approximated boundary data 72A is realigned in the order of increasing levels on the basis of the hierarchical data 70A that forms the image description data 12A. For example, in the examples of FIGS. 23(a) and 23(b), the areas D, E, F, G, H, I, J, and K are stored in this sequence. The data configuration for different areas of the image description data 12A is the same as that of the approximated boundary data 72A shown in FIG. 46.

The method for performing the process of step 31A is disclosed in the aforementioned IEEE article and, therefore, only the essence of the method will be described.

Figure 47:
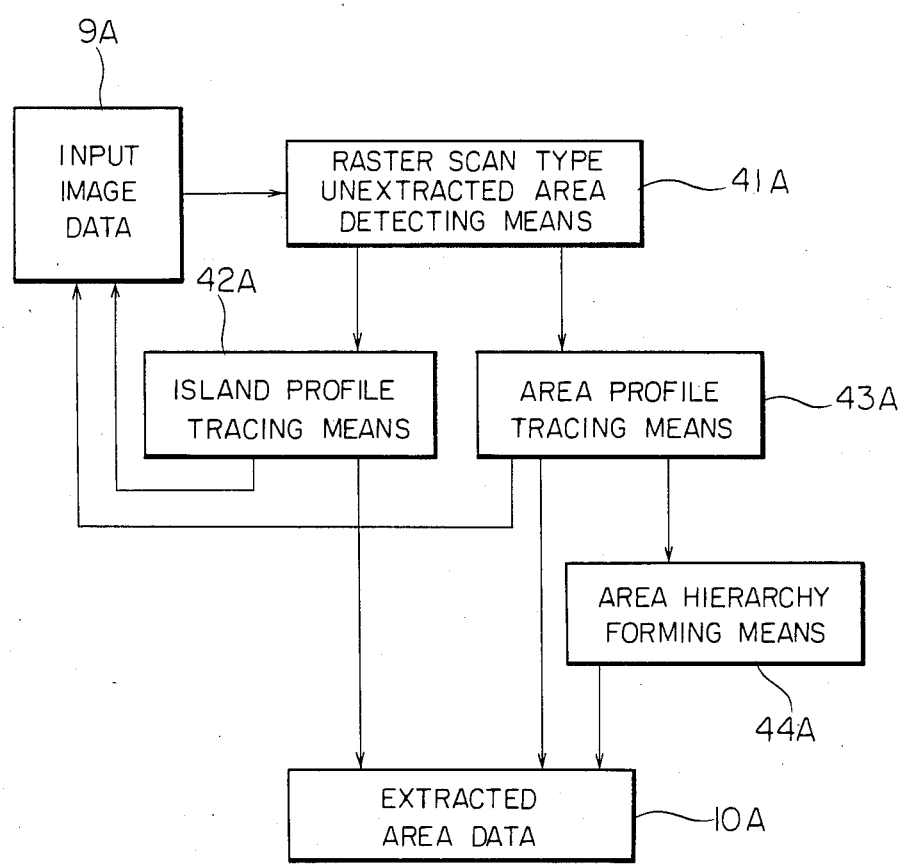
FIG. 47 is a view showing the construction of one method of processing step 31A of FIG. 44.
Figure 48:
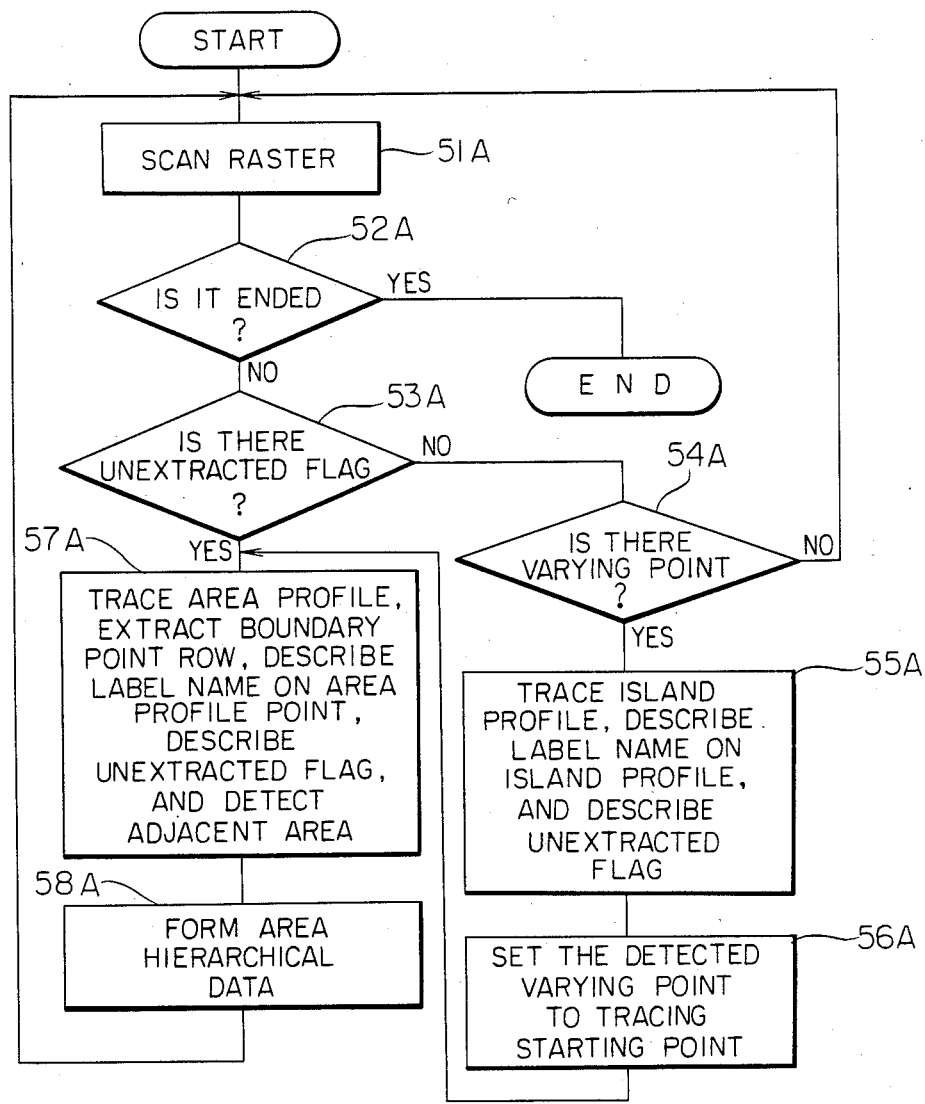
FIG. 48 is a flow chart showing the sequence of the method of processing step 31A of FIG. 44.

FIG. 47 is a schematic showing one method for performing the process of step 31A. FIG. 48 is a flow chart showing the sequence of the method. In FIG. 47, reference numeral 9A designates input image data, numeral 10A designates extracted area data, numeral 41A designates raster scan type unextracted area detecting means, numeral 42A designates island profile tracing means, numeral 43A designates area profile tracing means, and numeral 44A designates area hierarchy forming means.

In FIG. 48, picture elements of the input image data 9A are checked in step 51A in the raster scanning direction by the raster scan type unextracted area detecting means 41A. If it is determined that all picture elements have been checked in step 52A, the process of step 31A in FIG. 44 is ended, and, if not, steps 53A and 54A will be processed.

In step 53A, the embodiment checks whether an unextracted flag is attached to the picture element during checking. The unextracted flag is a flag added to the picture element on the profile point row to be disposed in the process for tracing the island profile or area profile to be described later. An area having a picture element marked with an unextracted flag indicates that the process for tracing the island profile is finished but the process for tracing the area profile is not yet executed. If the embodiment determines that a picture element is not marked with an unextracted flag in step 53A, it determines whether the picture element is a varying point in step 54A. The term varying point refers to a picture element whose value during checking has a tone or color value which is different from that in the area scanned at present. When the value of the picture element during checking is at a label to be described later, the picture element is not a varying point. Therefore, if the embodiment determines that an unextracted flag is not attached to the varying point in steps 53A and 54A, the picture element is contained in an island to be traced, and the process for tracing the island profile is executed. If not, this picture element is that belonging to the same area as the picture element scanned immediately before, and the raster scanning in step 51A is repeated.

In step 55A, the process for tracing the island profile is performed by the island profile tracing means 42A. The island profile means the same as the inside profile described in the conventional example. This tracing uses a mask of 2×2 or 3×3, and the process describes the label corresponding to the area name at the profile point and adds the unextracted flag to the profile point disposed at the leftmost side on the island in the direction of scanning. The label is described by an object to eliminate multiple tracings for the same island in step 54A and to detect the adjacent area in the process for tracing the area profile in step 57A. Then, in step 56A the varying point is set as the tracing starting point of the area to be traced in step 57A.

In step 57A, the process for tracing the area profile is performed by the area profile tracing means 43A. The area profile is the same as the outside profile in the conventional example. This tracing employs a mask of 2×2 or 3×3, and the process extracts the boundary point row during tracing and stores it in the extracted area data 10A, describes the labels of the area at the profile point, adds the unextracted flag, and detects the label of the adjacent areas. The picture element marked with the unextracted flag in this process is in contact with the traced area and is adjacent to the traced picture element of the area currently traced.

In step 58A, the adjacent relation graph as shown in FIG. 23(b) is sequentially formed from the label of the adjacent area detected in step 57A, and the hierarchical data 70A of FIG. 45(a) for storing the area name belonging to the label is formed. When step 58A is ended, the raster scanning in the step 51A is repeated.

A method to describe data display means 6A for displaying the image description data 12A formed as described above is, for example, set forth in Japanese Patent Application No. 25774/1984, Kobayashi et al, entitled "Figure Coating System", as the conventional example, and the description will be omitted.

According to the fourth embodiment of the present invention as described above, the process extracts the boundary point row of the area for forming the input image data 9A in step 31A, detects the adjacent and containing relation between the areas to form a hierarchical data 70A, approximates the boundary point row data 71A obtained in step 31A in the process of step 32A via linear primitives and circular arc primitives, and describes, in step 33A, the areas in the sequence of the hierarchy in the approximated outside boundary on the basis of the hierarchical data 70A obtained in step 31A to form the image description data 12A with less data quantity.

According to the embodiment of the present invention, the approximation of the inside boundary is not necessary in the approximation of an area boundary having an island to shorten the approximating time.

According to the fourth embodiment of the present invention, only the closed area having no island may be displayed in the description data display means 6A to simplify the sequence of the display.

In the embodiments described above, a CRT display 7A is employed as the display means. However, a liquid crystal display or a plotter may be used. For convenience in explaining the system construction of FIG. 43, the working memory 25A, the extracted area memory 26A, the approximated area memory 27A, and the image description memory 28A are separately shown, but they may be physically constructed within the same memory device. Unnecessary information may be erased in the process, and new information may be formed thereon.

In the embodiments described above, the primitives used for approximating the boundary point row in step 32A are linear primitives or circular arc primitives, but other primitives, such as elliptical or spline curves, may be used to approximate the boundary point rows of the image.

Figures 49A, 49B:
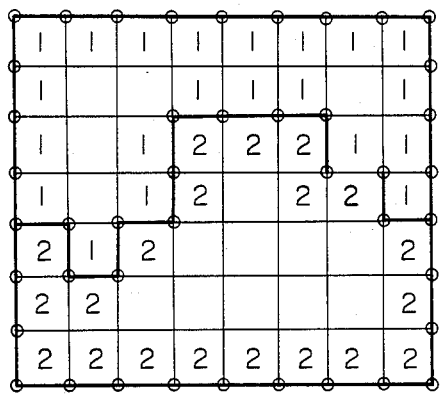
FIGS. 49(a) and 49(b) are views showing other boundary points extracted in the embodiment of the invention shown in FIG. 42.

In the embodiment described above, picture elements disposed at the outermost side of the area are used as the boundary point row to be extacted in the process of step 31A (the profile point row of the outside). However, other boundary point rows, such as point rows on the digital lattice disposed between the profile points shown by a thick solid line and the mark "o"in FIG. 49(b) may be employed.

In the embodiment described above, the areas are realigned in step 33A in the sequence of the hierarchy on the basis of the hierarchical data 70A. This process may be omitted and the approximated area data 11A may be used as the image description data 12A.

In addition, in the embodiment described above, the system for displaying the image description data 12A has been described. However, the image description data 12A may be used for pattern recognition or image analysis. This embodiment not only has the same advantages as the previous embodiments, but also has the advantage of obtaining the information relative to the adjacent and hierarchical structure of the image by the image description data 12A and the hierarchical data 70A.

Figure 50:
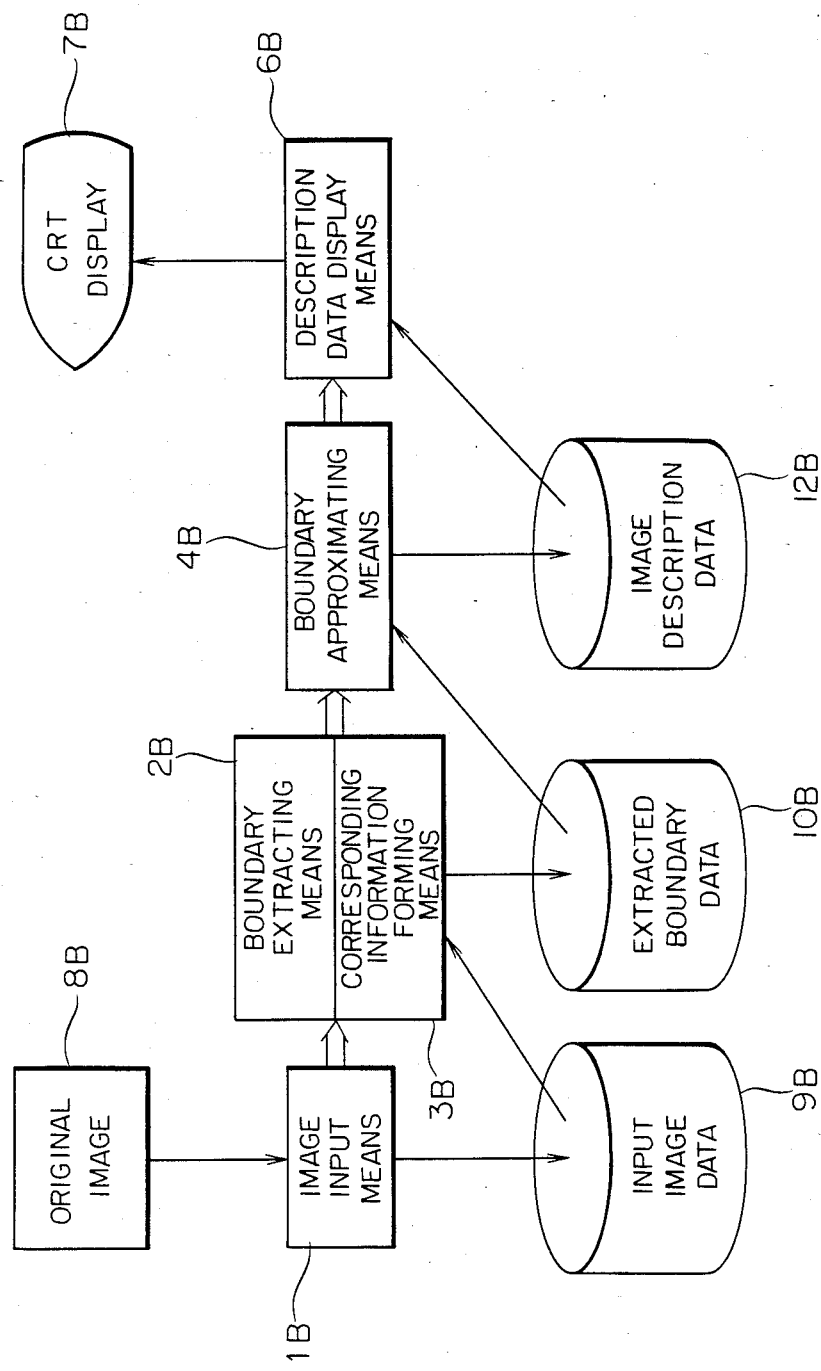
FIG. 50 is a view of the entire construction of still another embodiment of the invention.

FIG. 50 is a schematic showing the construction of a fifth embodiment of an image describing apparatus according to the present invention. Reference numeral 1B designates image input means, numeral 2B designates boundary extracting means, numeral 3B designates corresponding information forming means, numeral 4B designates boundary approximating means, numeral 6B designates description data display means, numeral 7B designates a CRT display numeral 8B designate original image, numeral 9B designates input image data, numeral 10B designates extacted boundary data, and numeral 12B designates image description data.

The fifth embodiment shown in FIG. 50 converts the original image 8B into a multivalue or multicolor digital image by the input means 1B to form input image data 9B, extracts and segments the boundary point row of the areas forming the input image data 9B by the boundary extracting means 2B, establishes correspondence between the segments formed by the boundary extracting means 2B and the areas partitioned by those segments to form the extracted boundary data 10B, approximates the point row segments of the extracted boundary data 10B via linear primitives and circular arc primitives by the boundary approximating means 4B to form the image description data 12B, and displays the content of the image description data 12B by the description data display means 6B on the CRT display 7B.

Figure 51:
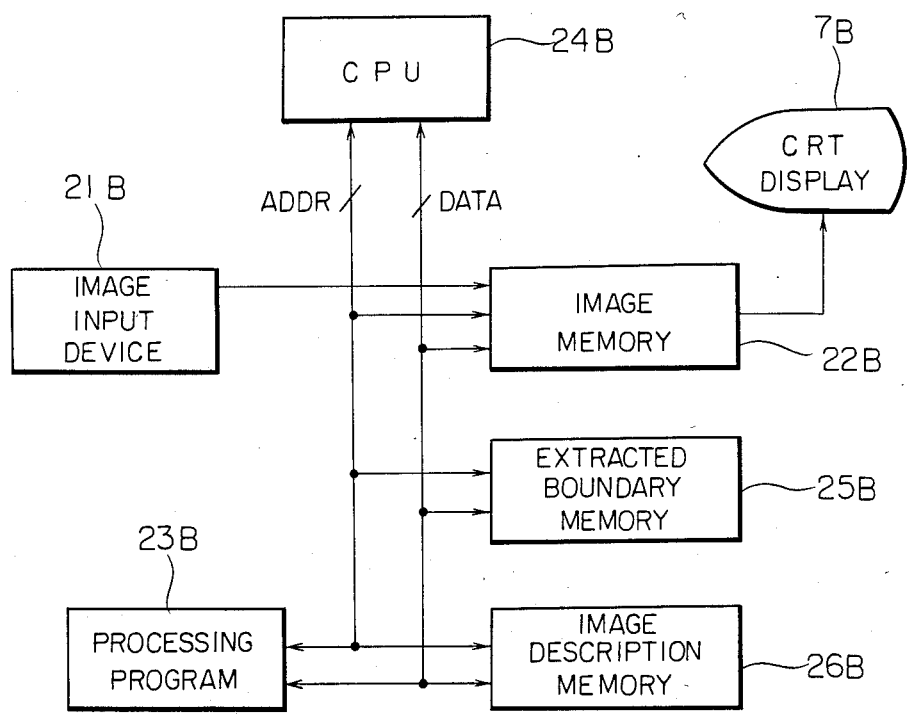
FIG. 51 is a view of the system construction of the embodiment of FIG. 50.

FIG. 51 is a view of the system construction of the fifth embodiment. Reference numeral 7B designates a CRT display, numeral 21B designates an image input device, numeral 22B designates an image memory, numeral 23B designates a processing program, numeral 24B designates a CPU, numeral 25B designates an extracted boundary memory, and numeral 26B designates an image description memory.

In FIG. 51, the image input device 21B includes an image input unit, such as a television camera or an image scanner, and a signal converter for converting the input image signal into a signal to be stored in the image memory 22B, and the input image data are stored as a multicolor digital image in the image memory 22B. The image memory 22B is formed of a RAM to store the input image data 9B of FIG. 50, and its contents can be displayed on the CRT display 7B by a CRT controller, not shown. The CPU 24B executes a process to be described later with respect to Figure 52 according to a processing program 23B. The extracted boundary memory 25B and the image description memory 26B are memories for storing the extracted boundary data 10B of FIG. 50 and the image description data 12B of FIG. 50 described with respect to FIG. 50 and are formed of rewritable memory, such as a RAM or a Winchester disk. The obtained image description data 12B of FIG. 50 is converted into raster data by the CPU 24B or a graphic processor, not shown, stored in the image memory 22B, and displayed on the CRT display 7B of FIG. 50.

Figure 52:
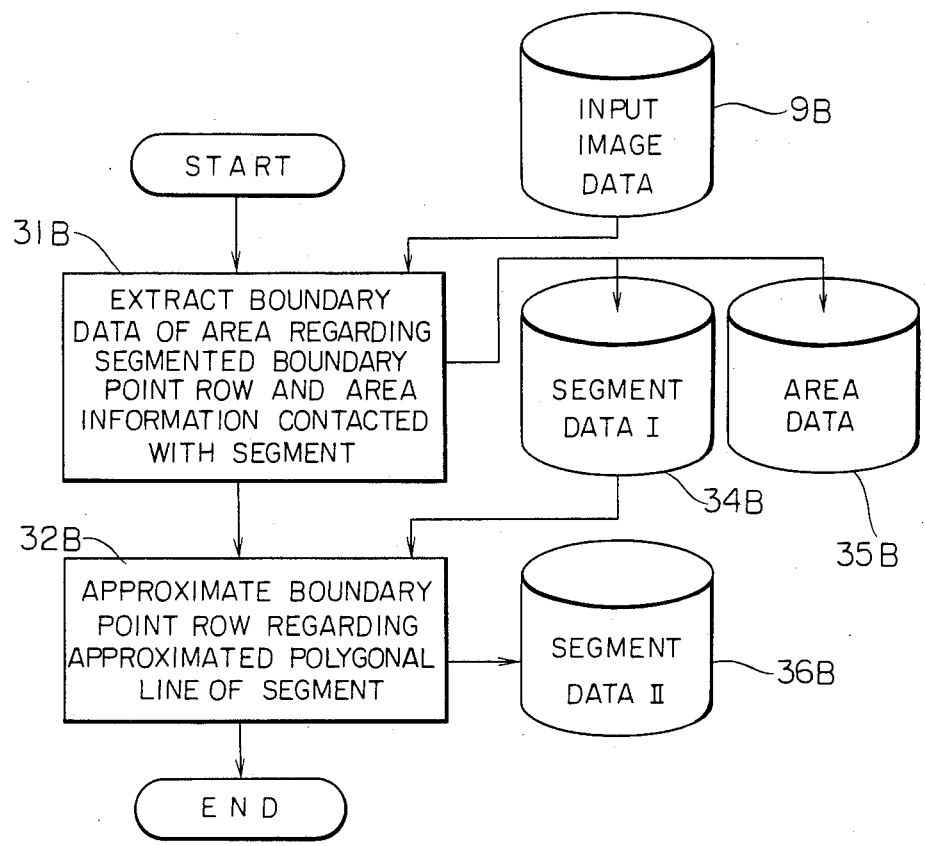
FIG. 52 is a flow chart showing the process for converting input image data into image description data.

FIG. 52 is a flow chart showing a process for converting the input image data 9B into image description data 12B in the embodiment. Reference numeral 9B designates input image data, numeral 34B designates segment data I, numeral 35B designates area data, and numeral 36B designates data segment II.

Figure 57:
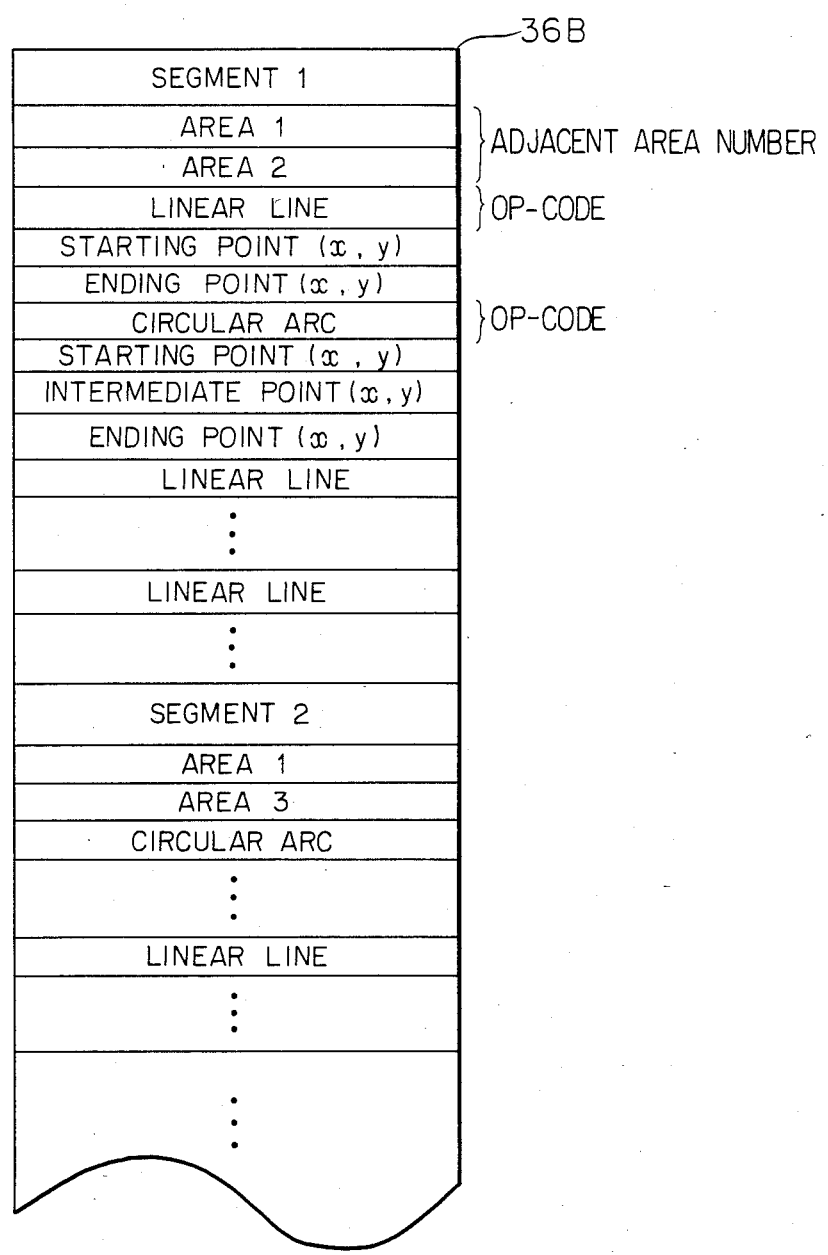
FIGS. 57 is a view showing the data configuration of the segment data II.

FIGS. 53-57 are views for supplementing the description of FIG. 52. FIGS. 53(a)-53(d) are views for explaining the extracted boundary point row, FIGS. 54(a)-54(c) are views for explaining the boundary extraction and boundary approximation, FIG. 55 is a view showing the data configuration of the area data 35B, FIG. 56 is a view showing the data configuration of the segment data I 34B, and FIG. 57 is a view showing the data configuration of the segment data II 34B.

In step 31B of FIG. 52 the boundary row of the areas contained in the input image data 9B is segmented, and information relative to the correspondence between extracted segments and adjacent areas partitioned by the segments is formed. The boundary point row extracted in this embodiment is different from the profile point row extracted in the conventional example. The boundary point row is extracted as the point row disposed on the lattice line of the digital lattice disposed between the profile point rows of adjacent areas. For example, for areas 1 and 2 shown in FIG. 53(a), part of the profile point row of areas 1 and 2 is considered as shown in FIG. 53(b), and the point row disposed between the two profile point rows marked by the mark "o" and the thick lines in FIG. 53(d) is extracted as the boundary point row 41B. Therefore, in this embodiment, the same point row is given as the boundary of adjacent areas. In Figure 53(b), the boundary point row is formed of the segments that partition areas 1 and 2.

Figure 54A:
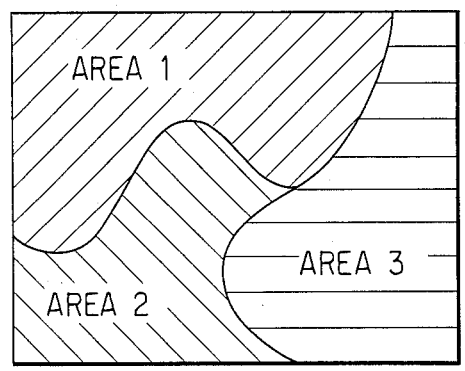
FIGS. 54(a)-54(c) are views for explaining the extraction of the boundary and the approximation of the boundary.
Figure 54B:
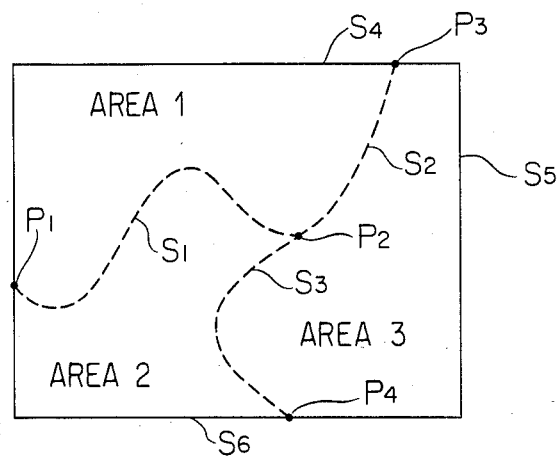
Figure 58:
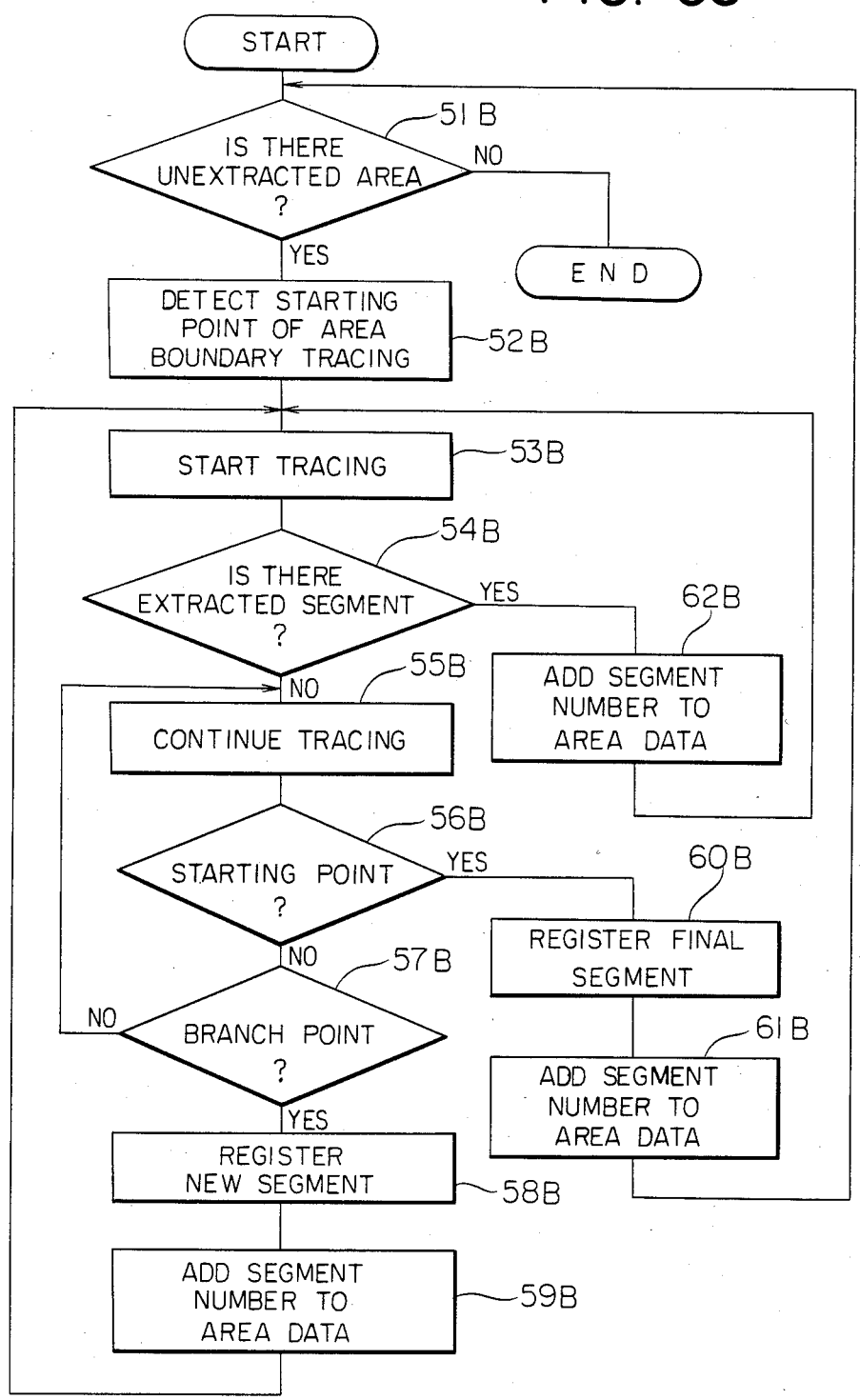
FIG. 58 is a flow chart for explaining a method of processing step 31B of FIG. 52.

A method for performing step 31B will be described with respect to FIG. 58. FIG. 54(b) is obtained from FIG. 54(a) by the process in step 31B. For example, in FIG. 54(a), the boundary for area 1 is divided into segment S1 (boundary with area 2), segment S2 (boundary with area 3), and segment S4 (edge of the image). The boundary for area 2 is divided into segment S1 (boundary with area 1), segment S3 (boundary with area 3), and segment S6 (edge of the image). The boundary for area 3 is divided into segment S2 (boundary with area 1), segment S3 (boundary with area 2), and segment S5 (edge of the image). The extracted point row segment is stored in segment data I 34B in a chain code format using coordinates information or data compression of the points. The number of each extracted area and the segment numbers forming the boundaries of that area are stored in a predetermined direction (clockwise in the drawing) in the area data 35B in the configuration shown in FIG. 55. The segment data I 34B stores, as shown in FIG. 56, the number of each segment, the point row data, and numbers of the two adjacent areas partitioned by the segment. The area data 35B and the segment data I 34B form the extracted boundary data 10B.

Figure 54C:
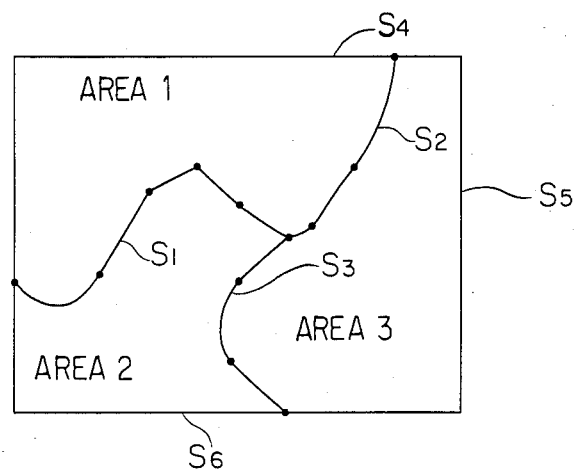

In step 32B, the segment data I 34B obtained in step 31B is inputted and the point row segments are approximated via linear primitives and circular arc primitives and stored in the segment data II 36B. The approximated result as shown in FIG. 54(c) is obtained from FIG. 54(b) by step 32B. The data configuration of the segment data II 36B has, as shown in FIG. 57, the segment number, numbers of the adjacent areas partitioned by that segment, an OP-code for indicating the linear primitives or circular arc primitives used to describe d the segment, and the coordinates data (the coordinates data of the starting and ending points in the case of a linear primitive, and the coordinates data of the starting, intermediate, and ending points in the case of a circular arc primitive). The segment data II 36B and the area data 35B become the image description data 12B.

A number of methods of approximating the linear and circular arc of the point row in step 32B have been proposed similar to the method of approximating the point row via the linear primitive, and any method may be performed in the embodiments. Therefore, its description will be omitted.

One method for performing step 31B in FIG. 52 is disclosed in the method of Japanese Patent Application No. 60-47435, "Profile Extracting Device", filed by the same assignee as the present invention, and only the essence of that method will be described. FIG. 58 is a flow chart showing a method for performing the process of step 31B. This method extracts the boundaries forming the areas in an area unit and detects areas whose boundaries are not yet extracted in step 51B of FIG. 58. Boundaries of the areas are extracted by bracing the boundary point row using a mask of 2×2. If an unextracted area exists in step 51B, a point on the boundary is detected in step 52B to trace the boundary of that area, and tracing is started in step 53B.

As described above, since the boundary of an area is extacted in an area unit, one segment is naturally extracted twice. Then in step 54B, the process determines whether the segment to be traced has already been extracted. If the segment has not been extracted, tracing is continued in step 55B. The process then determines in steps 56B and 57B whether the boundary point currently being traced coincides with the starting or branch point of the boundary. If it does not coinide, tracing is continued. A branch point of a segment means the end of the segment. For example, in FIG. 54(b), points $P_1$, $P_2$, $P_3$, and $P_4$ are branch points.

If the embodiment determines that the point currently being traced is a branch point in step 57B, extraction of the segment currently being traced is ended, the extracted segment is registered in step 58B, and both the point row data of the segment and the number of the extracted area are stored in the segment data I 34B. In step 59B, the segment number is stored in the area data 35B to indicate that the extracted segment is a segment of the area currently being extracted.

Step 56B is necessary for the following reason. The starting point to be traced and detected in step 52B is not always a branch point of the segment, and tracing is started midway through the segment. Tracing of the boundary is continuously conducted in a predetermined direction. In this case, the segment is only partly traced, and tracing of the entire segment is completed after the tracing completes one cycle and returns to the starting point. If tracing coincides with the starting point in step 56B, the data of the segment is registered in steps 60B and 61B. When step 61B is finished, extraction of one area is finished, and if the process determines in step 51B that there are no more unextracted areas. step 31B is ended.

If the segment to be extracted is determined in step 54B to have been already extracted, the segment number is stored in the area data 35B in step 62B, and the number of the area currently being extracted is stored in the point row segment data 34B corresponding to the extracted segment.

When the adjacent extracted area number is stored in the segment data I 34B in steps 58B, 60B, and 62B, the number of the area just extracted and the number of the area that has already been extracted are identified. Since each extracted segment is stored only once for the two adjacent areas, it is necessary to determine the order in which the segments forming an area are stored in the description data display means 6B according to a predetermined direction (clockwise or counterclockwise).

Figure 59:
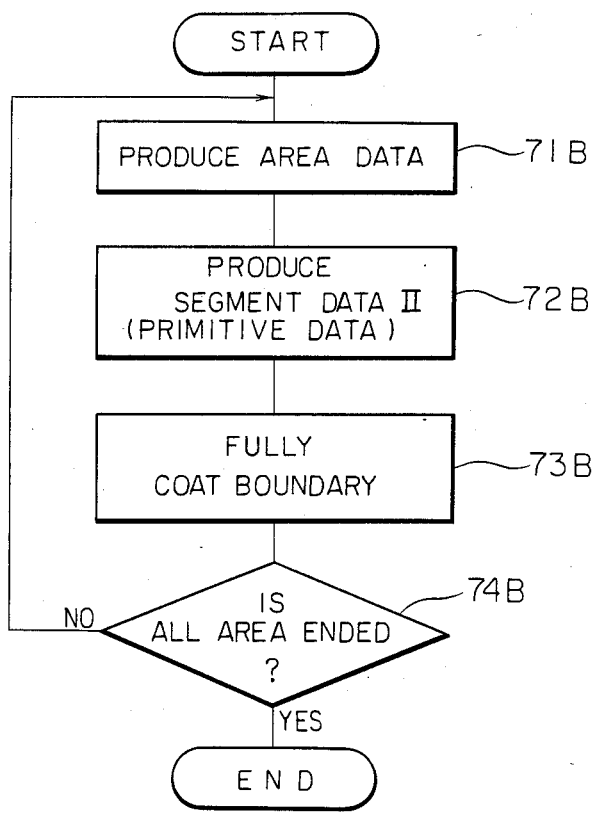
FIG. 59 is a flow chart showing the sequence of indicating image description data.

FIG. 59 is a flow chart showing the sequence for displaying the image description data 12B on the CRT display 7B using the description data display means 6B. The embodiment first accesses the area data 35B in step 71B to produce the segment numbers forming the individual areas according to a predetermined sequence. In step 72B, the segment data of the segments forming the boundary of an area are retrieved from the segment data II 36B in the sequence stored in the area data 35B.

In step 73B, the process inputs the primitives aligned in a predetermined direction as the boundary information of the area, writes the picture elements disposed on the boundary in the color value or tone value of the area in accordance with color information, not shown, in the image memory 22B, and displays them on the CRT display 7B. A method for performing the process of step 73b is disclosed in the conventional example of Japanese Patent Application No. 59-25774, and the description will be omitted.

Step 74B checks whether all areas are displayed. If not, steps 71B to 73B are repeated.

Figure 9A:
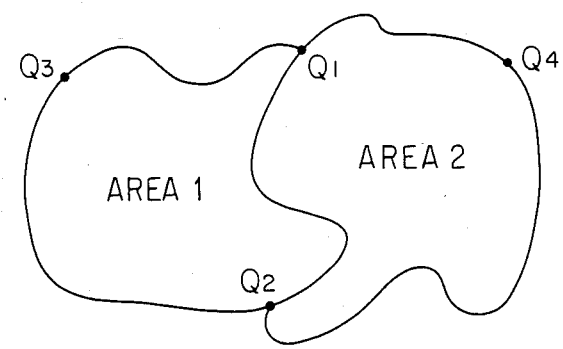
FIGS. 9(a) and 9(b) are views for explaining problems of the conventional example of FIG. 7.
Figure 9B:
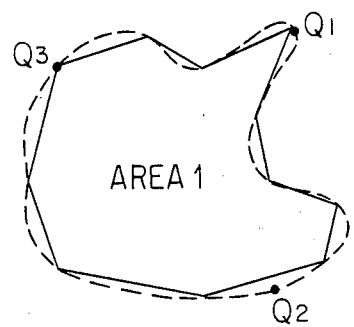
Figure 9C:
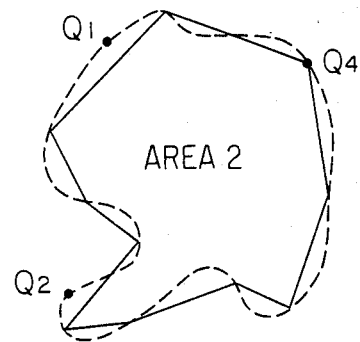
Figure 10:
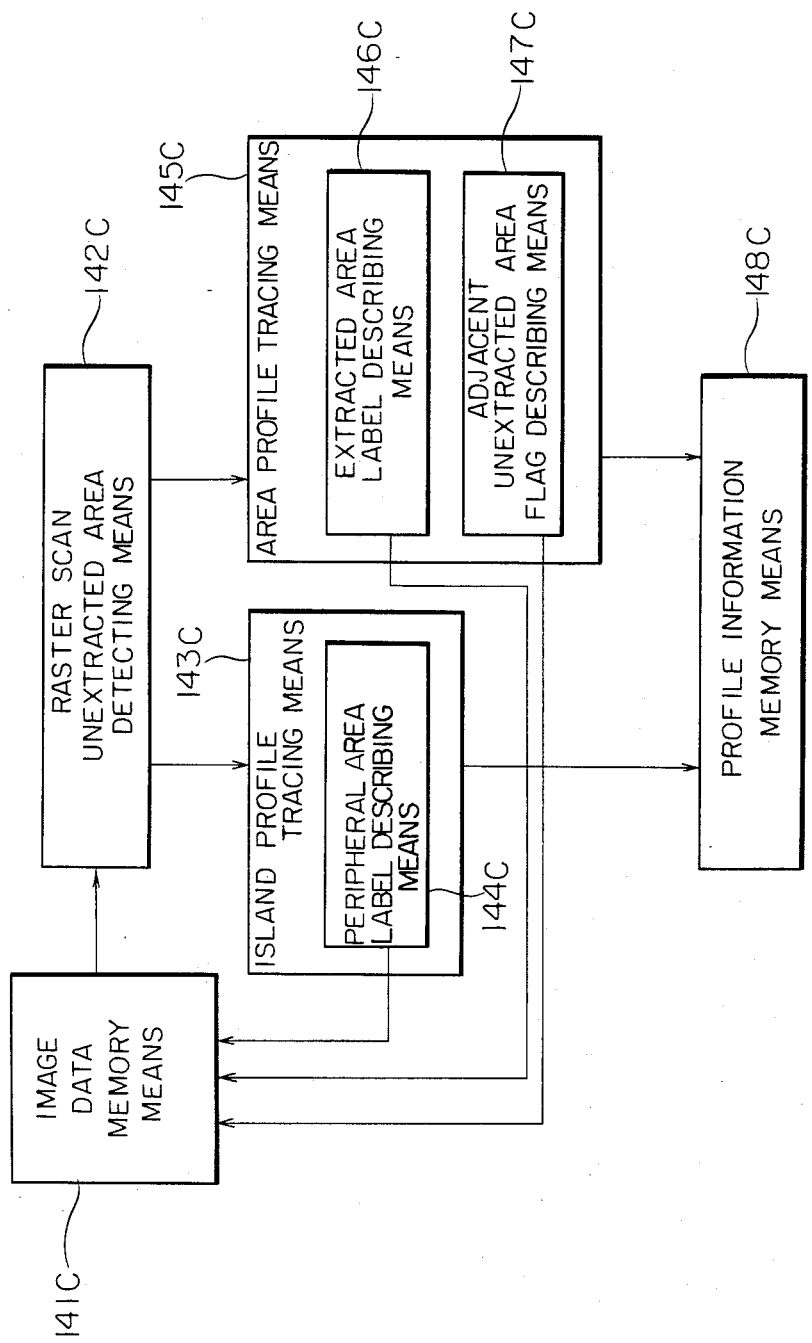
FIG. 10 is a block diagram of the entire system construction of still another conventional example.
Figure 11:
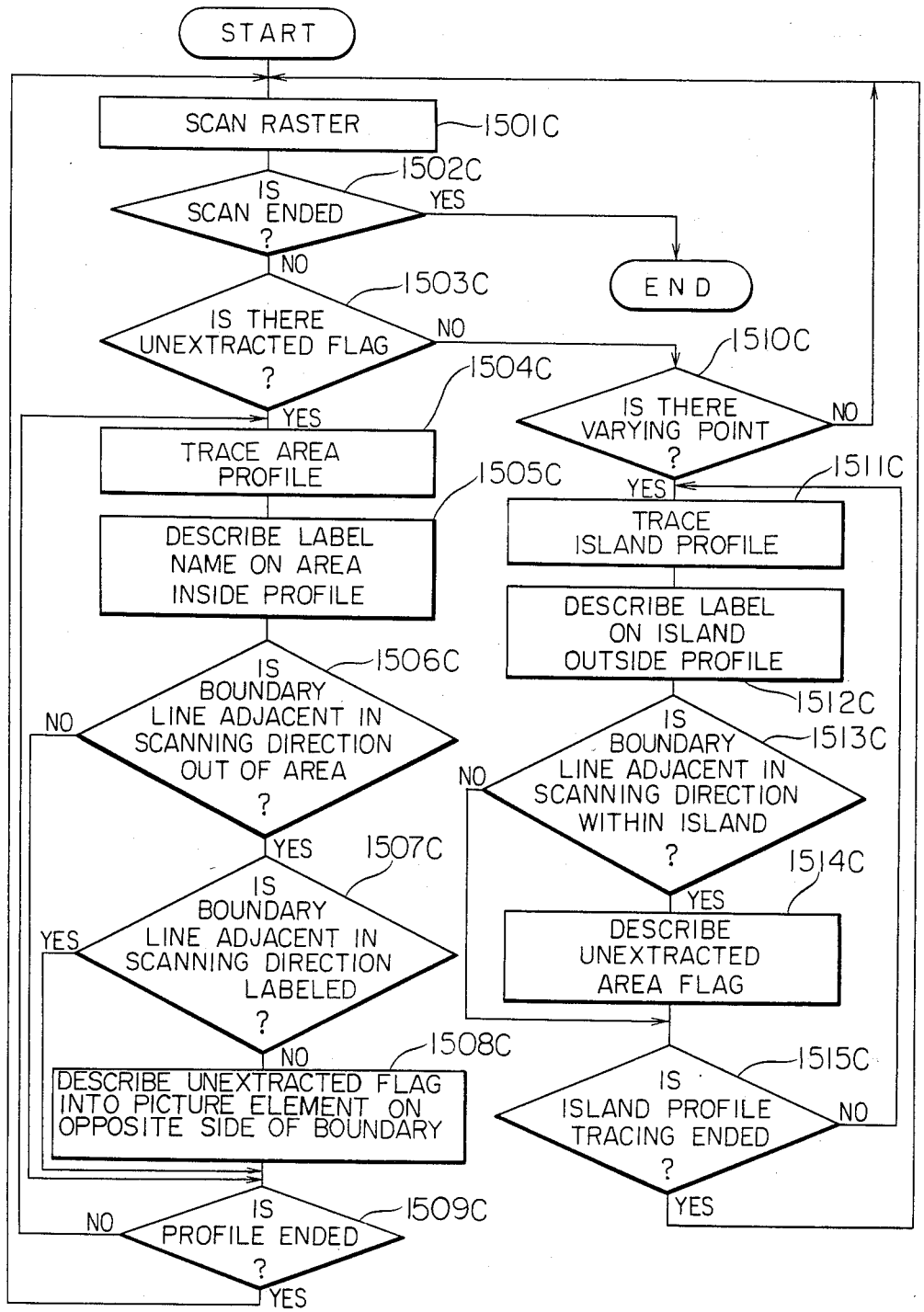
FIG. 11 is a flow chart for explaining the operation of the example in FIG. 10.
Figure 15:
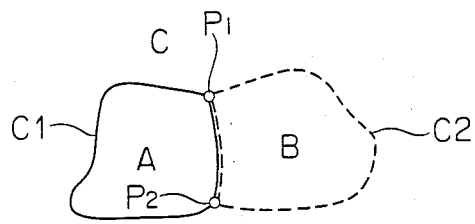

According to the above embodiment of the present invention, the process extracts them and then segments the boundary point rows of the areas forming the input image data 9B in step 31B, stores the numbers of the areas adjacent to each segment, and approximates the point row data in the segment unit by the process of step 72B via linear primitives and circular arc primitives. Therefore, the same approximating result can be provided between adjacent areas, and misalignment between adjacent areas, as shown in FIG. 9, does not arise.

According to the embodiment of the present invention, the point row data of the boundary and the approximated data are segmented and stored in the segment data I 35B and the segment data II 36B. The segment data are stored only once for the two adjacent areas. Therefore, the storing area for storing boundary data can be reduced by half. Since the boundary point row is segmented in a segment unit of linear or circular approximation, the approximating time also can be reduced by half.

In the embodiment described above, the CRT display was employed as the display unit. However, a liquid crystal display unit or a plotter may be employed.

For convenience in explaining the system construction of FIG. 51, the extracted boundary memory 25B and the image description memory 26B are separately shown, but they may be physically constructed within the same memory device. Unnecessary information may be erased in the process, and new information may be formed thereon.

In the embodiments described above, the primitive for approximating the point row in step 32B employs the linear or circular arc primitives, but other primitives, such as elliptical or spline curve primitives, may be approximated to describe the image.

In addition, in the embodiment described above, the system for displaying the result described in the linear or circular arc primitives has been described. However, the image description data may be transferred for use in the system for pattern recognition or image analysis. This embodiment possesses the same advantages of the above embodiments.

Figure 60:
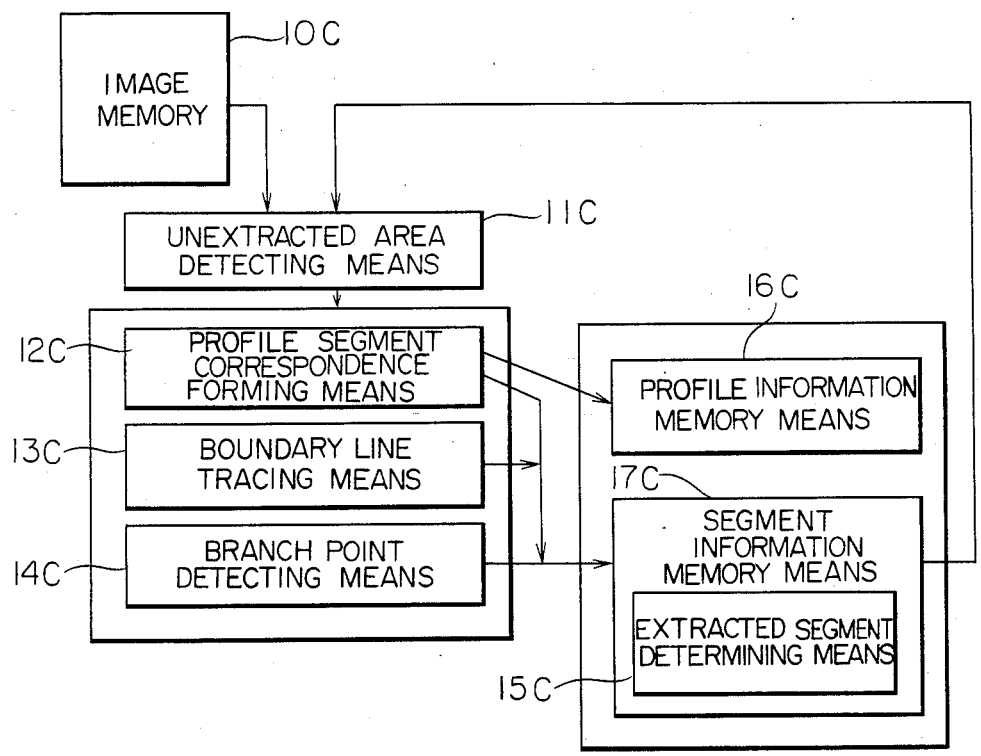
FIG. 60 is a block diagram showing the entire construction of still another embodiment of the invention.

FIG. 60 is a view of the entire construction of a sixth embodiment of the present invention. In FIG. 60, reference numeral 10C designates an image memory as image data memory means for storing the image to be processed, numeral 11C designates unextracted area detecting means, numeral 12C designates profile segment correspondence forming means for forming a correspondence between a segment and an area having the segment as part of a profile, numeral 13C designates boundary line tracing means for tracing the boundary line between areas to produce point row data, numeral 14C designates branch point detecting means for detecting the branch points of a boundary line during tracing, and numeral 17C designates segment information memory means. Reference numeral 15C designates extracted segment determining means for determining whether the segment extracted by the boundary line tracing means 13C and the branch point detecting means 14C or the segment to be extracted has already been extracted, thereby preventing storing data of the same segment twice. Reference numeral 16C designates profile information memory means for storing the relationship between each area and the segments forming the profile of that area.

In this embodiment, the process detects with the unextracted area detecting means 11C one point (hereinbelow referred to as the profile point) on the profile of an unextracted area in the image stored in the image memory 10C and forms area information and segment information using the three means 12C, 13C, and 14C as the profile information of the unextracted area. More particularly, the boundary line of the unextracted area is traced by the boundary line tracing means 13C starting from the profile point detected by the unextracted area detecting means 11C. The type of the area adjacent to the unextracted area is monitored to detect the branch point using the branch point detecting means 14C during tracing, and the boundary line is divided into segment units. Whether the extracted segment has already been traced and stored in the segment information memory means 17C is determined by the extracted segment determining means 15C. If the segment has not been extracted, the point row data of the segment and the area name extracted and connected to the segment are stored in the segment information memory means 17C. If the segment has been extracted, the area name extracted is added to the segment data stored in the segment information memory means 17C. At this time, two area names connected with the segment are stored. When the boundary line of the unextracted area is traced by the boundary line tracing means 13C, the segment name extracted with the profile segment correspondence forming means 12C during tracing is stored as the area information in the profile information memory means 16C. Then, the unextracted area is detected, but, as described above, each segment partitions two areas. Therefore, an unextracted area still exists in the image memory 10C as long as there exists at least one segment that does not have two corresponding areas stored in the segment information memory means 17C. Even if two connected areas are aligned for all the segments stored in the segment information memory means 17C, and unextracted area forming an island in an area may still exist as area F in FIG. 63, and this area is also detected by the unextracted area detecting means 11C. The unextracted area detection forming this island will be described in detail later.

Figure 61:
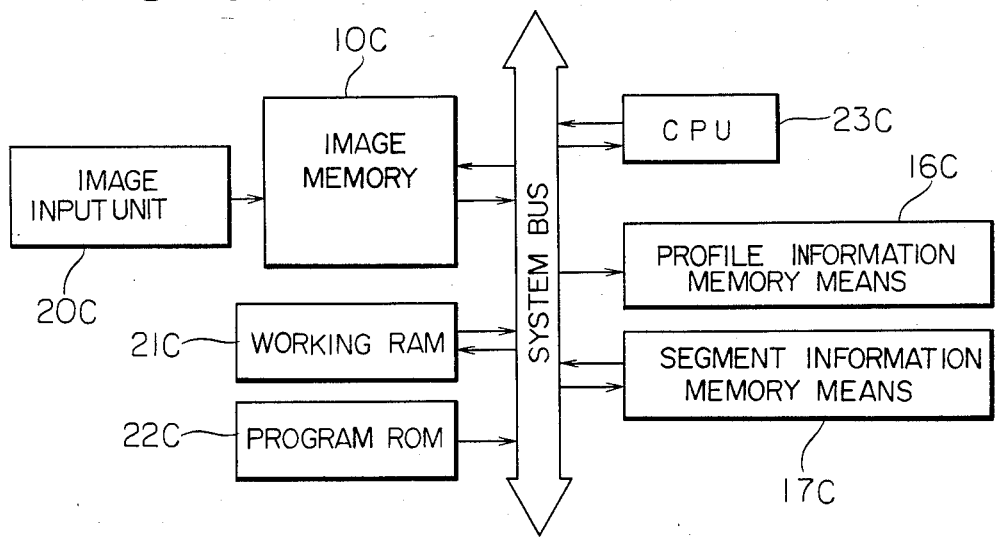
FIG. 61 is a block diagram showing the system construction of the embodiment of FIG. 60.

FIG. 61 is a view showing the system construction of the profile extracting device according to the present invention. Reference numeral 20C designates an image input unit for inputting the image data to be processed to the image memory 10C. Numeral 21C designates a memory for storing the processed data temporarily, which is a RAM in this embodiment. Numeral 22C designates a memory for storing a control program for controlling the system and the processing program for processing the data, which is a read-only memory (ROM) in the embodiment. Numeral 23C designates a CPU. In FIG. 61, the same symbols as those in FIG. 60 designate the same or equivalent parts.

The operation of the sixth embodiment will be described with reference to FIGS. 62-68.

Figure 62:
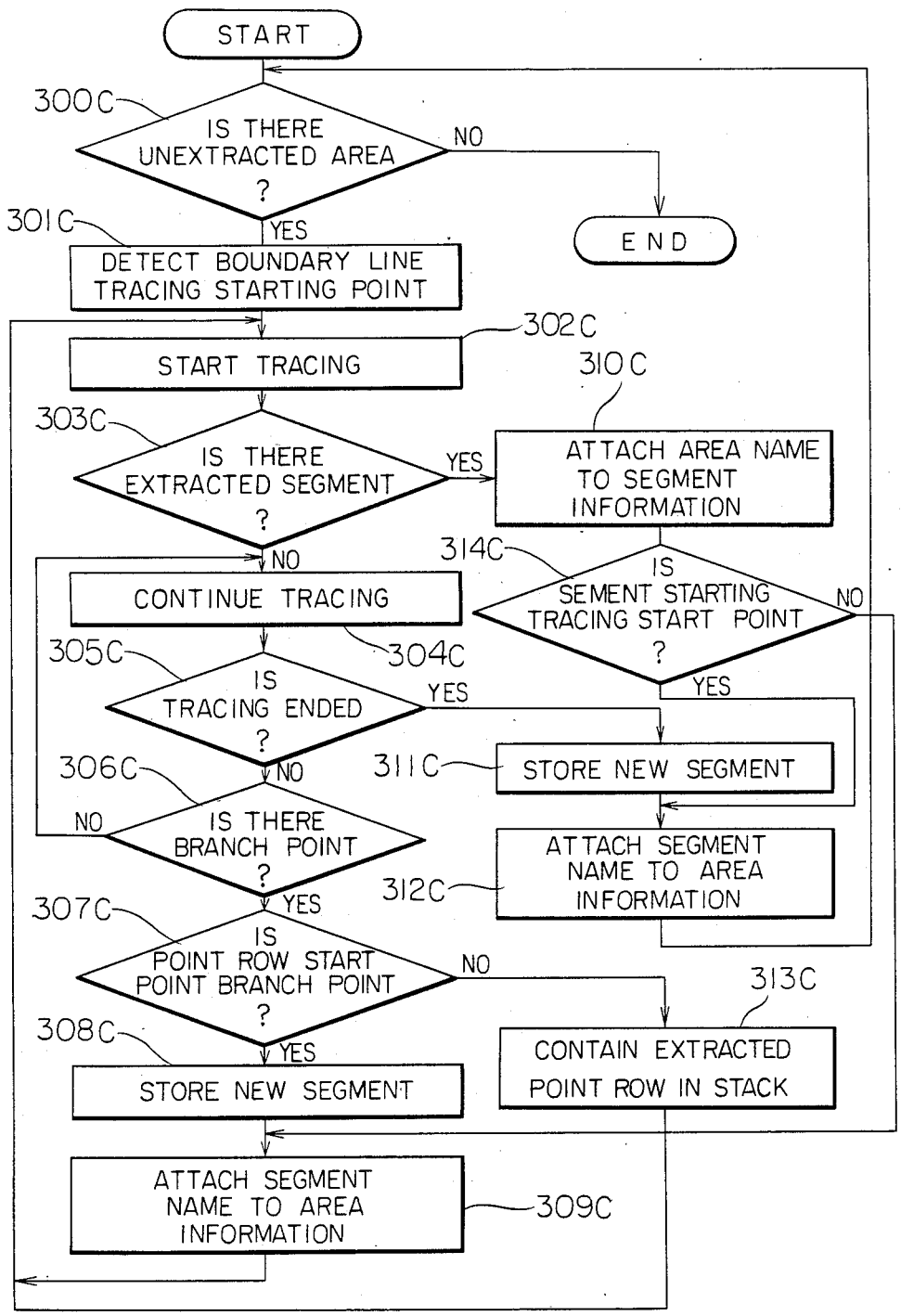
FIG. 62 is a flow chart for explaining the operation of FIG. 61.

FIG. 62 is a flow chart of a data processing program stored in the program ROM 22C in FIG. 61. FIG. 63 shows an example of a pattern for extracting the pofile. FIG. 64 shows the display picture element state of FIG. 63 in which numerals attached to the periphery of the image indicate the coordinates of the boundary line between the picture elements. In FIG. 62, step 301C sets the initial state wherein the label name of the area for extracting the profile from the initial state is designated by A, and the boundary line tracing starting point is designated by Po (1, 1). Here, the direction of tracing the boundary line is clockwise, and the point row data of the segment are represented by the coordinates of the starting point or the branch point and a chain code, as shown by the code in FIG. 65, in the displacing direction of the boundary line. The process then recognizes that the tracing starting point is not a branch point, and step 302C starts tracing. A method of determining whether the extracted segment has already been extracted in step 303C will be described in detail later. In the example in Figure 64, tracing is not started from a branch point and the process advances to step 304C. The present tracing position is advanced from the starting point (1, 1) to the picture element coordinates (2, 1) in step 304C. In step 305C, the ending point of a boundary line is reached when its coordinates coincide with the starting point detected in step 301C. Since the coordinates of the point currently being traced are different from those of the starting point, the process advances to step 306C. Step 306C determines that the point being traced is a branch point if two or more of the four picture elements surrounding the point being traced have different values, i.e., the point being traced is common to three or more areas. Point (2, 1) is not a branch point, and the process returns to step 304C. When the tracing point returns to the point (1, 1), tracing is ended in step 305C, and the process advances to step 311C. In step 311C, processes of three types, as shown in FIG. 66, are selected by the boundary line tracing starting point and the area information.

More specifically, if the boundary line tracing starting point is not a branch point and no segment is obtained as the profile information of the area currently being extracted (corresponding to I in FIG. 66), the extracted area forms an island, and the point row data obtained by tracing the boundary line is described as one segment until scanning completes an entire cycle and returns to the starting point. In this case, the profile of the area is formed of only one segment If the boundary line tracing starting point is not a branch point and at least one or more segments are stored in the area information for forming the profile of the area currently being extracted as in II in FIG. 66, then at least one branch point exists in the profile of the area. Therefore, the segments of the point row data extracted from the branch point to the boundary line tracing starting point and the point row data from the boundary line tracing starting point to the branch point initially discovered become one segment forming the profile of the area.

In the case of III in FIG. 66, the boundary line from the branch point detected last to the branch point of the boundary line tracing starting point becomes one segment forming the profile of the area.

In the example of FIG. 64, if the boundary line is traced and again returns to the picture element (1, 1), that corresponds to case I of FIG. 66. Thus, the point row data extracted from the boundary line tracing starting point and coming back to it is used as one segment and stored as one segment S1 in the segment information memory means 17C. In this case, as in FIG. 67, area A and the frame are simultaneously stored as the area contacted with the segment. In step 312C, the segment name S1 is stored, as in FIG. 68, in the area information memory means 16C as the segment for forming the profile line of the area A, and the process returns to step 300C.

Figure 72:
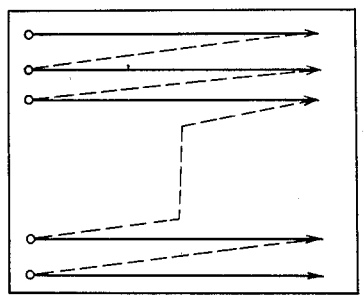

If there exists at least one segment that does not have two areas attached to it, step 300C determines that an unextracted area still exists, and step 301C detects its boundary tracing starting point. If each registered segment has two attached areas, the islands are then detected. A method of detecting an island will be described in detail later. If an island is discovered, one point on the boundary line for forming the profile of the island is used as the boundary line tracing starting point. However, if the image has no islands, the profile extraction is ended. In the example of FIG. 64, one segment has been registered, and the two attached areas are also registered. Accordingly, the island in area A is detected. For example, the point (8, 2) on the profile of the island is detected by raster scanning in the direction shown in FIG. 72 and is used as the boundary line tracing starting point. When the boundary line is traced in steps 304C, 305C, and 306C, the branch point $P_1$ (13, 8) is discovered, and the process advances to step 307C. Since the starting point of the point row being traced is not a branch point, the point row data extracted in step 313C is temporarily put in a stack, and the process returns to step 302C. Then, when the boundary line is traced with the branch point $P_1$ as the starting point, branch point $P_2$ is again discovered at (4, 8). At this time, the starting point of the point row being traced is the branch point $P_2$. Thus, the point row data is stored in step 308C as the segment S2 together with the area name B in the segment information memory means 17C, and the segment name S2 is stored in the area information of area B in step 309C.

When tracing continues, the process returns to the boundary tracing starting point (8, 2). In this case, the boundary line tracing point is not a branch point. Since the segment S2 has already been stored as the profile information of area B, it corresponds to II in FIG. 66. The point row data from the boundary points (8, 2) to (13, 8) are added to the point row data from the boundary points (4, 8) to (8, 2), and the union of the two sets of points is stored as segment S3 in step 311C. At this time, since the area (hereinbelow referred to as opposite side area) connected to the opposite side of the segment from area B has already been extracted in this case (area A), they are stored together. Segment name S3 is stored in the area information of the area B in step 312C, and the process returns to step 300C.

Then, the profile extraction of area C having the value 2 connected with segment S2 is started from the tracing staring point (13, 8). Since the profile of the area is extracted clockwise, branch points $P_3$ (8, 14), $P_4$ (8, 12), $P_5$ (5, 12), $P_6$ (5, 14), $P_2$ (4, 8) are discovered. The point row data $P_1P_3$ is registered as segment S4, $P_3P_4$ as segment as S5, $P_4P_5$ as segment S6, $P_5P_6$ as segment S7, and $P_6 P_2$ as segment S8 in the segment information. Since segments S4 and S8 are adjacent to area A already extracted at the opposite side area of area C, they are also stored. Step 303C determines that segment $P_2P_1$ obtained by advancing the tracing is segment S2 already extracted by the profile extraction of the area B, and the process advances to step 310C. In step 310C, area C is stored as the second area attached to segment S2 in the segment information, and the tracing position is further moved to the starting point (13, 8) of segment S2. Since the picture element (13, 8) is the boundary line tracing starting point of area C in step 314C, segment name S2 is added to area C information in step 312C.

The opposite side area D of area C connected to segment S5 is extracted and segments S9, S10 are then extracted. Similarly, the profile of area E is extracted as the opposite side area of area C connected with segment S6. At this time it is determined that area E is the opposite side area of area D connected with the segment S10.

Since all segments registered when the profile of area E is extracted have two attached areas, the islands in areas B to E are detected, and the island in area C is discovered. The profile is extracted starting at point (10, 9) on the boundary line forming the profile of the island, and segment S11 and area F are extracted.

Then, in FIG. 69, a method of detecting an island in step 300C in FIG. 62 will now be described in detail as set forth in "One Consideration of Fully Coating and Numbering of Coupling Area", Yasuhito Suenaga, Yokosuka Electric Communication Research Lab of Nippon Telegraph and Telephone Public Corporation. When detecting an island X contained within an area A, as in FIG. 69(a), the profile of area A is first detected from the profile line 101C of area A. The picture element disposed at the outermost side of the area is indicated for the picture element disposed one picture element inside the boundary line and at a later raster scanning time, and a fringe point flag is set to determine whether the area is described by an inside or an outside profile. When a picture element disposed inside area A and having a different value from the value of area A is discovered in the course of the raster scanning, the picture element is contained in island X. Accordingly, the picture element is stored as a profile point of the island. The periphery of island X is traced from picture element 102C outside island X, and the fringe point flag is set. When the fringe of the outside of island X is ended, the raster scanning is again performed, and flag f is set in area A.

Figure 69A:
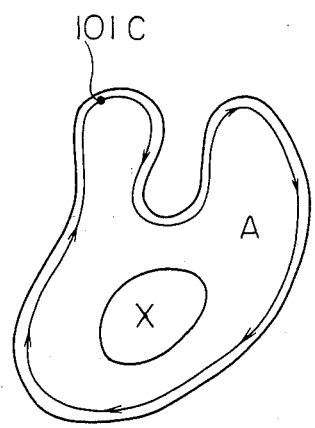
Figure 69B:
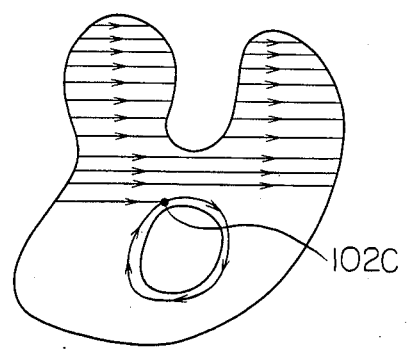
Figures 69C, 69D:
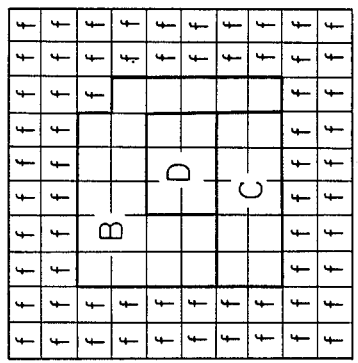

Assume that the state in FIG. 69(c) is obtained when the periphery of island X is observed in detail. In other words, the value of area A surrounding the island X is 0, the island X is formed of area B having value 1, area C having value 2, and area D having value 0. When flag f is described in area A by the raster scanning, the vicinity of island X becomes as shown in FIG. 69(d). The profile point of the island discovered at the raster scanning time corresponds to picture element P in FIG. 69(c), and picture element 102C shown in FIG. 69(b) corresponds to picture element Q in FIG. 69(c). When the profile of island X is extracted, either point $X_1$ or $X_2$ on the boundary line forming the profile of island X disposed between picture elements P and Q is set as the boundary line tracing starting point. When the profile of island X is extracted, segment $X_4X_3$ of part of the profile of area B and segment $X_3X_4$ of part of the profile of area C area simultaneously registered with area A surrounding island X as the opposite side area when the segments are registered in the segment information since flag f is described at the picture elements of the opposite side area connected with the segments.

Step 303C in FIG. 62 is now described in detail. For example, in the example of FIGS. 63-64, an extracted flag is attached to the points on the segment S2 for extracting the segment S2 ($P_1P_2$) when extracting the profile of area B. In the extraction of the profile of area C, if the segment S2 is again to be traced, when the process advances from branch point $P_2$ (4, 8) to point (5, 8) on the boundary line, the extracted flag is attached to point (5, 8) on the boundary line. Then, the tracing is always advanced until the next branch point $P_1$ is discovered. When the process arrives at branch point $P_1$, the final tracing direction is set clockwise. If the tracing direction of the profile of an area is set constantly, the tracing direction of the previously traced segment is said to be reverse to the direction of tracing at the current segment. Accordingly, the segment is traced from branch point $P_1$ counterclockwise. Then, the segment starting from starting point (13, 8) in the segment information of FIG. 67 with a value of (2) and having a counterclockwise direction in the first point row code is retrieved. The segment is determined by the direction of the first point row as the starting point and is understood to be segment S2.

According to the present invention as described above, the embodiment segments the boundary line between areas by a branch point in the boundary line tracing means 13C, and the branch point detecting means 14C relates segment data to an area having the segment as part of its profile by the profile segment correspondence forming means 12C and stores the command point row data in the area. The extracted segment determining means 15C ensures that data for each segment are stored only once. Therefore, the memory capacity of the profile information can be reduced.

According to the present invention as described above, the embodiment stores the profile information of an area in the profile information memory means 16C as the segment row and describes two areas contacted with the segment in the segment information stored in the segment information memory means 17C. Therefore, adjacent relations containing positional information can be provided.

Since the area name extracted at the profile when the segment is extracted is stored together with the segment point row in the segment information memory means 17C, when the segment is again extracted as part of the profile of another area, the boundary of the segment with the area can be clarified by referring to the segment information. Therefore, it is not necessary to describe the label on the area in the image memory as in the conventional example to obtain adjacent relations between the different areas. Thus, the capacity of the image memory necessary to extract the profile can be largely reduced.

In the embodiment described above, step 303C in FIG. 62 determines whether a segment being extracted has been extracted earlier by using an extracted flag.

One of the embodiments stores the end point coordinates of a segment as the segment information when that segment is extracted. If a branch point is detected during tracing of a boundary line, the segment whose end point is the branch point is extracted from the segment information. If the segment is not registered, then it is an unextracted segment. If the segment has been registered, the code for indicating the final displacing direction of the segment is examined. If the code indicates that the final displacing direction of the registered segment is opposite to the direction of the current tracing, the registered segment coincides with the segment currently being traced. If the displacing direction of the code is not opposite to the direction of the current tracing, the registered segment is different from the one currently being traced. There are four possible combinations for the existence of a branch point at one end of a segment and the code for the final displacing direction of that segment, but if the branch point and the code for indicating the final displacing direction of the branch point are known, the segment is uniquely identified. If such a segment is not registered, the segment currently being traced is an unextracted segment. If the registered segment is identical to the segment currently being traced, the segment name is attached to the area information, the name of the area currently being traced is attached to the segment information, and the tracing boundary point is moved to the starting point of the segment. According to this embodiment, since no segment is traced twice, the processing time can be shortened. Since it is not necessary to attach a flag to a boundary point, a working memory necessary for the process can be deleted.

Figure 70:
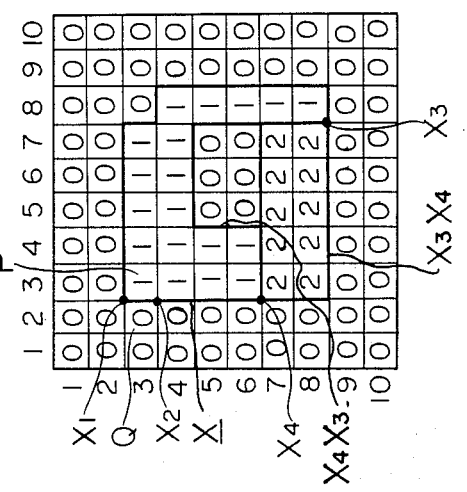
Figure 71A:
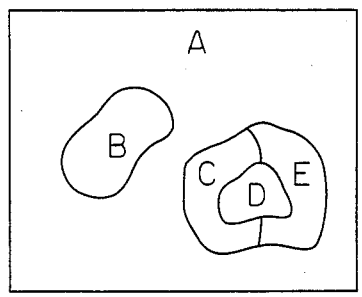
Figure 71B:
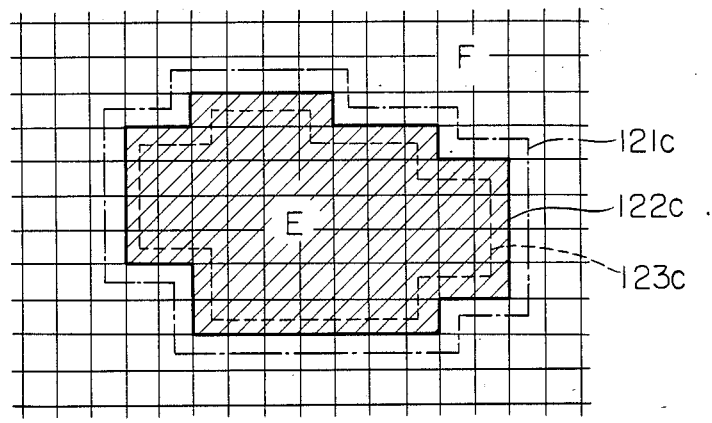

Advantages similar to those of the previous embodiments can be obtained by forming the branch list in FIG. 70 instead of adding the end point coordinates to the segment information. For example, in FIG. 64, when the profile of area B is traced, branch point $P_1$ is initially discovered, and tracing of segment S2 is started from $P_1$ as the starting point, but at this time the coordinates of $P_1$, the direction of segment S2 as observed from $P_1$, and the segment name are registered in the branch point list in FIG. 70. Then, even when the branch point $P_2$ is discovered, the coordinates of the branch point, the segment name, and the direction of the segment as observed from $P_2$ are registered. Such a registration is executed whenever a new segment is extracted. Then, when branch point $P_2$ is discovered by tracing the profile of area C, segment name S8 and the direction of segment S8 as observed from $P_2$ are registered in the branch list. Then, since the next boundary line tracing direction is 0, whether the segment having direction 0 is registered with $P_2$ in the branch point list is checked. In this case, since segment S2 having direction 0 is registered, it is understood that the segment currently being traced is segment S2 already extracted.

In the detection of island X shown in FIG. 69(a), in the embodiment described above, when the fringe point flag is described at the outside of the profile of island X and when the profile of an area contained within the island is extracted, some segments may be traced twice, e.g., segment $X_4X_3$ of part of the profile of area B and segment $X_3X_4$ of part of the profile of area C in FIG. 69(c). When island X is detected and tracing is executed, the boundary line forming the profile of island X is segmented, the area name surrounding the island and the segment information are stored as an area adjacent to the segment in the segment information memory means 17C. Then, when the profile of an area contained within the island is extracted, it is not necessary to trace the same segment again, and the name of the area contained within the island and adjacent to the segment is registered in the segment information.

In this embodiment, a segment forming the profile of an island is stored together with the area name surrounding the island as the segment information when the profile of the island is traced. The flag f indicating that the area surrounding the island is extracted is not necessary.

In the embodiment described above, the profile segment correspondence forming means 12C in FIG. 60 stores names of the segments forming the profile of an area in the area information shown in FIG. 68, and the two area names divided by a segment area stored in the segment information. In other words, the information indicating the corresponding relation between a segment and an area can have two formats, but using only one format may be sufficient.

According to the present invention as described above, the embodiment extracts area data of the boundary point row of areas forming the input image data, approximates the extracted boundary point row via linear primitives or circular arcs or curved primitives, divides the curved primitives if necessary, converts the approximated boundaries obtained from the above processes into graphic commands, and selects the graphic commands with a preferential graphic command sequence to describe the image. Therefore, the encoded data for obtaining a visual image can be formed with less data quantity than in the conventional example.

According to the present invention, the embodiment extracts the boundary point row of the areas forming the input image data, detects the adjacent and containing relations between the areas to form hierarchical data, approximates the extracted boundary point row via linear primitives or circular arc primitives, and describes the area in the sequence of the hierarchy according to the hierarchical data. Thus, image description data with less data quantity than the conventional example can be provided.

According to the present invention, the embodiment further segments the boundary point rows of the areas forming the input image data, forms relations between segments and adjacent areas partitioned by those segments, and approximates the point row data in segment units via linear primitives or circular arc primitives to describe the image. Therefore, the image description data having the same approximated result and no irregular alignment can be obtained between adjacent areas.

According to the present invention, the embodiment further divides boundary lines dividing areas forming the image into boundary line segments partitioned by branch points and relates the point row data of a boundary line portion to the area having that boundary line portion as part of its profile to eliminate redundant storage of point row data. Therefore, the quantity of memory required to store the profile information can be decreased.

What is claimed is:

1. An image describing apparatus for describing an image stored in an array of image memory as image data for display, the image being made up of a plurality of areas of different colors and having at least one of polygonal and arcuate boundaries, said apparatus comprising:
    extracting means for extracting boundary point rows representing boundaries between areas of different colors from image data stored in an array of image memory;
    approximating means for approximating the boundary point rows extracted by the extracting means in terms of at least one of linear primitives and curve primitives;
    converting means for converting the at least one of the linear and curve primitives approximated by the approximating means into at least one of polygonal and arcuate graphic commands, respectively, of specified colors and shapes;
    identifying means for identifying first graphic commands converted by the converting means from first primitives which are overlapped by other graphic commands, for dividing the first primitives into second primitives, and for converting the second primitives into second graphic commands not so overlapped; and
    selecting means for selecting a sequence of graphic commands to encode the image data.

2. An image describing apparatus as set forth in claim 1 wherein the curve primitives are circular arcs.

3. An image describing apparatus as set forth in claim 1 wherein the curve primitives are elliptical arcs.

4. An image describing apparatus as set forth in claim 1 wherein each arcuate graphic command converted from a curve primitive is bounded by the curve primitive and a chord of the curve primitive.

5. An image describing apparatus as set forth in claim 4 wherein the polygonal graphic commands converted from the linear primitives are polygons bounded by linear primitives and chords of the curve primitives.

6. An image describing apparatus as set forth in claim 1 wherein the polygonal graphic commands converted from the linear primitives are polygons bounded by linear primitives.

7. An image describing apparatus as set forth in claim 1 wherein said means for converting includes means for classifying graphic commands into a plurality of levels, and said means for selecting a sequence includes means for selecting a sequence on the basis of the levels.

8. An image describing apparatus as set forth in claim 7 wherein said means for selecting a sequence includes means for selecting a priority order of graphic commands in different levels.

9. An image describing apparatus as set forth in claim 7 wherein said means for selecting a sequence includes means for selecting a priority order of graphic commands in the same level.

10. An image describing apparatus as set forth in claim 1 wherein said means for selecting a sequence includes means for ordering an area whose boundary includes a concave curve primitive prior to an adjacent area including a convex curve primitive corresponding to the concave curve primitive.

11. An image describing apparatus as set forth in claim 1 wherein said means for converting includes means, operative for areas whose boundaries include both convex and concave curve primitives, for converting the last-mentioned convex and concave curve primitives into third and fourth arcuate graphic commands, respectively, separately from polygonal graphic commands and for establishing a correspondence between respective third and fourth arcuate graphic commands and respective polygonal graphic commands converted from linear primitives of areas whose boundaries include the convex and concave curve primitives.

12. An image describing apparatus as set forth in claim 11 wherein said means for selecting a sequence includes means, operative through areas whose boundaries include both convex and concave curve primitives, for ordering all polygonal graphic commands prior to all arcuate graphic commands.

13. An image describing apparatus as set forth in claim 11 wherein said means for selecting a sequence includes means, operative for areas whose boundaries include both convex and concave curve primitives, for ordering the respective fourth arcuate graphic commands immediately subsequent to the respective corresponding polygonal graphic commands.

14. An image describing apparatus as set forth in claim 11 wherein said means for selecting a sequence includes means, operative for areas whose boundaries include both convex and concave curve primitives, for ordering the respective third and fourth arcuate graphic commands immediately subsequent to the respective corresponding polygonal graphic command.

15. An image describing apparatus for describing an image stored in an image memory for display made up of a plurality of areas of different colors and having at least one of polygonal and arcuate boundaries, said apparatus comprising:
    extracting means for extracting boundary point rows representing boundaries between areas of different colors from image data stored in an array of image memory;

forming means for forming a hierarchy based on adjacent and containing relations between areas;

approximating means for approximating at least one of straight and curved portions of the boundary point rows extracted by the extracting means in terms of at least one of linear primitives and curve primitives, respectively, the at least one of linear and curve primitives defining, respectively, at least one of polygonal and arcuate coupling areas; and describing means for sequentially describing the areas in order of the hierarchy.

16. An image describing apparatus as set forth in claim 15 wherein said means for extracting includes means for tracing area profiles.

17. An image describing apparatus as set forth in claim 16 wherein said means for extracting further includes means for tracing island profiles.

18. An image describing apparatus for describing an image stored in an array of image memory as image data for display, the image being made up of a plurality of areas of different colors and having at least one of polygonal and arcuate boundaries, said apparatus comprising:

extracting means for extracting boundary point rows representing boundaries between areas of different colorsfrom image data stored in an array of image memory;

segmenting means for segmenting the boundary point rows extracted by the extracting means into segments, the segments dividing the image data into areas;

establishing means for establishing a data configuration including a correspondence between each segment, segmented by the segmenting means, and the areas divided by the segments; and approximating means for approximating at least one of straight and curved segments, segmented by the segmenting means, in terms of at least one of linear primitives and curve primitives, respectively, the at least one of linear and curve primitives defining, respectively, at least one of polygonal and arcuate areas.

19. An image describing apparatus for describing an image stored in an array of image memory as image data for display, the image being made up of a plurality of areas of different colors which have at least one of polygonal and arcuate boundaries, said apparatus comprising:

an image memory storing an array of picture elements for making up an image;

boundary line tracing means for tracing picture elements stored in the image memory making up boundary lines between areas of different colors in the image;

branch point detecting means for detecting picture elements of boundary lines traced by the tracing means at which three or more areas meet;

unextracted area detecting means for detecting boundary lines not yet traced by the tracing means; and correspondence means for dividing boundary lines at each branch point detected by the detecting means into at least one of straight and curved segments and for establishing correspondence between the segments and areas bounded by the segments.

* * * * *